(12) United States Patent
Lambert et al.

(10) Patent No.: US 11,842,443 B2
(45) Date of Patent: *Dec. 12, 2023

(54) RENDERING THREE-DIMENSIONAL OBJECTS UTILIZING SHARP TESSELLATION

(71) Applicants: Adobe Inc., San Jose, CA (US); Institut Mines Telecom, Palaiseau (FR)

(72) Inventors: Thibaud Lambert, Paris (FR); Tamy Boubekeur, Paris (FR); Anthony Salvi, Paris (FR)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,847

(22) Filed: Feb. 22, 2023

(65) Prior Publication Data
US 2023/0196676 A1  Jun. 22, 2023

Related U.S. Application Data

(63) Continuation of application No. 16/953,829, filed on Nov. 20, 2020, now Pat. No. 11,593,992.

(51) Int. Cl.
*G06T 17/20* (2006.01)
*G06T 15/04* (2011.01)

(52) U.S. Cl.
CPC .............. *G06T 17/20* (2013.01); *G06T 15/04* (2013.01)

(58) Field of Classification Search
CPC ................................ G06T 17/20; G06T 15/04
See application file for complete search history.

(56) References Cited

U.S. PATENT DOCUMENTS 10,198,860 B1  2/2019  Smith et al.
10,242,484 B1  3/2019  Cernigliaro et al.
(Continued)

OTHER PUBLICATIONS

Batra V., Kilgard M. J., Kumar H., Lorach T.: Accelerating vector graphics rendering using the graphics hardware pipeline. ACM Transactions on Graphics 34, 4 (Jul. 2015), 146:1-146:15. URL: http://dl.acm.org/citation.cfm?doid=2809654.2766968, doi:10.1145/2766968.
(Continued)

*Primary Examiner* — Michelle Chin
(74) *Attorney, Agent, or Firm* — Keller Preece PLLC

(57) ABSTRACT

The disclosure describes one or more embodiments of systems, methods, and non-transitory computer-readable media that modify vertex positions of a 3D-object mesh to align the vertices with discontinuities indicated by a sharpness map for a displacement map. For example, the disclosed systems access a sharpness map that encodes discontinuities of a displacement map to preserve sharp features. During sharp tessellation, for a given vertex of the 3D-object mesh, the disclosed systems iterate over neighboring vertices to search for a nearest intersection between one of the incident edges of the vertex and neighboring vertices and a discontinuity line from the sharpness map. Then, the vertex is moved within a threshold distance of the nearest discontinuity line intersection along the incident edge. The disclosed systems similarly reposition other vertices of the 3D-object mesh to generate a modified 3D-object mesh that includes vertices that align with discontinuities present in a displacement map.

20 Claims, 20 Drawing Sheets

(56) References Cited

U.S. PATENT DOCUMENTS

| | | | |
|---|---|---|---|
| 10,902,605 | B2 | 1/2021 | Strugar |
| 11,270,507 | B1 | 3/2022 | Lambert et al. |
| 2006/0028466 | A1 | 2/2006 | Zhou et al. |
| 2015/0035826 | A1* | 2/2015 | Tuffreau ............... H04N 19/20 345/420 |
| 2018/0158227 | A1* | 6/2018 | Reshetov ................ G06T 7/13 |
| 2020/0226829 | A1* | 7/2020 | Szasz .................... G06T 17/20 |

OTHER PUBLICATIONS

Boubekeur T., Schlick C.: Generic mesh refinement on GPU. In Proceedings of the ACM SIGGRAPH/Eurographics conference on Graphics hardware—HWWS '05 (Los Angeles, California, 2005), ACM Press, p. 99. URL: http://portal.acm.org/citation.cfm?doid1071866.1071882, doi:10.1145/1071866.1071882.

Boubekeur T., Schlick C.: A Flexible Kernel for Adaptive Mesh Refinement on GPU. Computer Graphics Forum 27, 1 (Mar. 2008), 102-113. URL: http://doi.wiley.com/10.1111/j. 1467-8659.2007.01040.x, doi:10. 1111/j.1467-8659.2007.01040.x.

Core V., March P., Segal M., Frazier C.: The OpenGL Graphics System : A Specification. 94-100. May 28, 2009; URL: http://www.opengl.org/registry/doc/glspec40.core.20100311.pdf.

Cook R. L.: Computer Graphics vol. 18, No. 3, Jul. 1984. SIGGRAPH '84 Proceedings (1984), 223-231.

Corporation M.: Direct3D 11 Features. Tech. rep., 2009. URL: http://msdn.microsoft.com/en-us/library/windows/desktop/ff476342%28v=vs.85%29.aspx.

Eisenacher C., Meyer Q., Loop C.: Real-time view-dependent rendering of parametric surfaces. In Proceedings of the 2009 symposium on Interactive 3D graphics and games—I3D '09 (Boston, Massachusetts, 2009), ACM Press, p. 137. URL: http://portal.acm.org/citation.cfm?doid=1507149.1507172, doi:10.1145/1507149.1507172.

Ganacim F., Lima R. S., de Figueiredo L. H., Nehab D.: Massively-parallel vector graphics. ACM Transactions on Graphics 33, 6 (Nov. 2014), 1-14. URL: http://dl.acm.org/citation.cfm?doid=2661229.2661274, doi:10. 1145/2661229.2661274.

Gonzalez R. C., Woods R. E.: Digital Image Processing. 2007. Part 1.

Gonzalez R. C., Woods R. E.: Digital Image Processing. 2007. Part 2.

Hirche J., Ehlert A., Guthe S., Doggett M.: Hardware accelerated per-pixel displacement mapping. In Proceedings of Graphics Interface 2004 (School of Computer Science, University of Waterloo, Waterloo, Ontario, Canada, 2004), GI '04, Canadian Human Computer Communications Society, pp. 153-158. URL: http://dl.acm.org/citation.cfm?id=1006058.1006077.

Kilgard M. J., Bolz J.: GPU-accelerated path rendering. ACM Trans-actions on Graphics 31, 6 (Nov. 2012), 1. URL: http://dl.acm.org/citation.cfm?doid=2366145.2366191, doi:10. 1145/2366145.2366191.

Kaneko T., Takahei T., Inami M., Kawakami N., Yanagida Y., Maeda T., Tachi S.: Detailed shape representation with parallax mapping. In In Proceedings of the ICAT 2001 (2001), pp. 205-208.

Loop C., Blinn J.: Resolution Independent Curve Rendering using Programmable Graphics Hardware. ACM Transactions on Graphics; Jul. 2005; https://doi.org/10.1145/1073204.1073303.

Lambert T., Benard P., Guennebaud G.: Multi-Resolution Meshes for Feature—Aware Hardware Tessellation. In Computer Graphics Forum (2016), vol. 35, Wiley Online Library, pp. 253-262.

Lambert T., Benard P., Guennebaud G.: A View-Dependent Metric for Patch-Based LOD Generation 8 Selection. Proceedings of the ACM on Computer Graphics and Interactive Techniques 1, 1 (Jul. 2018), 1-21. URL: http://dl.acm.org/citation.cfm?doid 3242771.3203195, doi:10. 1145/3203195.

McGuire M., McGuire M.: Steep parallax mapping. I3D 2005 Poster (2005). URL: http://www.cs.brown.edu/research/graphics/games/SteepParallax/index.html.

Nehab D., Hoppe H.: Random-access rendering of general vector graphics. ACM Transactions on Graphics 27, 5 (Dec. 2008), 1. URL: http://portal.acm.org/citation.cfm?doid=1409060.1409088, doi:10.1145/1409060.1409088.

Niessner M., Keinert B., Fisher M., Stamminger M., Loop C., Schafer H.: Real-time rendering techniques with hardware tessellation. Comput. Graph. Forum 35, 1 (Feb. 2016), 113-137. URL: https://doi.org/10.1111/cgf.12714, doi: 10.1111/cgf.12714.

Niessner M., Loop C.: Analytic displacement mapping using hardware tessellation. ACM Transactions on Graphics 32, 3 (Jun. 2013), 1-9. URL: http://dl.acm.org/citation.cfm?doid=2487228.2487234, doi:10. 1145/2487228.2487234.

Oh K., Ki H., Lee C.-H.: Pyramidal displacement mapping: A gpu based artifacts-free ray tracing through an image pyramid, Jan. 2006.

Patney A., Ebeida M. S., Owens J. D.: Parallel view-dependent tessellation of Catmull-Clark subdivision surfaces. In Proceedings of the 1st ACM conference on High Performance Graphics—HPG '09 (New Orleans, Louisiana, 2009), ACM Press, p. 99. URL: http://portal.acm.org/citation.cfm?doid=1572769.1572785, doi:10.1145/1572769.1572785.

Parilov E., Zorin D.: Real-time rendering of textures with feature curves. ACM Transactions on Graphics 27, 1 (Mar. 2008), 1-15. URL: http://portal.acm.org/citation.cfm?doid=1330511.1330514, doi:10.1145/1330511.1330514.

Ramanarayanan G., Bala K., Walter B.: Feature-Based Textures. 2004; URL: http://www.graphics.cornell.edu/pubs/2004/RBW04.pdf.

Reshetov A., Luebke D.: Infinite Resolution Textures.; HPG '16: Proceedings of High Performance GraphicsJun. 2016 pp. 139-150; https://www.researchgate.net/publication/303939596.

Ray N., Neiger T., Levy B., Cavin X.: Vector Texture Maps on the GPU; Jul. 2008.

Sen P.: Silhouette maps for improved texture magnification. In Proceedings of the ACM SIGGRAPH/Eurographics conference on Graphics hardware (2004), ACM, pp. 65-73.

Szirmay-Kalos L., Umenhoffer T.: Displacement Mapping on the GPU—State of the Art. Computer Graphics Forum 27, 6 (Sep. 2008), 1567-1592. URL: http://doi.wiley.com/10.1111/j. 1467-8659.2007.01108.x, doi:10. 1111/j.1467-8659.2007.01108.x.

Schaefer H., Prus M., Meyer Q., Suessmuth J., Stamminger M.: Multiresolution Attributes for Hardware Tessellated Objects. IEEE Transactions on Visualization and Computer Graphics 19, 9 (Sep. 2013), 1488-1498. URL: http://ieeexplore.ieee.org/document/6470610/ doi:10.1109/TVCG.2013.44.

Schwarz M., Stamminger M.: Fast GPU-based Adaptive Tessellation with CUDA. Computer Graphics Forum 28, 2 (Apr. 2009), 365-374. URL: http://doi.wiley.com/10.1111/j. 1467-8659.2009.01376.x, doi:10. 1111/j.1467-8659.2009.01376.x.

Tatarchuk N.: Practical dynamic parallax occlusion mapping. In ACM SIGGRAPH 2005 Sketches (New York, NY, USA, 2005), SIGGRAPH '05, ACM. URL: http://doi.acm.org/10.1145/1187112.1187240, doi:10.1145/1187112.1187240.

Tatarchuk N.: Practical parallax occlusion mapping with approximate soft shadows for detailed surface rendering. In ACM SIGGRAPH 2006 Courses (New York, NY, USA, 2006), SIGGRAPH '06, ACM, pp. 81-112. URL: http://doi. acm.org/10.1145/1185657.1185830, doi:10.1145/1185657.1185830.

Tumblin J., Choudhury P.: Bixels: Picture samples with sharp embedded boundaries. In Rendering Techniques (2004), pp. 255-264.

Tarini M., Cignoni P.: Pinchmaps: textures with customizable discontinuities: Pinchmaps. Computer Graphics Forum 24, 3 (Sep. 2005), 557-568. URL: http://doi.wiley.com/10.1111/j. 1467-8659.2005.00881.x, doi:10. 1111/j.1467-8659.2005.00881.x.

Technologies A.: Truform White Paper, May 2001; https://web.archive.org/web/20010612063404/http://www.ati.com/na/pages/technology/hardware/truform/truform_white_paper.html).

Welsh T., Corporation I.: Parallax mapping with offset limiting: A perpixel approximation of uneven surfaces, 2004.

Yerex K., Jagersand M.: Displacement mapping with ray-casting in hardware. In ACM SIGGRAPH 2004 Sketches (New York, NY,

(56) References Cited

OTHER PUBLICATIONS

USA, 2004), SIGGRAPH '04, ACM, pp. 149-. URL: http://doi.acm.org/10.1145/1186223.1186410, doi:10.1145/1186223.1186410.
H. Moreton: Watertight tessellation using forward differencing. In Proceedings of Graphics Hardware, 2001.
C. Green: Improved alpha-tested magnification for vector textures and special effects, in ACM SIGGRAPH 2007 courses, 2007.
Vlachos, J. Peters, C. Boyd, and J.L. Mitchell: Curved PN Triangles. In Proceedings of the symposium on Interactive 3D Graphics, 2001.
R.L. Cook: Shade Trees. SIGGRAPH Comput. Graph., 1984.
Othmani et. al., 3D Geometric salient patterns analysis on 3D meshes, Jun. 18, 2019, arXiv:1906.07645v1, pp. 1-23 (Year: 2019).
U.S. Appl. No. 16/953,805, Jun. 15, 2021, Preinterview 1st Office Action.
U.S. Appl. No. 16/953,805, Aug. 2, 2021, 1st Action Office Action.
U.S. Appl. No. 16/953,805, Nov. 2, 2021, Notice of Allowance.
U.S. Appl. No. 16/953,829, Jan. 21, 2022, Preinterview 1st Office Action.
U.S. Appl. No. 16/953,829, Mar. 9, 2022, 1st Action Office Action.
U.S. Appl. No. 16/953,829, Oct. 20, 2022, Notice of Allowance.
U.S. Appl. No. 17/590,702, Oct. 5, 2022, Office Action.
U.S. Appl. No. 17/590,702, Jan. 11, 2023, Notice of Allowance.

\* cited by examiner

RENDERING THREE-DIMENSIONAL OBJECTS UTILIZING SHARP TESSELLATION

CROSS-REFERENCE TO RELATED APPLICATIONS

This application is a continuation of U.S. application Ser. No. 16/953,829, filed on Nov. 20, 2020. The aforementioned application is hereby incorporated by reference in its entirety.

BACKGROUND

Recent years have seen a rapid increase in the use of computer graphics. In particular, digital content generated through the use of computer graphics techniques are increasingly utilized for a variety of applications (e.g., video games, videos such as animated films, and/or object libraries used in software tools of architecture, industrial design, video game development, virtual reality, augmented reality, and/or animation development). One such computer graphics technique is the use of tessellation and displacement map textures within a graphical processing unit (GPU) pipeline to create computer-generated textures and three-dimensional (3D) objects having detailed surface features.

As an example, while rendering 3D graphics objects in real time, the geometry of a 3D object can be decomposed into a macrostructure that defines a general shape of the 3D object through a polygon-based mesh, a microstructure having microgeometry that represents reflective properties of the 3D object (such as a Bidirectional Reflectance Distribution Function), and a mesostructure having high frequency details stored as surface offsets in a displacement map texture that form visible features of the 3D object. To generate a 3D object, many conventional graphics systems utilize a dedicated tessellation unit, on a GPU, controlled by programmable shaders to subdivide a 3D-object mesh according to a tessellation pattern with positions of vertices being reconstructed along a normal direction from a displacement map. By utilizing a displacement map texture, many conventional systems achieve surface normal offsets representing depth and detail on surfaces of complex output 3D objects (in large scenes).

Despite recent advancements in utilizing displacement maps within 3D-object meshes, many conventional graphics systems that utilize tessellation with displacement maps have a number of shortcomings with regard to accurately, efficiently, and flexibly rendering detailed displacement features on surfaces of complex 3D objects. For example, many conventional graphics systems fail to reproduce accurate sharp features within textures using displacement maps and tessellation. More specifically, conventional graphics systems often result in visually noticeable geometric aliasing when using a tessellated 3D-object mesh with a displacement map. Indeed, in many conventional systems, the geometric aliasing results in a staircasing effect and/or visual artifacts along sharp features of a rendered 3D object. In some cases, the conventional systems also fail to accurately reproduce sharp features within textures using displacement maps due to interpolation filtering techniques that smooth out sharp features that are represented in displacement maps.

Additionally, many conventional systems utilize inefficient approaches in an attempt to improve the visual accuracy of rendered 3D object surfaces while using displacement maps with tessellation. For example, some conventional systems utilize ray marching algorithms to compute exact visible points (on a per-fragment basis). Such approaches are computationally costly in comparison to geometry-based approaches. However, conventional systems that utilize geometry-based approaches to improve the visual accuracy of rendered 3D object surfaces while using displacement maps are also oftentimes inefficient. As an example, conventional systems often load and maintain tessellation patterns corresponding to single triangular subdivisions within GPU memory and inefficiently require substantial memory space.

Moreover, many conventional systems utilize a parallel breadth-first traversal approach to iteratively parallelize a tessellation at a level of a single primitive. Such an approach requires a substantially large number of patches (faces) to exploit the parallelism capability of the GPU and, thus, the large number of patches utilize an inefficient amount of computational resources. In some instances, conventional systems inefficiently spend memory by utilizing a high level of tessellation to resolve aliasing without success. Finally, conventional graphics systems oftentimes oversample a displacement map during tessellation to improve accuracy, however oversampling is inefficient as it is costly within a GPU, does not scale, and nonetheless results in visually noticeable artifacts. In many cases, these inefficiencies substantially slow down a GPU pipeline rendering process (e.g., to result in a lower refresh rate of real-time applications).

In addition, many conventional graphics systems are rigid while using displacement maps with tessellation. For example, many conventional systems preprocess a displacement texture to extract sharper features, but this excludes the preprocessed displacement texture from utilization in many real-time applications. Additionally, some conventional systems utilize curved surfaces to subdivide input triangles in an attempt to amplify the geometry. However, the utilization of curved surfaces require input models with a specific criterion to avoid visual problems on rendered objects. Moreover, the above-mentioned parallel breadth-first traversal approach requires a substantially large number of patches (faces) and is un-useable on lower quantities of patches (faces) in object meshes.

Furthermore, to improve accuracy, conventional graphics systems sometimes have a tessellation unit storing displacements as smooth analytic functions (within a GPU-friendly, multi-resolution tile-based texture). These formats are limited to smooth surfaces and fail to apply to non-smooth surfaces. Moreover, in some conventional systems, a bijective mapping between generated vertices during tessellation and their attributes are used to redistribute generated vertices at each level of tessellation in a strip-based simplification algorithm that aims to preserve features of a 3D mode. However, such an approach is significantly dependent on the availability of an initial highly tessellated mesh and, in some cases, the strip-based simplification algorithm fails to preserve the features of the 3D model. Furthermore, these conventional systems oftentimes require a number of non-trivial GPU pipeline modifications to implement the approaches.

SUMMARY

This disclosure describes one or more embodiments of systems, non-transitory computer readable media, and methods that solve one or more of the foregoing problems in addition to providing other benefits. In particular, the disclosed systems modify vertex positions during tessellation to align the vertices with discontinuities indicated by a sharpness map. For example, the disclosed systems access a sharpness map that encodes discontinuities on a per-texel basis for use with a displacement map to preserve sharp features while applying a texture to a 3D object. During tessellation, for a given vertex, the disclosed systems iterate over neighboring vertices to search for a nearest intersection between one of the incident edges of the vertex and neighboring vertices and a discontinuity line from the sharpness map. Upon identifying the nearest discontinuity line intersection, the vertex is snapped (or moved) within a threshold distance of the nearest discontinuity line intersection along the incident edge. The disclosed systems similarly identify discontinuity line intersections for other vertices and reposition the vertices to generate a modified 3D-object mesh that includes vertices (and corresponding faces) that align with discontinuities indicated by the sharpness map. By utilizing sharp tessellation to generate the modified 3D-object mesh, the disclosed systems efficiently render a 3D object that accurately depicts sharp surface features (from the displacement map) without geometrical aliasing artifacts while using a single-pass GPU pipeline in real time.

BRIEF DESCRIPTION OF THE DRAWINGS

The detailed description is described with reference to the accompanying drawings in which.

DETAILED DESCRIPTION

Figure 1:
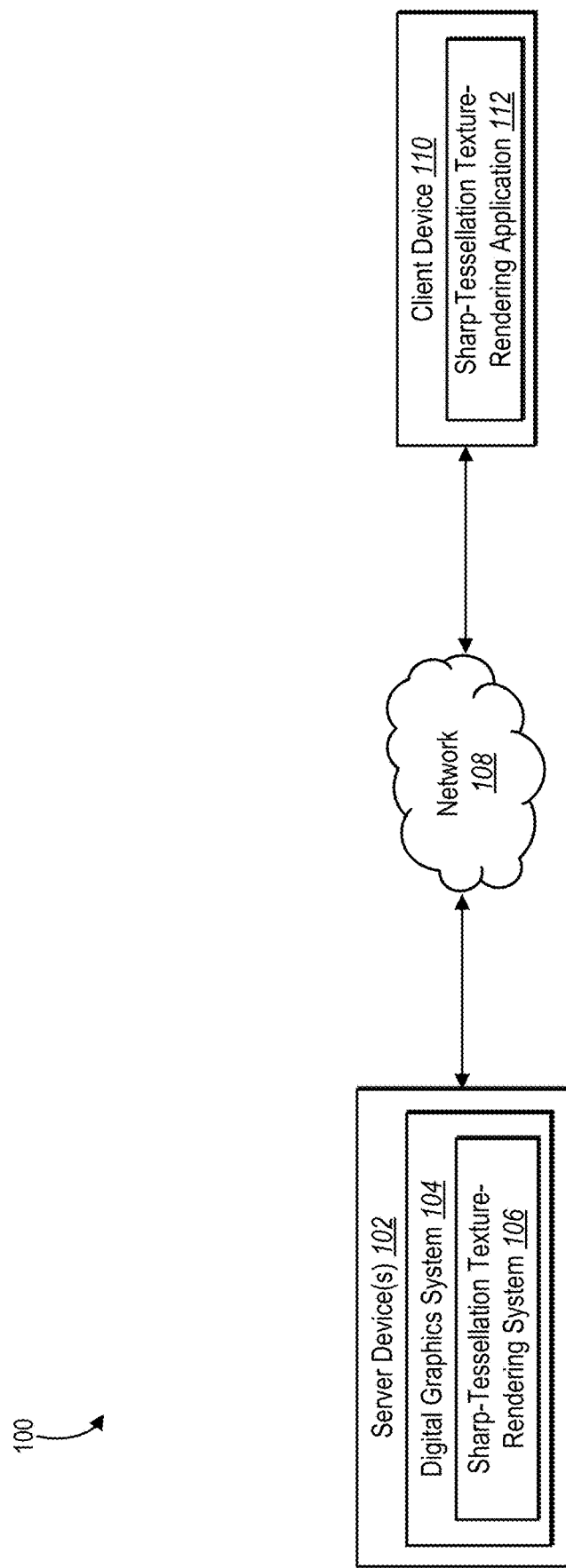
FIG. 1 illustrates a schematic diagram of an example system in which a sharp-tessellation texture-rendering system can operate in accordance with one or more embodiments.

The disclosure describes one or more embodiments of a sharp-tessellation texture-rendering system that modifies vertex positions to align the vertices with features of a displacement map that are indicated by discontinuities of a sharpness map while reconstructing high resolution features during the GPU tessellation stages of a real-time graphics pipeline. For example, the sharp-tessellation texture-rendering system accesses a set of vertices and edges, dictated by a tessellation pattern, that form faces of a 3D model. Furthermore, the sharp-tessellation texture-rendering system accesses a two-dimensional (2D)-sharpness map having a set of discontinuity lines that correspond to a 2D-displacement map. Subsequently, in one or more embodiments, the sharp-tessellation texture-rendering system identifies, for a given vertex, a discontinuity line intersection between a discontinuity line from the 2D-sharpness map and an incident edge between the vertex and a neighbor vertex. Upon identifying the discontinuity line intersection, in certain instances, the sharp-tessellation texture-rendering system modifies a position of the vertex based on a position of the discontinuity line intersection. In some embodiments, the sharp-tessellation texture-rendering system modifies the position of the vertex based on a position of a nearest discontinuity line intersection. Finally, after modifying vertex positions of a number of applicable vertices during tessellation of the 3D-object mesh, the sharp-tessellation texture-rendering system generates a 3D object utilizing the modified 3D-object mesh (with the displacement map and sharpness map).

As mentioned above, in certain instances, the sharp-tessellation texture-rendering system utilizes a 2D-sharpness map. In some embodiments, the sharp-tessellation texture-rendering system generates a 2D-sharpness map. For example, the sharp-tessellation texture-rendering system generates a 2D-sharpness map that includes texels encoded with one or more discontinuity lines corresponding to discontinuities of a displacement map. Indeed, in certain instances, the sharp-tessellation texture-rendering system generates the sharpness map with infinite resolution discontinuity configurations (e.g., discontinuity points and lines) that are referenced to control filtering (e.g., via interpolation) of a displacement map such that sharp features within the displacement map are not lost (due to smoothing during interpolation).

In some embodiments, the sharp-tessellation texture-rendering system, during tessellation, identifies one or more discontinuity line intersections between one or more discontinuity lines of the 2D-sharpness map and incident edges of a given vertex. For instance, the sharp-tessellation texture-rendering system, during rendering in a GPU pipeline to synthesize a 3D object, subdivides each patch of a coarse 3D-object mesh according to a tessellation pattern (e.g., patterns made by creating vertices on a 3D-object mesh to repeat a polygon such as a triangle). For each vertex during tessellation, in one or more embodiments, the sharp-tessellation texture-rendering system retrieves neighbor vertices (e.g., positional information for the vertices) corresponding to the given vertex. Then, the sharp-tessellation texture-rendering system iteratively traverses incident edges between the vertex and each neighbor vertex to identify one or more positions at which the incident edges intersect discontinuity lines from a relevant texel of the 2D-sharpness map. In some instances, the sharp-tessellation texture-rendering system identifies the first intersection between an incident edge from the vertex to a given neighbor vertex and a discontinuity line (e.g., as the discontinuity line intersection for the incident edge).

Furthermore, in one or more embodiments, the sharp-tessellation texture-rendering system generates a modified 3D-object mesh by modifying positions of one or more vertices dictated by the tessellation pattern. For instance, during tessellation, the sharp-tessellation texture-rendering system modifies positions of vertices based on positions of discontinuity line intersections corresponding to the incident edges of the vertices. As an example, for the above-mentioned vertex, the sharp-tessellation texture-rendering system modifies a position of the vertex to be within a threshold distance of the position of the discontinuity line intersection identified for the incident edge of the vertex. In some cases, when a vertex has multiple incident edges (with different neighboring vertices) that include discontinuity line intersections, the sharp-tessellation texture-rendering system modifies the position of the vertex to be within a threshold distance of the nearest discontinuity line intersection position. In one or more additional embodiments, the sharp-tessellation texture-rendering system subdivides incident edges of vertices based on identified discontinuity line intersections with a sharpness map to generate a modified 3D-object mesh (e.g., using a sharp subdivision approach).

In one or more embodiments, the sharp-tessellation texture-rendering system modifies vertex positions (or subdivides incident edges) based on identified discontinued line intersections for each applicable vertex to generate the modified 3D-object mesh. By doing so, in some instances, the sharp-tessellation texture-rendering system generates a modified 3D-object mesh that includes faces having vertices that align with (or follow) discontinuities indicated in a sharpness map. Subsequently, in some embodiments, the sharp-tessellation texture-rendering system generates a 3D object utilizing the modified 3D-object mesh by filtering 2D-displacement feature values of a 2D-displacement map within faces (of the modified 3D-object) created by the modified vertices positioned along discontinuities of the 2D-sharpness map. Indeed, in one or more embodiments, the resulting 3D object depicts sharp and detailed features on the 3D object's surface without visible geometric aliasing.

The disclosed sharp-tessellation texture-rendering system provides a number of advantages over conventional systems. For instance, by utilizing an adaptive tessellation approach that moves (or snaps) vertices of a 3D-object mesh to discontinuities indicated within a sharpness map, the sharp-tessellation texture-rendering system accurately preserves sharp features without introducing visual artifacts. For instance, the sharp-tessellation texture-rendering system utilizes bilinear interpolation without resulting in smooth features in place of sharp features where discontinuities exist (due to the sharpness map) while also avoiding the introduction of geometric aliasing along the discontinuities (by moving one or more vertices of the 3D-object mesh along the discontinuities). In addition, in certain instances, sharp-tessellation texture-rendering system also prevents visual cracks in a generated 3D-object surface by utilizing sharp tessellation. Consequently, the sharp-tessellation texture-rendering system is able to render 3D objects from displacement textures that depict accurate and sharp surfaces without visually noticeable aliasing effects.

Furthermore, in contrast to conventional systems, the sharp-tessellation texture-rendering system accurately generates surfaces of 3D objects with detailed sharp features without inefficiently utilizing computational resources. For instance, the sharp-tessellation texture-rendering system does not apply a displacement map on a per-fragment basis using a form of ray casting along the view direction and instead utilizes the geometry features of a programmable (optionally hardware) tessellation unit to achieve sharp features without aliasing effects. As such, in certain instances, the sharp-tessellation texture-rendering system avoids computationally costly per-fragment application of the displacement map by utilizing a geometry-based approach.

Furthermore, unlike many conventional systems that require a significant number of 3D-object mesh faces (or a high level of tessellation) to gain minute improvements in accuracy, the sharp-tessellation texture-rendering system modifies positioning of a varying number of vertices to align faces along discontinuities of a sharpness map to remove visual defects. As such, the sharp-tessellation texture-rendering system does not require a substantial number of 3D-object mesh faces to accurately generate surfaces that depict surface normal offsets on a 3D-object. Thus, the sharp-tessellation texture-rendering system utilizes less processing and memory resources compared to conventional systems that require significant number of 3D-object mesh faces. Moreover, unlike conventional systems that over sample a displacement map, the sharp-tessellation texture-rendering system more efficiently samples from the displacement map using the modified vertices that account for discontinuities in the displacement map. Accordingly, the sharp-tessellation texture-rendering system is less costly within a GPU and is capable of scaling while generating accurate 3D objects. Due to the efficiency of the sharp-tessellation texture-rendering system, in some embodiments, the sharp-tessellation texture-rendering system renders 3D objects that accurately depict sharp surface features (from the 2D-displacement map) without geometrical aliasing artifacts while using a single-pass GPU pipeline in real time (e.g., at high refresh rates in real-time applications).

In addition to being accurate and efficient, the sharp-tessellation texture-rendering system is also flexible and applicable in a wide variety of use cases in comparison to conventional graphics systems. For example, unlike many conventional systems, the sharp-tessellation texture-rendering system is able to generate 3D-objects with sharp features (quickly) in real time due to the conservative memory requirement of the sharpness map and without preprocessing a 2D-displacement map. Furthermore, in contrast to some conventional systems that require input models in a specific manner when utilizing curved surfaces for subdivision, the sharp-tessellation texture-rendering system utilizes a lightweight vertex modification approach that is compatible with a variety of input models (e.g., models that have both smooth and non-smooth surfaces). In addition, in one or more embodiments, the sharp-tessellation texture-rendering system is compatible with many standard GPU pipelines and, due to this compatibility, the sharp-tessellation texture-rendering system is able to fully utilize resources of GPU texture units when rendering 3D objects without having to introduce significant configuration changes to standard GPU pipelines. Moreover, unlike conventional systems that require initially high quality tessellated meshes to preserve features of the model, the sharp-tessellation texture-rendering system, in some instances, renders 3D objects that preserve sharp features without visual aliasing effects in a broad range of qualities from input tessellated meshes (e.g., with high or low tessellation rates).

Turning now to the figures, FIG. 1 illustrates a schematic diagram of one embodiment of a system 100 (or environment) in which a sharp-tessellation texture-rendering system 106 can operate in accordance with one or more embodiments. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a digital graphics system 104 which further includes the sharp-tessellation texture-rendering system 106. For instance, the server device(s) 102 includes, but is not limited to, a computing (or computer) device (as explained below with reference to FIG. 15). In one or more embodiments, the sharp-tessellation texture-rendering system 106 utilizes a 2D-displacement map. A 2D-displacement map (sometimes referred to as displacement map) refers to a texture or channel that stores feature values corresponding to surface normal offsets. In particular, in some embodiments, a displacement map includes a texture with a representation of one or more feature values for a surface that reflect varying magnitudes of surface normal offsets (e.g., a height). A feature value of a displacement map includes a data representation that represents a normal offset (e.g., a height). For instance, a feature value comprises a numerical and/or color value corresponding to a normal offset. For example, a displacement map includes scalar values (e.g., between 0 and 1 or between −1 and 1) or a full float value range that reflects a magnitude of surface normal offsets that are positioned in a texture to indicate at which position to introduce a normal offset and the appropriate amount of offset according to the value.

In one or more embodiments, the sharp-tessellation texture-rendering system 106 is illustrated utilizing a displacement map includes grayscale color values (e.g., from black to white) reflecting magnitudes of surface normal offsets that are positioned in a texture to indicate at which position to introduce a normal offset and the appropriate amount of offset according to the grayscale color value (e.g., black resulting in 0 offset and white resulting in a maximum offset). Thus, a surface normal offset is a change in height (or a total height) of a surface (of a texture) in a normal direction (e.g., normal to the surface represented by the texture). Although one or more embodiments illustrate utilizing a grayscale color value-based displacement map, in some embodiments, the sharp-tessellation texture-rendering system 106 utilizes a variety of displacement maps including displacement maps that represent surface offsets as scalar values and/or full float value range.

A texture comprises a digital representation of a surface of a graphical object (e.g., a 3D-object polygonal mesh, a 3D object). For instance, a texture includes a set of mathematical (and/or algorithmic) information that renders or maps onto graphical objects and/or materials of varying sizes (e.g., textures created at runtime in a GPU pipeline). In some embodiments, a texture includes specific graphical information (e.g., color, patterns, shapes, visual illustrations, visual parameters) that map to a 3D-object mesh or 3D object (e.g., in real time).

In one or more embodiments, the sharp-tessellation texture-rendering system 106 generates, for a displacement map, a 2D sharpness map that includes discontinuities present within the displacement map in accordance with one or more embodiments. A 2D-sharpness map (sometimes referred to as a "sharpness map") comprises one or more texels that represent discontinuities present within a corresponding displacement map. For example, a sharpness map includes one or more texels encoded with one or more discontinuity points and base discontinuity configurations that form one or more discontinuity lines (or edges) within the texels. Furthermore, in some embodiments, the sharp-tessellation texture-rendering system utilizes the discontinuity lines of the sharpness map to filter a displacement map such that discontinuities between feature values of the displacement map are preserved (e.g., discontinuities along differing feature values). Generating and utilizing a sharpness map is described in greater detail below (e.g., in relation to FIGS. 3 and 4).

In addition, a 3D-object mesh (sometimes referred to as a "polygonal mesh") refers to a representation of one or more vertices, edges, and faces that define a shape of a 3D-object. For instance, a 3D-object mesh includes a set of vertices in a 3D space that are connected to form edges and faces that define a shape of a 3D-object. In one or more embodiments, the 3D-object mesh includes triangular polygons that form a shape of a 3D-object. Furthermore, in some instances, the sharp-tessellation texture-rendering system applies textures to the faces formed by vertices and edges of a 3D-object mesh to provide visual attributes to the surfaces (of the faces) of the 3D-object mesh. In some embodiments, a 3D-object mesh is generated by applying tessellation on a coarse mesh (e.g., sometimes referred to as a "base mesh" or a "control mesh").

Additionally, in one or more embodiments, a vertex represents a position in a spatial coordinate (e.g., barycentric coordinate, Cartesian coordinate) that corresponds to a point of a line (or edge) (e.g., to form a corner of a patch or face of a 3D-object mesh). Furthermore, in some embodiments, an (incident) edge represents a line segment joined by multiple vertices. Furthermore, in one or more embodiments, the sharp-tessellation texture-rendering system 106 defines a position of a vertex by utilizing barycentric coordinates. For example, barycentric coordinates represent a location of a vertex by utilizing scalar values that indicate a relative position of a vertex in relation to a face (or primitive) of a 3D-object mesh.

In some instances, the sharp-tessellation texture-rendering system 106 tessellates a 3D-object mesh by applying (or adding) various vertices within the 3D-object mesh to increase a number of polygons (e.g., triangular polygons) that form a shape of a 3D-object. For example, the sharp-tessellation texture-rendering system 106 performs tessellation on a 3D-object by splitting strips of vertices to create (or generate) new vertices in which the vertices move progressively (in a pattern) to form a next level of tessellation. Indeed, in some embodiments, the sharp-tessellation texture-rendering system 106 performs tessellation on a 3D-object mesh by subdividing patches (or faces) of the 3D-object mesh through the introduction of additional vertices.

In one or more embodiments, the sharp-tessellation texture-rendering system 106 modifies vertex positions during tessellation to align the vertices with features of a displacement map that are indicated by discontinuities of a sharpness map. For instance, the sharp-tessellation texture-rendering system 106 identifies, for a given vertex, one or more discontinuity line intersections between discontinuity lines from the sharpness map and incident edges between the vertex and one or more neighbor vertices. Upon identifying the one or more discontinuity line intersections, in some embodiments, the sharp-tessellation texture-rendering system 106 modifies a position of the vertex based on a position of a nearest discontinuity line intersection to generate a modified 3D-object mesh. Indeed, in one or more embodiments, the sharp-tessellation texture-rendering system 106 modifies a position of a number of applicable vertices based on potential discontinuity line intersections corresponding to incident edges of the number of applicable vertices to generate the modified 3D-object mesh.

Moreover, in some embodiments, the sharp-tessellation texture-rendering system 106 utilizes the sharpness map to filter the displacement map to generate a filtered 2D-displacement texture that preserves sharp features during rendering of a 3D object in accordance with one or more embodiments. A filtered 2D-displacement texture comprises a displacement representation of a surface of a graphical object. For example, a filtered 2D-displacement texture includes a texture generated from sampling and filtering a displacement map (using a sharpness map) to map to the modified (coarse) 3D-object mesh of a rendered 3D object. In particular, in some embodiments, a filtered 2D-displacement texture includes a texture generated from a displacement map using a sharpness map to apply a pattern of the displacement map on a 3D-object mesh of varying sizes (that is modified with repositioned vertices in accordance with one or more embodiments). In some instances, the sharp-tessellation texture-rendering system 106 also displays a 3D object rendered using a filtered displacement texture on the modified 3D-object mesh on a graphical user interface of the client device 110 (e.g., via the sharp-tessellation texture-rendering application 112).

Furthermore, as shown in FIG. 1, the system includes the client device 110. In one or more embodiments, the client device 110 includes, but is not limited to, a mobile device (e.g., smartphone, tablet), a laptop, a desktop, or any other type of computing device, including those explained below with reference to FIG. 15. In certain instances, although not shown in FIG. 1, the client device 110 is operated by a user to perform a variety of functions (e.g., via a sharp-tessellation texture-rendering application 112). For example, the client device 110 performs functions such as, but not limited to, creating, storing, uploading, modifying, and/or displaying displacement maps, sharpness maps, 3D-object meshes, and/or 3D objects (or other digital content such as images and videos). Moreover, as shown in FIG. 1, the client device 110 communicates with the server device(s) 102 via the network 108.

In some embodiments, the client device 110 displays, within a graphical user interface, a 3D object rendered using a GPU pipeline. For instance, the client device displays a 3D object rendered using a displacement texture based on a sharpness map with a modified 3D-object mesh that includes vertices repositioned along discontinuities indicated by the sharpness map (e.g., sharp tessellation). In some instances, the client device 110 also displays, within a graphical user interface, a displacement map to receive user selections within the displacement map (e.g., via a user input tool) that indicate discontinuities within the displacement map. Indeed, in one or more embodiments, the sharp-tessellation texture-rendering system 106 utilizes the received user selections to generate a sharpness map for the displacement map.

To access the functionalities of the sharp-tessellation texture-rendering system 106 (as described above), in certain embodiments, a user interacts with the sharp-tessellation texture-rendering application 112 on the client device 110. For example, the sharp-tessellation texture-rendering system 106 includes one or more software applications (e.g., to generate a sharpness map or render a 3D object in accordance with one or more embodiments herein) installed on the client device 110. In some embodiments, the sharp-tessellation texture-rendering application 112 is hosted on the server device(s) 102. In addition, when hosted on the server device(s) 102, the sharp-tessellation texture-rendering application 112 is accessed by the client device 110 through web browser and/or another online interfacing platform and/or tool.

Although FIG. 1 illustrates the sharp-tessellation texture-rendering system 106 being implemented by a particular component and/or device within the system 100 (e.g., the server device(s) 102), in some embodiments the sharp-tessellation texture-rendering system 106 is implemented, in whole or in part, by other computing devices and/or components in the system 100. For instance, in some embodiments, the sharp-tessellation texture-rendering system 106 is implemented on the client device 110. In particular, in some embodiments, the client device 110 generates a sharpness map for a displacement in accordance with one or more embodiments. Furthermore, in certain embodiments, the client device 110 (e.g., desktop or laptop computer, smartphone, tablet) utilizes the displacement map with the sharpness map and with a modified 3D-object mesh that includes vertices repositioned along discontinuities indicated by the sharpness map (e.g., sharp tessellation) in a GPU pipeline to generate a 3D object that preserves sharp features of the displacement map in accordance with one or more embodiments directly on the client device 110.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 15. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

Figure 2:
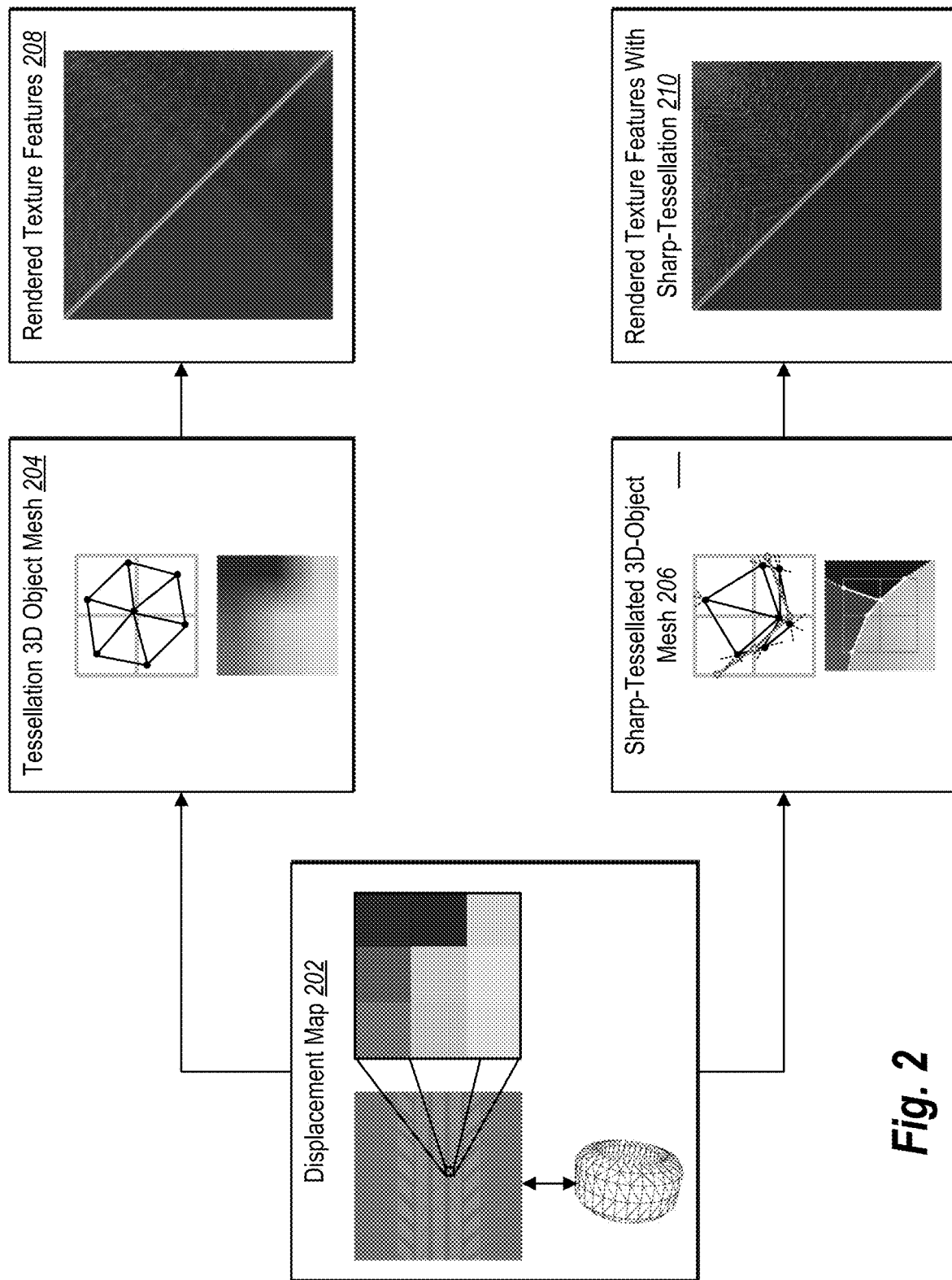
FIG. 2 illustrates an overview of a sharp-tessellation texture-rendering system rendering a 3D object utilizing sharp tessellation in accordance with one or more embodiments.

As previously mentioned, in one or more embodiments, the sharp-tessellation texture-rendering system 106 modifies vertex positions of a 3D-object mesh to align the vertices with features of a displacement map that are indicated by discontinuities of a sharpness map. For instance, FIG. 2 illustrates an overview of the sharp-tessellation texture-rendering system 106 utilizing a sharp tessellation with snapping vertices to render a 3D object in comparison to utilizing a conventional approach (with tessellation and a displacement map) to render a 3D object. As shown in FIG. 2, utilizing sharp tessellation with a displacement map and a sharpness map results in a 3D object having accurate depth and detail of displaced, sharp features on the surface of the 3D object (without visual geometrical aliasing).

Indeed, as illustrated in FIG. 2, a displacement map 202 includes feature values that correspond to surface normal offsets for a 3D-object mesh. More specifically, as shown in FIG. 2, the displacement map 202 includes grayscale color values that reflect varying magnitudes of surface normal offsets for a 3D-object mesh to create features on a surface of a 3D object. As an example, as shown in FIG. 2, the displacement map 202 includes grayscale color values (e.g., between a range of color values representing white, various gray colors, and black) that create surface normal offsets (e.g., differences in surface heights) to represent a tire tread pattern on the 3D-object mesh depicting a shape of a tire. To illustrate, the displacement map 202 causes a GPU pipeline to render visual attributes (e.g., materials, colors) of a texture at a greater height at locations of the displacement map that correspond to texels having lighter color values (e.g., white) while rendering visual attributes of a texture at a lesser height at locations of the displacement map that correspond to texels having darker color values (e.g., black).

Although FIG. 2 illustrates a grayscale color value-based displacement map, in some embodiments, the sharp-tessellation texture-rendering system 106 utilizes a variety of displacement maps including displacement maps that represent surface offsets as scalar values and/or full float value range (as described above). Indeed, in some instances, a scale value-based displacement map causes a GPU pipeline to render visual attributes of a texture at a greater height at locations of the displacement map that corresponds to texels having larger scalar values while rendering visual attributes of a texture at a lesser height at locations of the displacement map that correspond to texels having smaller scalar values.

As shown in FIG. 2, in a conventional approach, a conventional system can access the displacement map 202 for a 3D object mesh and filter the displacement map using bilinear filtering with a tessellated 3D-object mesh 204. As shown in FIG. 2, utilizing bilinear filtering on the displacement map 202 with the tessellated 3D-object mesh 204 often smooths out sharp features represented in the displacement map 202 and, moreover, the resulting rendered texture features 208 of a 3D object also include smooth surface features instead of accurate depth and detail of the displaced features on the surfaces of the 3D object.

As further shown in FIG. 2, unlike the conventional approach, the sharp-tessellation texture-rendering system 106 utilizes a sharpness map to preserve sharp features from the displacement map 202 utilizing a sharp-tessellated 3D-object mesh 206. As illustrated in FIG. 2, the sharpness map encodes discontinuities of the displacement map 202. As shown in FIG. 2, the sharp-tessellation texture-rendering system 106 utilizes the displacement map 202 and the sharpness map to generate a sharp-tessellated 3D-object mesh 206.

Then, as shown in FIG. 2, the sharp-tessellation texture-rendering system 106 aligns the tessellated vertices of the 3D-object mesh to the discontinuity lines indicated by the sharpness map. By doing so, the sharp-tessellation texture-rendering system 106 preserves sharp features of a displacement map 202 and the resulting rendered texture features with the sharp tessellation 210 depicts an accurate depth and detail of the displaced, sharp features on the surfaces of the 3D object without having visual geometric aliasing effects.

Figure 3:
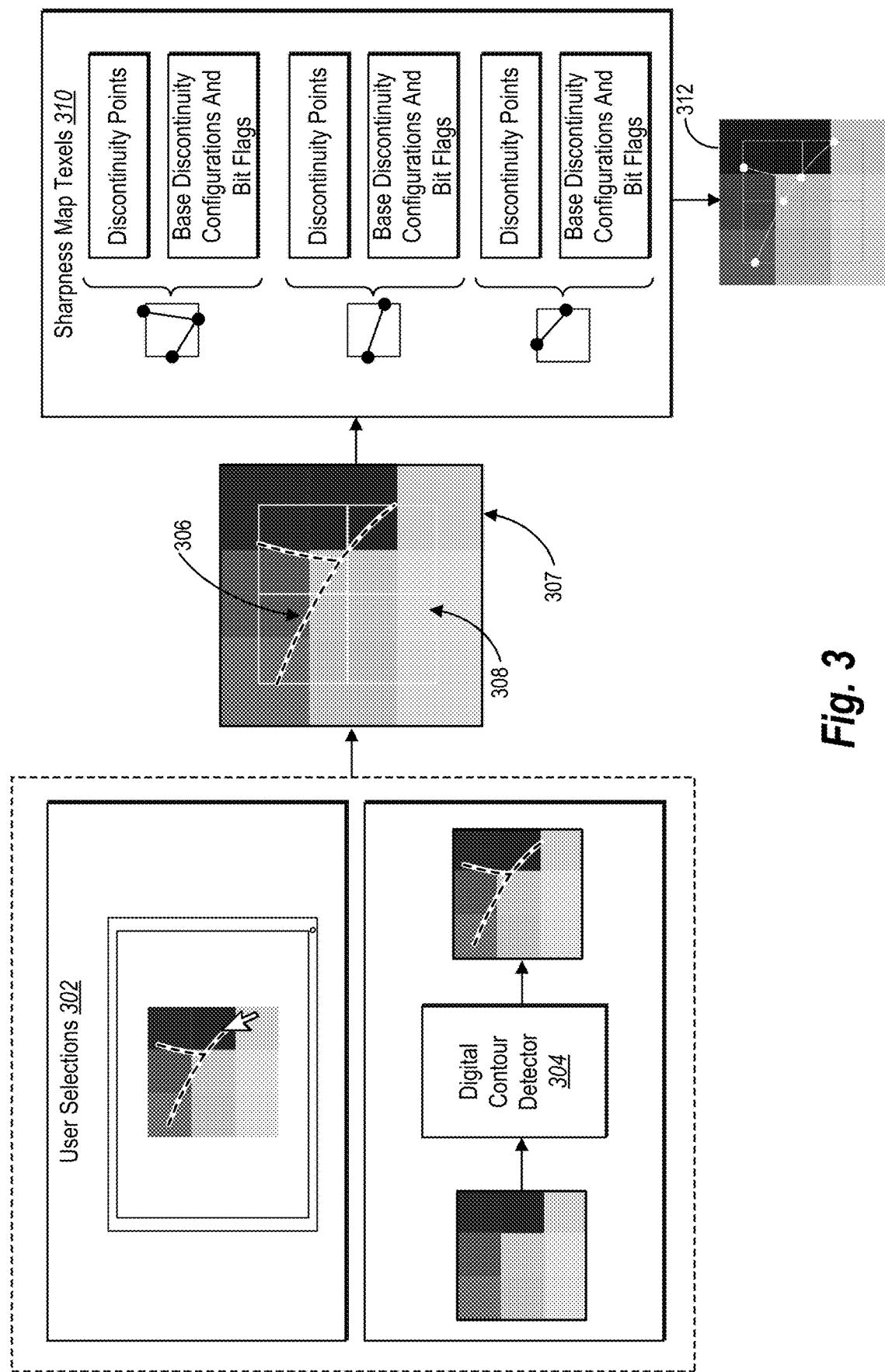
FIG. 3 illustrates a sharp-tessellation texture-rendering system generating a sharpness map in accordance with one or more embodiments.

As mentioned above, in one or more embodiments, the sharp-tessellation texture-rendering system 106 generates a sharpness map. For instance, FIG. 3 illustrates the sharp-tessellation texture-rendering system 106 generating a sharpness map that encodes discontinuities corresponding to a displacement map. As shown in FIG. 3, the sharp-tessellation texture-rendering system 106 receives (or identifies) discontinuity lines 306 within a displacement map 307 from user selections 302 and/or a digital contour detector 304. Then, as shown in FIG. 3, the sharp-tessellation texture-rendering system 106 utilizes the identified discontinuity lines 306 to generate sharpness map texels 310 for a sharpness map. A texel comprises to a fundamental unit of a texture. For instance, a texture includes arrays of texels as elements to represent a texture space. In one or more embodiments, a texel comprises a grouping of pixels. In particular, a texel can include a block of pixels such as a four-by-four (4×4) block of pixels. A graphic processing unit (GPU) can utilize a texture or texture map comprising a plurality of texels to mapped pixels from the texture image to a surface of an object (e.g., can wrap the texture around the object).

As shown in FIG. 3, the sharp-tessellation texture-rendering system 106 identifies one or more discontinuity points (using intersections with texel edges) from the discontinuity lines 306 and to generate the sharpness map texels 310. A discontinuity point comprises a point on an edge of a sharpness map texel to indicate a position at which a discontinuity line intersects the edge of the sharpness map texel. For instance, the sharp-tessellation texture-rendering system 106 encodes a discontinuity point within a sharpness map texel by encoding a positional value at a location on an edge of the sharpness map texel where a discontinuity (or discontinuity line) intersects (e.g., a texel edge length factor or an x and y coordinate value). Furthermore, as used herein, a discontinuity line (sometimes referred to as "discontinuity") comprises to a line (or edge) within a sharpness map texel between two or more discontinuity points on two or more edges of the sharpness map texel. In one or more embodiments, a discontinuity line within a sharpness map texel indicates a boundary (or sharp crease) to utilize in selectively filter feature values for a displacement map.

Indeed, as shown in FIG. 3, for each texel in the sharpness map texels 310, the sharp-tessellation texture-rendering system 106 encodes one or more discontinuity points (as positional vertices) and base discontinuity configurations with bit flags to indicate how to generate discontinuity lines between the one or more discontinuity points. In one or more embodiments, the sharp-tessellation texture-rendering system 106 encodes a base discontinuity configuration by setting a bit flag (e.g., setting a bit flag to 1) for a base discontinuity configuration that corresponds to the identified discontinuity line from the identified discontinuity lines 306 for each texel in the sharpness map texels 310. As further shown in FIG. 3, the sharp-tessellation texture-rendering system 106 utilizes the discontinuity points and base discontinuity configurations and bit flags encoded within the sharpness map texels 310 to generate the sharpness map 312.

As mentioned above and as shown in FIG. 3, in some instances, sharp-tessellation texture-rendering system 106 receives discontinuity lines for a displacement map based on user selections of one or more discontinuity lines (e.g., user selections 302). For instance, the sharp-tessellation texture-rendering system 106 displays, within a graphical user interface of a client device, a displacement map. Indeed, in some embodiments, the sharp-tessellation texture-rendering system 106 provides zooming capabilities for the displayed displacement map and displays the displacement map at various levels of detail based on the zoom magnification settings. For instance, as shown in FIG. 3, the sharp-tessellation texture-rendering system 106 displays the displacement map within a graphical user interface of a client device at a texel level (e.g., texels of the displacement map are viewable).

In some embodiments, the sharp-tessellation texture-rendering system 106 receives user interactions from the graphical user interface displaying the displacement map. For instance, the sharp-tessellation texture-rendering system 106 receives user selections within the displayed displacement map that identify user selected discontinuity lines for the displayed displacement map. In some embodiments, the sharp-tessellation texture-rendering system 106 detects, within the graphical user interface of the client device, user interactions signaling a drawing (or tracing) of a discontinuity line within the displacement map. For example, the user interactions include user interactions from user input tools such as, but not limited to, a cursor, a digital pen, and/or coordinate inputs (for vertex positions of discontinuity lines). In certain instances, the sharp-tessellation texture-rendering system 106 stores (or saves) positions of discontinuity lines, received from (or drawn by) a user interacting with the displayed displacement map, in reference to the displacement map.

In some embodiments, the sharp-tessellation texture-rendering system 106 detects, within the graphical user interface of the client device, user interactions signaling a selection of one or more discontinuity points within the displacement map. For instance, the sharp-tessellation texture-rendering system 106 receives user selections of points (or vertices) within the displayed displacement map. Then, in some embodiments, the sharp-tessellation texture-rendering system 106 connects the user selected points to form discontinuity lines for the displayed displacement map.

Indeed, in one or more embodiments, the sharp-tessellation texture-rendering system 106 receives user selected discontinuity lines (or points) received in reference to a displayed displacement map that create discontinuities (or separations) between differing feature values (e.g., visually noticeable differences between feature values of the displacement map). To illustrate as an example, the sharp-tessellation texture-rendering system 106 receives a user selection of a line (e.g., via a user drawing a line within a displayed displacement map) that draws a discontinuity line between a first set of feature values and a second set of feature values that cause a visual crease, cliff, border, or contrast within the displacement map (e.g., via grayscale color differences). In one or more embodiments, the received discontinuity lines are encoded within texels of a sharpness map (e.g., as discontinuity points and base discontinuity configurations with bit flags) by the sharp-tessellation texture-rendering system 106 as described in greater detail below.

As further mentioned above and as shown in FIG. 3, in some embodiments, the sharp-tessellation texture-rendering system 106 detects one or more discontinuity lines for a displacement map utilizing the digital contour detector 304. For instance, in one or more embodiments, the sharp-tessellation texture-rendering system 106 provides, as input, a displacement map to a digital contour detector. Then, in some instances, the sharp-tessellation texture-rendering system 106 utilizes the digital contour detector to detect differing feature values among the feature values of the displacement map. Indeed, in some instances, the sharp-tessellation texture-rendering system 106 utilizes the digital contour detector to detect visual creases, cliffs, borders, or contrasts within the displacement map. Furthermore, the sharp-tessellation texture-rendering system 106 utilizes the digital contour detector to identify (or draw) discontinuity lines at the detected differing feature values among the feature values of the displacement map. In one or more embodiments, the detected discontinuity lines from the digital contour detector are encoded within texels of a sharpness map (e.g., as discontinuity points and base discontinuity configurations with bit flags) by the sharp-tessellation texture-rendering system 106 as described in greater detail below.

In some instances, the sharp-tessellation texture-rendering system 106 utilizes a digital contour detector that detects edges (within images and/or textures) utilizing an edge detection algorithm. For instance, the sharp-tessellation texture-rendering system 106 utilizes various digital contour detectors based on one or more of a Prewitt-filter edge detection algorithm, a Sobel-filter edge detection algorithm, and/or a Canny-filter edge detection algorithm. In some embodiments, the sharp-tessellation texture-rendering system 106 utilizes the digital contour detector to detect edges within a displacement map between differing feature values among the feature values of the displacement map. Furthermore, in certain instances, the sharp-tessellation texture-rendering system 106 utilizes the detected edges as discontinuity lines or generates discontinuity lines for the displacement map that correspond to the edges detected by the digital contour detector.

In addition to (or in combination with) user selections and digital contour detectors, the sharp-tessellation texture-rendering system 106 in some embodiments utilizes a variety of other tools to identify discontinuity lines with a displacement map. For instance, in some embodiments, the sharp-tessellation texture-rendering system 106 identifies regions, edges, or objects within a displacement map utilizing segmentation tools and/or detection tools. As an example, the sharp-tessellation texture-rendering system 106 utilizes machine learning-based (e.g., neural networks) segmentation tools and/or detection tools to identify one or more regions, edges, or objects within a displacement map. Subsequently, in one or more embodiments, the sharp-tessellation texture-rendering system 106 utilizes the identified regions, edges, or objects within a displacement map to generates discontinuity lines for the displacement map. In one or more embodiments, the detected discontinuity lines generated from identified regions, edges, or objects within the displacement map are encoded within texels of a sharpness map (e.g., as discontinuity points and base discontinuity configurations with bit flags) by the sharp-tessellation texture-rendering system 106 as described in greater detail below.

As also shown in FIG. 3, the sharp-tessellation texture-rendering system 106 identifies positioning of discontinuity lines 306 in relation to the displacement map 307. For example, the sharp-tessellation texture-rendering system 106 utilizes x and y coordinates for the displacement map 307 and maps the discontinuity lines 306 by assigning x and y coordinate positions for the discontinuity lines 306 in relation to the displacement map 307. Although FIG. 3 illustrates the sharp-tessellation texture-rendering system 106 overlaying the discontinuity lines 306 on the displacement map 307, the sharp-tessellation texture-rendering system 106, in some instances, maintains positional relationships between discontinuity lines and displacement maps based on references of positional data (e.g., x and y coordinates) of both the displacement map and the discontinuity lines.

Furthermore, in some embodiments, the sharp-tessellation texture-rendering system 106 also maps a sharpness map in relation to a displacement map. For instance, as shown in FIG. 3, the sharp-tessellation texture-rendering system 106 maps one or more texels of a sharpness map by assigning x and y coordinate positions for texels of the sharpness map in relation to the displacement map 307. Although FIG. 3 illustrates the sharp-tessellation texture-rendering system 106 overlaying a sharpness map on a displacement map in one or more embodiments, the sharp-tessellation texture-rendering system 106, in some instances, maintains positional relationships between sharpness maps and displacement maps based on references of positional data (e.g., x and y coordinates) of both the displacement map and the sharpness map.

In some instances, texels of a sharpness map are shifted in relation to (texels of) a displacement map by the sharp-tessellation texture-rendering system 106. For example, the sharp-tessellation texture-rendering system 106 shifts positional values of texels of a sharpness map to associate the corners of the sharpness map texels (e.g., interpolation evaluation corner points) with feature values of a displacement map. An interpolation evaluation corner point refers to a point (or vertex) of a texel at which a location is referenced for an evaluation sample to filter a displacement map. For example, an interpolation evaluation corner point comprises a point of a sharpness map texel that is positioned within a feature value of a displacement map such that the feature value is referenced using the position of the sharpness map texel point (i.e., corner point).

In some embodiments, the sharp-tessellation texture-rendering system 106 shifts positional values of texels of a sharpness map to associate the corners of the sharpness map texels (e.g., the interpolation evaluation corner points) with feature values that correspond to centers of texels of displacement maps. In certain instances, the sharp-tessellation texture-rendering system 106 shifts texels of a sharpness map by half a texel length in the x and y coordinate direction so that corner points of the sharpness map texels correspond feature value evaluation points of the displacement map. As shown in FIG. 3, the sharp-tessellation texture-rendering system 106 shifts positional values of texels of a sharpness map to create the shifted sharpness map 308. By doing so, in some embodiments, the sharp-tessellation texture-rendering system 106 stores (or encodes) discontinuities between four adjacent texels of a displacement map in each texel of a sharpness map.

Furthermore, in some embodiments and in relation to FIG. 3, the sharp-tessellation texture-rendering system 106 identifies positioning of the identified discontinuity lines 306 in relation to the shifted sharpness map 308. Then, in one or more embodiments, the sharp-tessellation texture-rendering system 106 identifies discontinuity points along edges of texels corresponding to the shifted sharpness map 308. For example, the sharp-tessellation texture-rendering system 106 identifies a location (e.g., in terms of a texel edge length factor or x and y coordinates) at which the identified discontinuity lines 306 intersect with texel edges of the shifted sharpness map 308 as the discontinuity points.

In one or more embodiments, the sharp-tessellation texture-rendering system 106 encodes an identified discontinuity point (e.g., using a position value) to one or more texels of the shifted sharpness map 308 for an edge intersecting with the discontinuity point. As shown in FIG. 3, the sharp-tessellation texture-rendering system 106 encodes discontinuity points for each texel in the sharpness map texels 310 based on a positioning of a discontinuity point along an edge of a texel. For instance, the sharp-tessellation texture-rendering system 106 includes positional values of discontinuity points as data encoded within a sharpness map texel for each discontinuity point associated with the sharpness map texel. For instance, the sharp-tessellation texture-rendering system 106 encodes a texel edge length factor to an edge of a sharpness map texel to indicate a positioning of discontinuity point. In particular, in some embodiments, the sharp-tessellation texture-rendering system 106 utilizes a factor $\beta$ to indicate a position or length at which a discontinuity point is located on a left or right edge of a sharpness map texel. Moreover, in some embodiments, the sharp-tessellation texture-rendering system 106 utilizes a factor $\alpha$ to indicate a position or length at which a discontinuity point is located on a bottom or top edge of a sharpness map texel. In some instances, the sharp-tessellation texture-rendering system 106 stores location values for the discontinuity paths as x and y coordinate float values.

In some embodiments, the sharp-tessellation texture-rendering system 106 condenses memory per texel by storing (or encoding) less discontinuity points per sharpness map texel than the number of discontinuity points associated with each sharpness map texel. In particular, in certain instances, the sharp-tessellation texture-rendering system 106 encodes a discontinuity point positioned on a bottom-side edge of a sharpness map texel and/or a discontinuity point positioned on a left-side edge of a sharpness map texel. Then, in one or more embodiments, the sharp-tessellation texture-rendering system 106 retrieves discontinuity point locations for the top-side edge and right-side edge of the immediate sharpness map texel from top and right adjacent sharpness map texels that shares edges with the immediate sharpness map texel. By referencing adjacent sharpness map texels to retrieve one or more discontinuity points for each immediate texel, in some embodiments, the sharp-tessellation texture-rendering system 106 stores two or less discontinuity points per sharpness map texel.

In particular, in one or more embodiments, the sharp-tessellation texture-rendering system 106 encodes an edge length factor $\beta_{i,j}$ for a left-side edge of a sharpness map texel (i, j) to indicate the position of the discontinuity point on the left-side edge of a sharpness map texel. Likewise, in one or more embodiments, the sharp-tessellation texture-rendering system 106 encodes an edge length factor $\beta_{i+1,j}$ for a left-side edge of a right adjacent sharpness map texel (i+1, j) to indicate the position of the discontinuity point on the right-side edge of the sharpness map texel (i, j). Moreover, in some embodiments, the sharp-tessellation texture-rendering system 106 encodes an edge length factor $\alpha_{i,j}$ for a bottom-side edge of the sharpness map texel (i,j) to indicate the position of the discontinuity point on the bottom-side edge of the sharpness map texel. Furthermore, in some instances, the sharp-tessellation texture-rendering system 106 encodes an edge length factor $\alpha_{i,j+1}$ for a bottom-side edge of a top adjacent sharpness map texel (i,j+1) to indicate the position of the discontinuity point on the top-side edge of the sharpness map texel (i,j).

Although the above-described embodiments illustrate the sharp-tessellation texture-rendering system 106 encoding discontinuity points positioned on a bottom-side edge and/or a left-side edge of a sharpness map texel, the sharp-tessellation texture-rendering system 106 in some instances encodes discontinuity points positioned on top-side edge and/or a right-side edge of the sharpness map texel. In such cases, the sharp-tessellation texture-rendering system 106 retrieves discontinuity points for the bottom-side edge and the left-side edge from bottom and left adjacent sharpness map texels that shares edges with the immediate sharpness map texel.

As also shown in FIG. 3, the sharp-tessellation texture-rendering system 106 also encodes base discontinuity configurations for the sharpness map texels 310. For example, the sharp-tessellation texture-rendering system 106 stores multiple base discontinuity configurations and a bit flag that indicates the presence or absence of each base discontinuity configuration per sharpness map texel. Indeed, in one or more embodiments, a base discontinuity configuration references a possible discontinuity line that is created by connecting two discontinuity points from two of the edges of a sharpness map texel. For instance, the sharp-tessellation texture-rendering system 106 encodes six base discontinuity configurations with a corresponding bit flag within a sharpness map texel. As an example, the sharp-tessellation texture-rendering system 106 utilizes base discontinuity configurations and bit flags as illustrated in FIG. 4.

In one or more embodiments, the sharp-tessellation texture-rendering system 106 identifies discontinuity line connections between two discontinuity points in a sharpness map texel using the discontinuity lines 306. Then, in one or more embodiments, identifies a matching base discontinuity configuration for the discontinuity line between the two discontinuity points and sets a bit flag to indicate that the matching base discontinuity configuration is present for the sharpness map texel. Indeed, in one or more embodiments, the sharp-tessellation texture-rendering system 106 checks each base discontinuity configuration against the identified discontinuity lines created in a sharpness map texel to set bit flags for each matching base discontinuity configuration. Furthermore, in one or more embodiments, the sharp-tessellation texture-rendering system 106 is able to generate discontinuity lines of a sharpness map within a GPU pipeline by utilizing the discontinuity points and base discontinuity configurations with bit flags encoded in the sharpness map texels (e.g., to form the sharpness map 312).

As just mentioned, in some embodiments, the sharp-tessellation texture-rendering system 106 utilizes discontinuity points (locations) and base discontinuity configurations with bit flags encoded in sharpness map texels of a sharpness map to generate (or reconstruct) discontinuity lines for the sharpness map. For example, FIG. 4 illustrates utilizing data encoded within a texel of a sharpness map to generate discontinuity lines for the sharpness map texel (to generate discontinuity lines for the sharpness map). As shown in FIG. 4, the identifies a sharpness map 402 in relation to a displacement map 404. Then, as illustrated in FIG. 4, the sharp-tessellation texture-rendering system 106 accesses sharpness map texel data 408 for a sharpness map texel 406 from the sharpness map 402. Indeed, as shown in FIG. 4, the sharpness map texel data 408 includes encoded discontinuity points 410 and base discontinuity configurations 412 (with bit flags) for which discontinuity line combinations 414 are possible.

Figure 4:
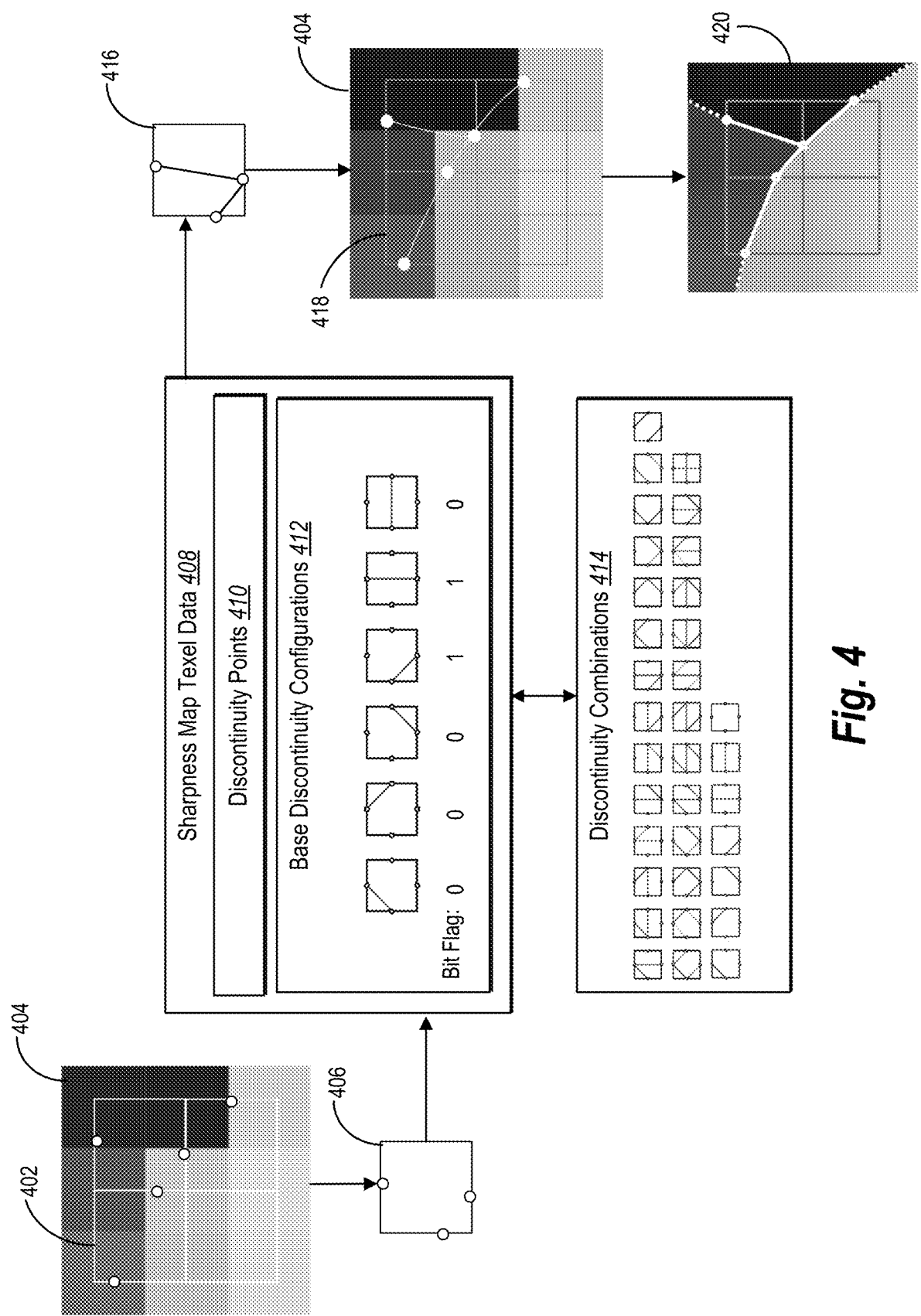
FIG. 4 illustrates a sharp-tessellation texture-rendering system reconstructing discontinuities encoded within a sharpness map in accordance with one or more embodiments.

As illustrated in FIG. 4, the base discontinuity configurations 412 of the sharpness map texel 406 reference possible discontinuity lines that are created by connecting two discontinuity points from two of the edges of a sharpness map texel and a corresponding bit flag to indicate that the presence of the possible discontinuity lines. As further shown in FIG. 4, the base discontinuity configuration (from the base discontinuity configurations 412) having a discontinuity line between a bottom-side edge and left-side edge of a sharpness map texel corresponds to a bit flag of 1. As also illustrated in FIG. 4, the base discontinuity configuration having a discontinuity line between a bottom-side edge and a top-side edge of a sharpness map texel corresponds to a bit flag of 1. Accordingly, as shown in FIG. 4, the sharp-tessellation texture-rendering system 106 generates a discontinuity line combination 416 for the sharpness map texel 406. Indeed, in one or more embodiments, the sharp-tessellation texture-rendering system 106 utilizes base discontinuity configurations for a sharpness map texel that correspond to a bit flag that indicates the presence of a given base discontinuity configuration (e.g., a bit flag of 1 or true) while disregarding base discontinuity configurations corresponding to a bit flag that indicates the absence of a given base discontinuity configuration (e.g., a bit flag of 0 or false).

As further shown in FIG. 4, the sharp-tessellation texture-rendering system 106 utilizes discontinuity points (locations) and base discontinuity configurations with bit flags encoded in sharpness map texels of a sharpness map to generate (or reconstruct) discontinuity lines per texel present in the sharpness map 402. By doing so, as shown in FIG. 4, the sharp-tessellation texture-rendering system 106 generates discontinuity lines for a sharpness map 418 to indicate discontinuities in the displacement map 404. Indeed, as illustrated in FIG. 4, the sharp-tessellation texture-rendering system 106 is able to generate discontinuity line combinations 414 for each sharpness map texel by utilizing varying base discontinuity configurations depending on bit flag settings encoded for each of the sharpness map texels. Moreover, as shown in FIG. 4, by generating discontinuity lines from data encoded on each texel of the sharpness map, the sharp-tessellation texture-rendering system 106 generates the sharpness map 418 having a topology with discontinuity lines referencing the discontinuities of the displacement map 404. Then, as shown in FIG. 4, the sharp-tessellation texture-rendering system 106 optionally utilizes the sharpness map 418 having a topology with discontinuity lines referencing the discontinuities of the displacement map 404 to filter one or more identified feature values within an area created by the discontinuity lines to generate a filtered displacement texture 420 that preserves discontinuities between feature values of the displacement map.

In some embodiments, the sharp-tessellation texture-rendering system 106 ensures that any given area (or region) within a sharpness map texel is associated with at least one corner of the sharpness map texel. For instance, the sharp-tessellation texture-rendering system 106 identifies a set of invalid discontinuity line combinations in which generated discontinuity lines will result in an area within the sharpness map texel that is not adjacent to any corner of the sharpness map texel. In some embodiments, the sharp-tessellation texture-rendering system 106 identifies discontinuity line combinations that create a triangular or diamond-shaped area, within a sharpness map texel, that is not adjacent to any corner point of the sharpness map texel as an invalid discontinuity line combination.

In certain embodiments, the sharp-tessellation texture-rendering system 106 utilizes a 6-bit wide mask to encode base discontinuity configurations. For instance, in reference to FIG. 4, the sharp-tessellation texture-rendering system 106 encodes each bit of a 6-bit wide mask with each base discontinuity configuration from the base discontinuity configurations 412. More specifically, in some embodiments, the sharp-tessellation texture-rendering system 106 associates each bit of a 6-bit wide mask with a particular base discontinuity configuration (e.g., a first bit associates with a first base discontinuity configuration, a second bit associates with a second base discontinuity configuration . . . a sixth bit associates with a sixth base discontinuity configuration). Then, in one or more embodiments, for each bit, the sharp-tessellation texture-rendering system 106 sets a bit (as a bit flag) to 0 when the corresponding base discontinuity configuration is absent and to 1 when the corresponding base discontinuity configuration is present. As such, in certain instances, the sharp-tessellation texture-rendering system 106 is able to represent at least thirty-four discontinuity line combinations (as shown in FIG. 4) in a sharpness map texel while utilizing 6-bits of memory per sharpness map texel (in addition to memory to store discontinuity points).

As mentioned above, the sharp-tessellation texture-rendering system 106 performs sharp tessellation to generate a modified 3D-object mesh that, when utilized with a sharpness map and a displacement map, translates to 3D objects with sharp, accurate features without visual geometrical aliasing effects. For instance, during sharp tessellation, the sharp-tessellation texture-rendering system 106 modifies vertex positions during tessellation of a 3D-object mesh to align the vertices with (or snap the vertices to) discontinuities indicated by a sharpness map for a displacement map. Indeed, FIG. 5 illustrates the sharp-tessellation texture-rendering system 106 utilizing a 3D-object mesh, a sharpness map, and a displacement map to perform sharp tessellation while rendering a 3D object.

Figure 5:
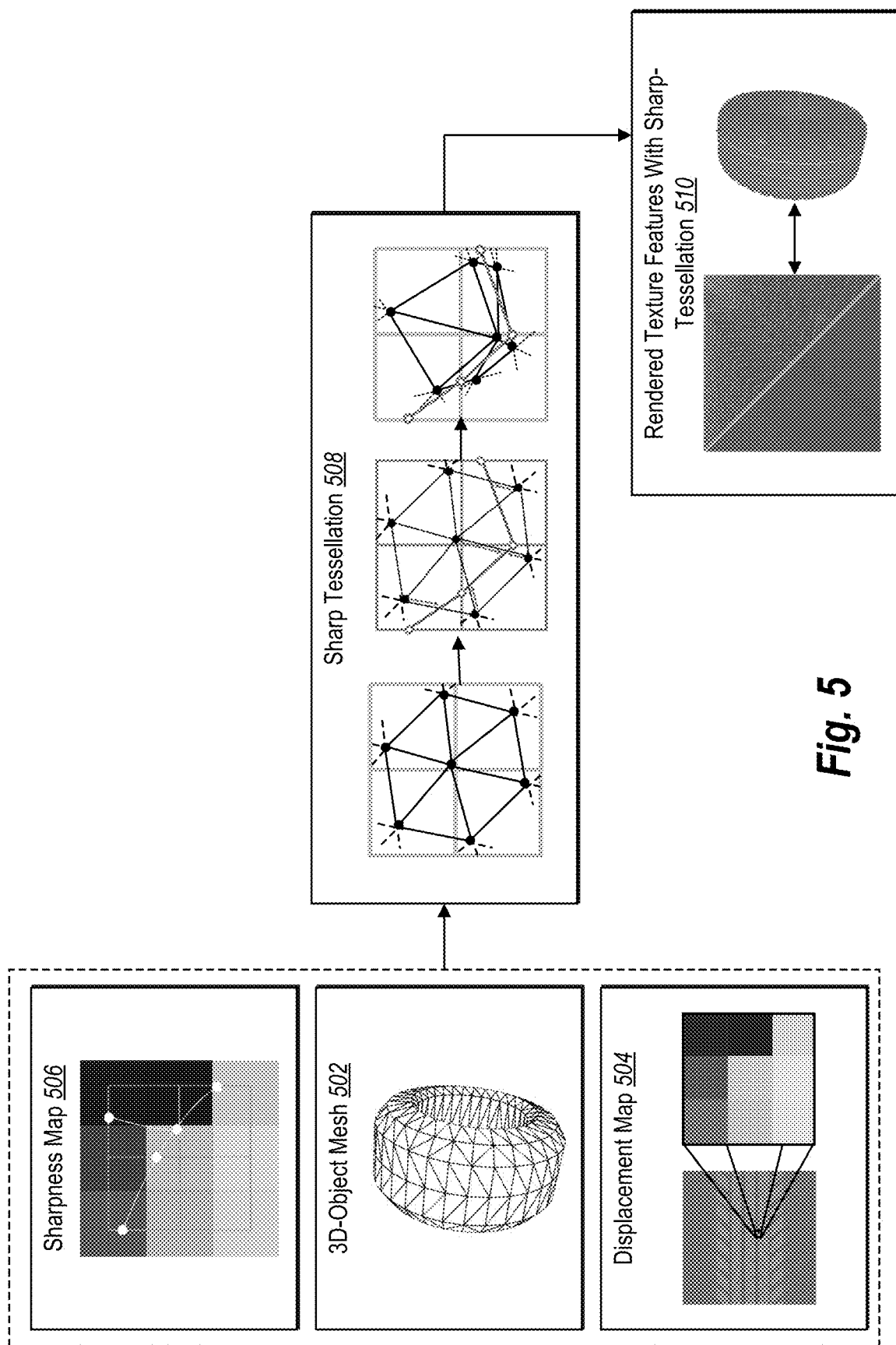
FIG. 5 illustrates a sharp-tessellation texture-rendering system utilizing a 3D-object mesh, a sharpness map, and a displacement map to perform sharp tessellation while rendering a 3D object in accordance with one or more embodiments.

As shown in FIG. 5, the sharp-tessellation texture-rendering system 106 utilizes a 3D-object mesh 502 with a displacement map 504 and a sharpness map 506 (in accordance with one or more embodiments). Additionally, as illustrated in FIG. 5, the sharp-tessellation texture-rendering system 106 tessellates the 3D-object mesh to generate one or more (additional) vertices within the 3D-object mesh during sharp tessellation 508. Then, for each vertex of the tessellated 3D-object mesh, the sharp-tessellation texture-rendering system 106 identifies a position of a nearest discontinuity line intersection for each vertex having an incident edge that intersects with one or more discontinuity lines of one or more texels from the sharpness map. Furthermore, as shown in FIG. 5, the sharp-tessellation texture-rendering system 106 modifies the positions of vertices to be within a threshold distance of a corresponding discontinuity line intersection to generate a modified 3D-object mesh having vertices aligned (or snapped) to discontinuities of the sharpness map. As shown in FIG. 5, the modified 3D-object mesh from sharp tessellation 508 includes faces that are dedicated to different features (e.g., faces that cover the discontinuities and also faces that cover uniform and/or continuous features that are indicated by the sharpness map).

Furthermore, in reference to FIG. 5, the sharp-tessellation texture-rendering system 106, in some embodiments, utilizes the modified 3D-object mesh from sharp tessellation 508 with the displacement map 504 and sharpness map 506 to generate a filtered displacement texture that maps to the vertices and faces of the modified 3D-object mesh. Then, as shown in FIG. 5, the sharp-tessellation texture-rendering system 106 utilizes the modified 3D-object mesh having a corresponding filtered displacement texture (that preserves sharp features via discontinuities identified in the sharpness map) to generate a 3D object having rendered texture features with sharp tessellation 510.

Figure 6A:
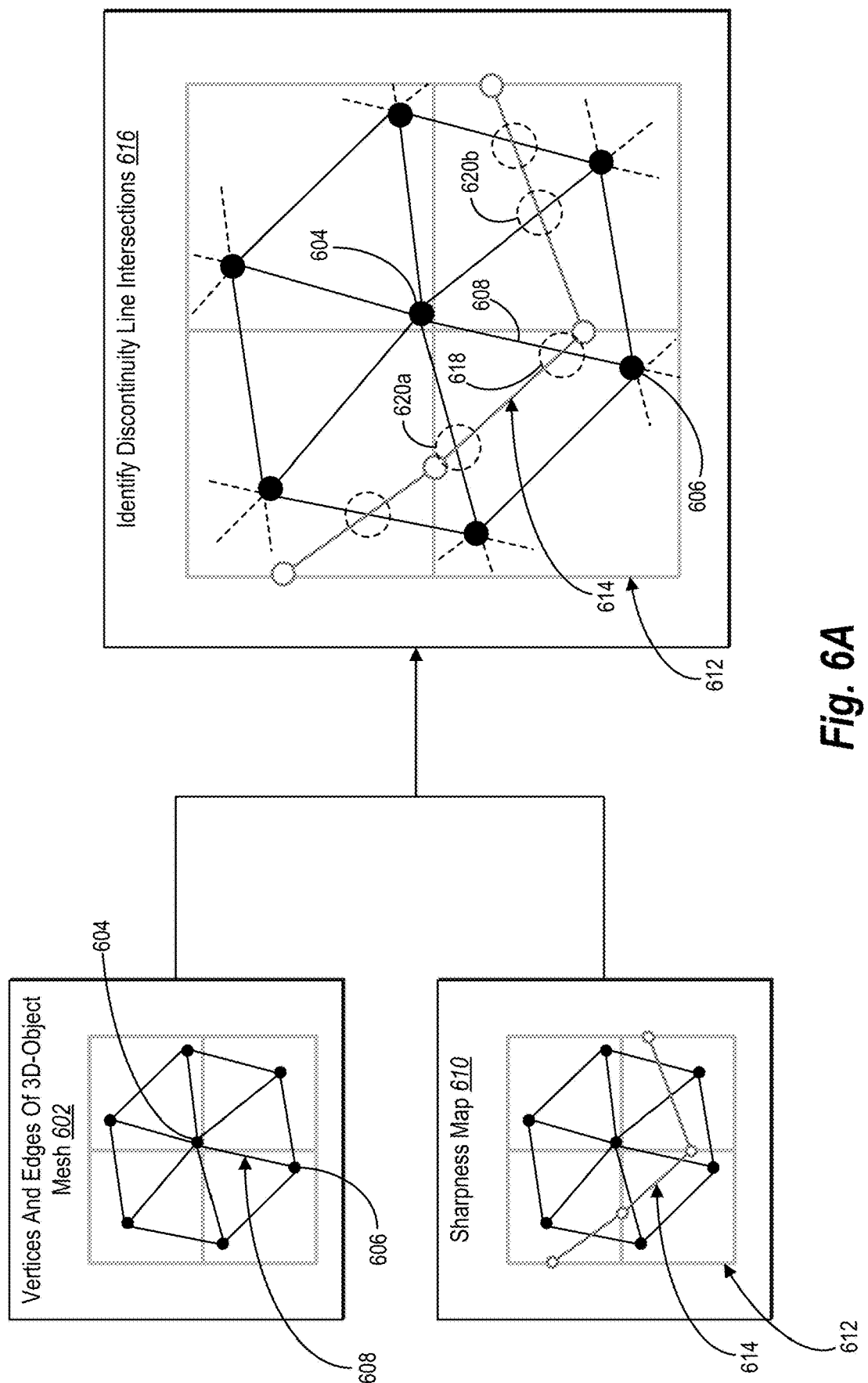
FIGS. 6A-6D illustrate the sharp-tessellation texture-rendering system identifying discontinuity line intersections in accordance with one or more embodiments.
Figure 6B:
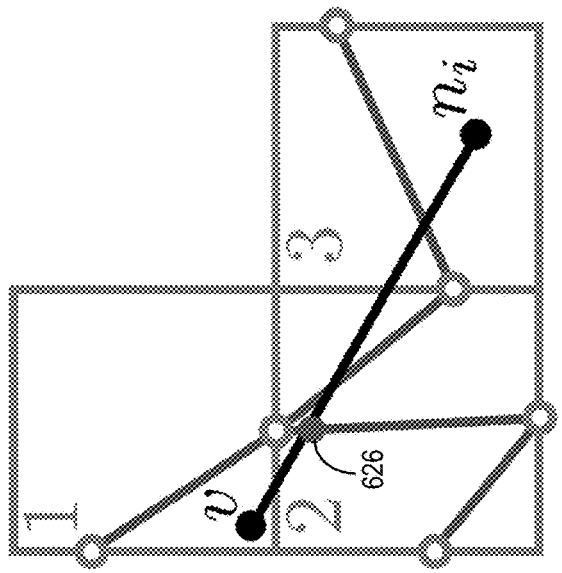

As mentioned above, the sharp-tessellation texture-rendering system 106 identifies possible discontinuity line intersections at which to reposition one or more vertices of a tessellated 3D-object mesh during sharp tessellation. For instance, FIGS. 6A and 6B illustrate the sharp-tessellation texture-rendering system 106 identifying discontinuity line intersection locations along incident edges of the vertices and neighbor vertices from a tessellated 3D-object mesh. In particular, FIGS. 6A and 6B illustrate identifying intersections between discontinuity lines of a sharpness map and edges corresponding to vertices and neighbor vertices of a tessellated 3D-object mesh to utilize the intersections for relocation of the vertices (as described in FIG. 7).

For instance, as shown in FIG. 6A, the sharp-tessellation texture-rendering system 106 accesses vertices and edges of a tessellated 3D-object mesh 602. As illustrated in FIG. 6A, the tessellated 3D-object mesh 602 includes a vertex 604. In some instances, the sharp-tessellation texture-rendering system 106 identifies a neighbor vertex 606 for the vertex 604. In addition, in reference to FIG. 6A, the sharp-tessellation texture-rendering system 106 also identifies (or indicates) an incident edge 608 between the vertex 604 and the neighbor vertex 606. As shown in FIG. 6A, the tessellated 3D-object mesh 602 includes multiple vertices and edges (in various positions). Indeed, in one or more embodiments, the sharp-tessellation texture-rendering system 106 identifies each neighbor vertex and each incident edge corresponding to a vertex when identifying discontinuity line intersections for the vertex.

Additionally, as shown in FIG. 6A, the sharp-tessellation texture-rendering system 106 accesses a sharpness map 610. Indeed, as illustrated in FIG. 6A, the sharpness map 610 includes a texel 612. In addition, as shown in FIG. 6A, the sharpness map 610 includes a discontinuity line 614. As shown in FIG. 6A, the sharpness map 610 includes multiple discontinuity lines and multiple texels (in various combinations as described above).

As further illustrated in FIG. 6A, the sharp-tessellation texture-rendering system 106 identifies discontinuity line intersections in an act 616. For instance, as shown in FIG. 6A, the sharp-tessellation texture-rendering system 106, for the vertex 604, traverses an incident edge with the neighbor vertex 606 to identify intersections with discontinuity lines referenced from the sharpness map 610. In particular, as shown in FIG. 6A, the sharp-tessellation texture-rendering system 106 identifies that the incident edge 608 between the vertex 604 and the neighbor vertex 604 (from the tessellated 3D-object mesh 602) intersects with the discontinuity line 614 from the texel 612 of the sharpness map 610. As such, in reference to FIG. 6A, the sharp-tessellation texture-rendering system 106 identifies the discontinuity line intersection 618 between the discontinuity line 614 and the incident edge 608.

As further shown in FIG. 6A, the sharp-tessellation texture-rendering system 106 identifies additional discontinuity line intersections 620a and 620b for other incident edges of the vertex 604. Indeed, in reference to FIG. 6A, the sharp-tessellation texture-rendering system 106 identifies various discontinuity line intersections between various numbers of vertices, incident edges between the vertices and neighbor vertices, and discontinuity lines from a sharpness map. By doing so, in one or more embodiments, the sharp-tessellation texture-rendering system 106 identifies discontinuity line intersections a plurality of vertices in a tessellated 3D-object mesh.

In one or more embodiments, the sharp-tessellation texture-rendering system 106 retrieves one or more neighbor vertices to identify discontinuity line intersections for a vertex. For instance, the sharp-tessellation texture-rendering system 106 utilizes information corresponding to a 3D-object mesh and the vertex to retrieve neighbor vertices of the vertex. In certain instances, the sharp-tessellation texture-rendering system 106 references a topology of the tessellated 3D-object mesh to identify neighboring vertices to the currently evaluated vertex under sharp tessellation. In some embodiments, the sharp-tessellation texture-rendering system 106 identifies neighbor vertices that are connected (via an edge) to the vertex to form a face of the 3D-object mesh.

For example, the sharp-tessellation texture-rendering system 106 references a patch (or face) index of the tessellated 3D-object mesh based on the index of the vertex. Upon identifying the one or more patch indexes that corresponds to the index of the vertex (e.g., the one or more patches that include the vertex), the sharp-tessellation texture-rendering system 106 utilizes the other vertices corresponding to the one or more patch indexes as the neighbor vertices. In some instances, the sharp-tessellation texture-rendering system 106 identifies triangular patches within the tessellated 3D-object mesh that correspond to the vertex and identifies two neighboring vertices within each triangular patch for the vertex. Indeed, the sharp-tessellation texture-rendering system 106, in some embodiments, accesses information from multiple triangular patches to identify each neighbor vertex for the vertex (e.g., each neighbor vertex that shares an incident edge with the vertex). In some cases, the sharp-tessellation texture-rendering system 106 identifies six neighboring vertices for the vertex.

In some instances, the sharp-tessellation texture-rendering system 106 determines and stores a topology of a 3D-object mesh (e.g., via vertices and patches) to retrieve neighbor vertices for a vertex. For example, in one or more embodiments, while in the GPU pipeline (e.g., in a tessellation shader), the sharp-tessellation texture-rendering system 106 accesses information for a patch and location information (e.g., barycentric coordinates) inside the patch of the vertex for which a tessellation shader is currently executed. Indeed, the sharp-tessellation texture-rendering system 106 utilizes fixed and predefined tessellation patterns to store a topology of a tessellation pattern in a buffer to access the topology of the tessellated 3D-object mesh to retrieve other vertices that neighbor a currently evaluated vertex (e.g., since, in one or more embodiments, only control points of a current patch are accessible in the tessellation shader).

For instance, the sharp-tessellation texture-rendering system 106 stores the topology of the tessellated 3D-object mesh within a buffer by utilizing linear indexing to store attributes for all vertices generated during tessellation (i.e., indexing attributes within the buffer). In some instances, the sharp-tessellation texture-rendering system 106 computes the index of vertices from patch indexes (e.g., information that is accessible on patches of a 3D-object mesh during a pass through in the tessellation shader), a tessellation level (to build on a fixed and predefined pattern), and a position of a generated vertex (e.g., barycentric coordinates). In some instances, upon determining the index of vertices, the sharp-tessellation texture-rendering system 106 can dump (or remove) the information relative to the patch indexes.

In some embodiments, the sharp-tessellation texture-rendering system 106 stores the topology of the tessellated 3D-object mesh utilizing a buffer (that indexes the vertices) by storing barycentric coordinates of each neighbor vertex for a vertex. For example, for each vertex, the sharp-tessellation texture-rendering system 106 stores each neighbor vertex location in terms of barycentric coordinates (e.g., six neighboring vertices). In some instances, when a vertex corresponds to less neighbor vertices (e.g., a border vertex), the sharp-tessellation texture-rendering system 106 utilizes negative barycentric coordinates to indicate invalid neighbor vertices for a border vertex. In some instances, the sharp-tessellation texture-rendering system 106 stores only two barycentric coordinates (per patch) and reconstructs the third barycentric coordinate by utilizing the two stored barycentric coordinates. In one or more embodiments, the sharp-tessellation texture-rendering system 106 utilizes a buffer to index vertices that is memory efficient because the buffer stores two barycentric coordinate floats (e.g., having a size of 4 octets) for all neighbor vertices (e.g., six vertices) for each vertex in the 3D-object mesh.

In some instances, the sharp-tessellation texture-rendering system 106 retrieves all neighboring vertices of a vertex to account for discontinuity line intersections along possible incident edges of the vertex. Accordingly, in some instances, when repositioning the vertex based on one or more identified discontinuity line intersections (as described in FIG. 7), the sharp-tessellation texture-rendering system 106 accounts for all of the discontinuity line intersections along all possible incident edges of the vertex to prevent cracks in a rendered texture (e.g., due to duplicated vertices during an evaluation on a patch-by-patch basis). Furthermore, by accounting for all of the discontinuity line intersections, the sharp-tessellation texture-rendering system 106 also prevents inconsistent positioning modifications for the vertex if the vertex is re-evaluated during evaluation of a different patch (e.g., an adjacent patch). Indeed, in some instances, by retrieving all neighboring vertices to identify all possible discontinuity line intersections for the vertex, the sharp-tessellation texture-rendering system 106 consistently repositions the vertex to the correct discontinuity line intersection (e.g., the nearest to the vertex) as described in FIG. 7. In some instances, when the 3D-object mesh includes triangular patches, the sharp-tessellation texture-rendering system 106 retrieves six neighboring vertices for a vertex to check six incident edges for discontinuity line intersections.

In some instances, while retrieving neighbor vertices, the sharp-tessellation texture-rendering system 106 also identifies attributes of the neighbor vertices in order to utilize the attributes during interpolation (e.g., to filter a displacement map in accordance with one or more embodiments). For example, the sharp-tessellation texture-rendering system 106 access control points of adjacent patches that correspond to the neighbor vertices. In particular, in one or more embodiments, the sharp-tessellation texture-rendering system 106 forms patch control points by utilizing three vertices of a 3D-object mesh patch (that is being evaluated by the tessellation shader) in combination with (or in addition to) vertices of all adjacent patches (e.g., three vertices of three adjacent triangles). Indeed, in one or more embodiments, the sharp-tessellation texture-rendering system 106 is able to retrieve information to iterate on a ring of patches corresponding to the vertex and all neighbor vertices of the vertex (e.g., a neighbor ring).

Furthermore, in some embodiments, the sharp-tessellation texture-rendering system 106 identifies discontinuity line intersections for incident edges of the vertex by referencing (or checking) locations along an incident edge to find a matching location of a discontinuity line referenced from a sharpness map. In particular, the sharp-tessellation texture-rendering system 106 identifies a discontinuity line intersection when a location of a (or point in a) incident edge matches a location of a (or point in a) discontinuity line from a texel of the sharpness map. In one or more embodiments, the sharp-tessellation texture-rendering system 106 traverses along an incident edge from the vertex towards the neighbor vertex until location corresponding to a discontinuity line location from the texel of the sharpness map is detected. The detected location, in one or more embodiments, is utilized by the sharp-tessellation texture-rendering system 106 as the discontinuity line intersection.

In one or more embodiments, the sharp-tessellation texture-rendering system 106 utilizes a 2D ray marching algorithm to identify discontinuity line intersections for incident edges of a vertex. For instance, the sharp-tessellation texture-rendering system 106 utilizes a ray from the vertex towards a neighbor vertex and evaluates a distance from the vertex to the closest point on an incident edge. Indeed, in some instances, when the sharp-tessellation texture-rendering system 106 detects a distance from the ray to the closest point on the incident edge occurring prior to the neighbor vertex, the sharp-tessellation texture-rendering system 106 utilizes the closest point as an identified discontinuity line intersection on the incident edge.

Additionally, in one or more embodiments, the sharp-tessellation texture-rendering system 106 accesses and checks texels of the sharpness map for intersections between discontinuity lines and an incident edge of a vertex from the vertex to the neighboring vertex. For example, FIG. 6B illustrates the sharp-tessellation texture-rendering system 106 accessing and checking multiple texels of the sharpness map to identify a discontinuity line intersection. As shown in FIG. 6, the sharp-tessellation texture-rendering system 106 identifies a position of the vertex v and accesses a texel that corresponds to the position of the vertex v (e.g., texel 1 of a sharpness map). Then, the sharp-tessellation texture-rendering system 106 constructs discontinuity lines that belong to texel 1 of the sharpness map (as described above). Then, as shown in FIG. 6B, the sharp-tessellation texture-rendering system 106 traverses the incident edge from the vertex v towards a neighbor vertex $n_i$ until a discontinuity line intersection is identified (or detected).

As further illustrated in FIG. 6B, the sharp-tessellation texture-rendering system 106 determines that the incident edge between the vertex v and a neighbor vertex $n_i$ does not intersect a discontinuity line in texel 1 (e.g., no intersections between the edge and discontinuity lines of the texel). Subsequently, as illustrated in FIG. 6B, the sharp-tessellation texture-rendering system 106 continues to traverse the incident edge between the vertex v and a neighbor vertex $n_i$, and based on the incident edge crossing texel 2 of the sharpness map, constructs discontinuity lines that belong to texel 2 of the sharpness map (as described above). Likewise, as shown in FIG. 6B, the sharp-tessellation texture-rendering system 106 determines that the incident edge between the vertex v and a neighbor vertex $n_i$ does not intersect a discontinuity line within texel 2.

Moreover, as shown in FIG. 6B, the sharp-tessellation texture-rendering system 106 then continues to traverse the incident edge towards the neighbor vertex $n_i$ and identifies that the incident edge crosses texel 3 of the sharpness map. In response, the sharp-tessellation texture-rendering system 106 constructs discontinuity lines that belong to texel 3 of the sharpness map (as described above). Then, as shown in FIG. 6B, the sharp-tessellation texture-rendering system 106 identifies a discontinuity line intersection 622 between a discontinuity line of the sharpness map (at texel 3) and the incident edge between the vertex v and a neighbor vertex $n_i$.

Figure 6C:
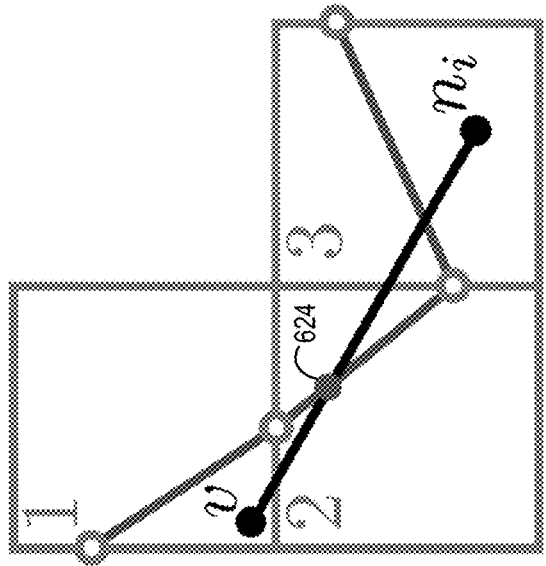

In some instances, the sharp-tessellation texture-rendering system 106 discontinues to check for discontinuity line intersections along an incident edge between the vertex and a neighbor vertex once a first intersecting discontinuity line is identified (from the vertex towards the neighbor vertex). For instance, as shown in FIG. 6C, the sharp-tessellation texture-rendering system 106 traverses an incident edge from the vertex v towards the neighbor vertex $n_i$ until a discontinuity line intersection 624 is identified in texel 2 of the sharpness map (e.g., a first intersecting discontinuity line). Indeed, as illustrated in FIG. 6C, although the incident edge from the vertex v towards the neighbor vertex $n_i$ includes multiple intersections with discontinuity lines (e.g., in texel 2 and in texel 3), the sharp-tessellation texture-rendering system 106 utilizes the first discontinuity line intersection 624 in texel 2 (e.g., by going in a direction toward the neighbor vertex $n_i$) as the identified discontinuity line intersection. In certain instances, in reference to FIG. 6C, the sharp-tessellation texture-rendering system 106 does not check beyond the first discontinuity intersection 624. In addition, in reference to FIG. 6C, in some embodiments, the sharp-tessellation texture-rendering system 106 does not reference or construct discontinuity lines belonging to additional texels beyond the detection of the first discontinuity intersection (e.g., discontinuity lines encoded in texel 3 are not constructed or checked for the incident edge between vertex v and the neighbor vertex $n_i$).

Figure 6D:
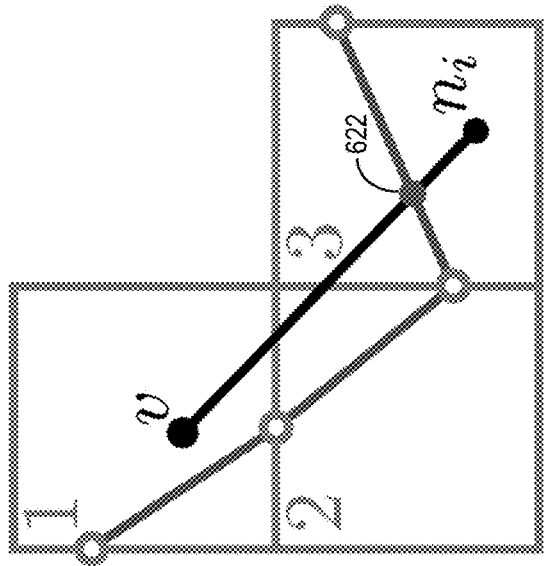

In one or more embodiments, the sharp-tessellation texture-rendering system 106 selects a first occurring discontinuity line intersection from a texel of a sharpness map when the texel is encoded with multiple discontinuity lines. For instance, as shown in FIG. 6D, the sharp-tessellation texture-rendering system 106 traverses an incident edge from a vertex v towards a neighbor vertex $n_i$ and constructs multiple discontinuity lines (as described above) within texel 2 of the sharpness map. As further illustrated in FIG. 6D, the sharp-tessellation texture-rendering system 106 selects the first occurring discontinuity line intersection 626 in texel 2 as the identified discontinuity line intersection for the incident edge when texel 2 includes multiple discontinuity lines.

Furthermore, in some instances, the sharp-tessellation texture-rendering system 106 identifies no discontinuity line intersections along an incident edge between a vertex and a neighbor vertex. For instance, the sharp-tessellation texture-rendering system 106 checks for intersecting discontinuity lines (in accordance with one or more embodiments) along an incident edge from the vertex until an extremity of the incident edge is reached (e.g., the neighbor vertex). If no discontinuity lines are identified to intersect along the entire incident edge, the sharp-tessellation texture-rendering system 106 determines that there are no discontinuity line intersections along the given incident edge for the vertex.

In one or more embodiments, the sharp-tessellation texture-rendering system 106 identifies discontinuity line intersections along each incident edge each vertex in the tessellated 3D-object mesh (where discontinuity line intersections exist) in accordance with one or more embodiments. Furthermore, as mentioned above, in some cases, a vertex includes multiples neighbor vertices. As such, in one or more embodiments, the sharp-tessellation texture-rendering system 106 checks each incident edge for each neighbor vertex to identify one or more discontinuity line intersections in relation to the vertex (in accordance with one or more embodiments).

Furthermore, as illustrated in one or more embodiments, the sharp-tessellation texture-rendering system 106 constraints the identification of discontinuity line intersections in relation to a vertex to only the incident edges of the vertex. By doing so, in some instances, the sharp-tessellation texture-rendering system 106 prevents the creation of deformed faces within a modified 3D-object mesh when the vertex is repositioned based on an identified discontinuity line intersection as described below (e.g., in relation to FIG. 7). For instance, by constraining the identification of discontinuity line intersections to only the incident edges of a vertex, the sharp-tessellation texture-rendering system 106 avoids the creation of degenerated triangular faces (or vertices of triangular faces crossing edges of other triangular faces). Moreover, in some instances, by introducing such constraints, the sharp-tessellation texture-rendering system 106 also avoids flipping triangular faces (e.g., by repositioning a vertex of a triangular faces beyond edges of the triangular face).

Figure 7:
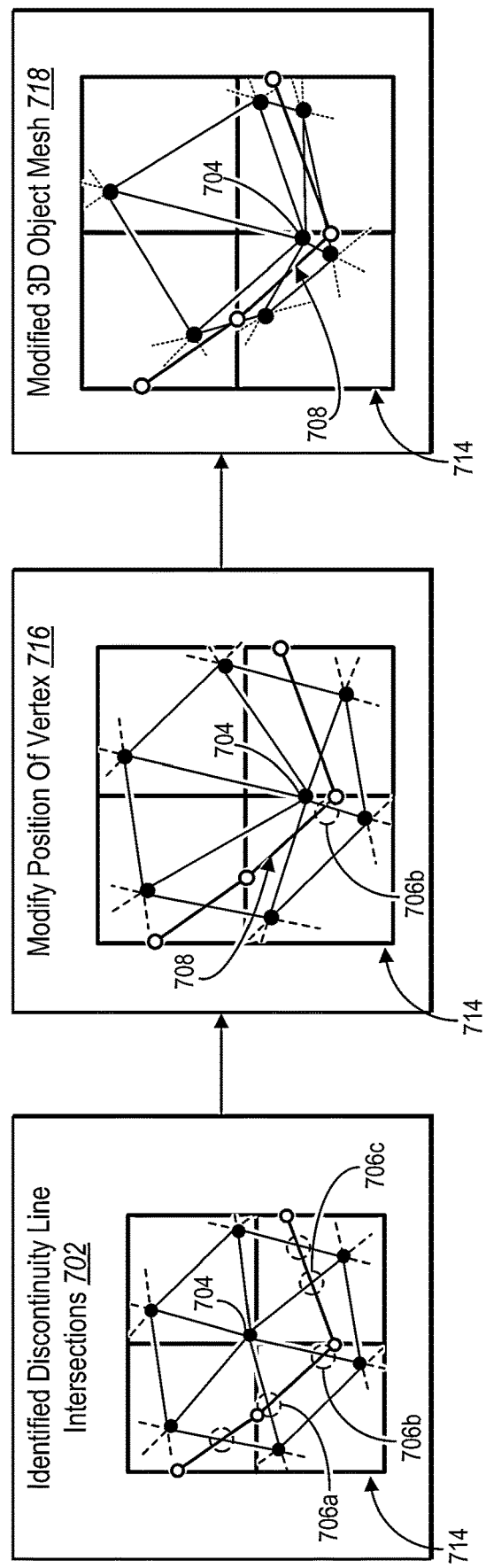
FIG. 7 illustrates the sharp-tessellation texture-rendering system modifying positions of vertices based on identified discontinuity line intersections in accordance with one or more embodiments.

As mentioned above, the sharp-tessellation texture-rendering system 106 modifies a position of a vertex based on a discontinuity line intersection to generate a modified 3D-object mesh that includes vertices aligned along discontinuities of a sharpness map. For instance, FIG. 7 illustrates the sharp-tessellation texture-rendering system 106 modifying positions of vertices based on identified discontinuity line intersections for incident edges of the vertices in a tessellated 3D-object mesh. For instance, as shown in FIG. 7, for a given vertex 704 (in a 3D-object mesh) the sharp-tessellation texture-rendering system 106 identifies discontinuity line intersections 706a, 706b, and 706c (in accordance with one or more embodiments) as the identified discontinuity line intersections 702 from a sharpness map 714.

Then, as illustrated in FIG. 7, the sharp-tessellation texture-rendering system 106 modifies a position of the vertex 704 (in an act 716) to be within a threshold distance of the discontinuity line intersection 706b (e.g., based on the discontinuity line intersection 706b being the nearest discontinuity line intersection). As shown in FIG. 7, the vertex 704 is moved (or snapped) to a discontinuity indicated in the sharpness map (e.g., the discontinuity line 708) in the act 716. Furthermore, as illustrated in FIG. 7, the sharp-tessellation texture-rendering system 106 identifies discontinuity line intersections for each vertex and repositions each vertex based corresponding discontinuity line intersections to generate a modified 3D-object mesh 718. As shown in FIG. 7, the modified 3D-object mesh 718 includes faces having vertices that align with (or follow) discontinuities indicated in the sharpness map 714 to remove aliasing artifacts and to accurately define sharp features of a filtered displacement texture.

In one or more embodiments, the sharp-tessellation texture-rendering system 106 repositions (or modifies the position of a) vertex within a threshold distance of a discontinuity line intersection (along the incident edge of the vertex). In particular, by repositioning within the threshold distance of the discontinuity line intersection, in some cases, the sharp-tessellation texture-rendering system 106 ensures that the vertex remains on the same side of the discontinuity line that corresponds to the discontinuity line intersection. For instance, by ensuring that the vertex remains on the same side of the discontinuity line that corresponds to the discontinuity line intersection, the sharp-tessellation texture-rendering system 106 properly samples (and filters) features of a displacement map with respect to the discontinuity lines of the sharpness map at the repositioned vertex (e.g., samples and filters from the correct side of the discontinuity after the vertex is moved).

In one or more additional embodiments, the sharp-tessellation texture-rendering system 106 receives user input (e.g., from an administrator or user of the sharp-tessellation texture-rendering application 112) that indicates a threshold distance to utilize during repositioning of the vertices. For instance, the sharp-tessellation texture-rendering system 106 receives, from user input, an indication of closely (or tightly) the sharp-tessellation texture-rendering system 106 should snap (or position) vertices along discontinuities of a sharpness map (e.g., as a magnitude, distance, or sliding bar tool indicator that increases or decreases the distance). In some embodiments, the sharp-tessellation texture-rendering system 106 utilizes the user input to determine a threshold distance.

To position the vertex within a threshold distance of the discontinuity line intersection, the sharp-tessellation texture-rendering system 106, in some embodiments, first identifies a location of the discontinuity line intersection. Then, in one or more embodiments, the sharp-tessellation texture-rendering system 106 determines a location that is a threshold distance from the location of the discontinuity line intersection. Indeed, in some instances, the sharp-tessellation texture-rendering system 106 utilizes this location as the modified (or new) position of the vertex. Although one or more embodiments illustrate the sharp-tessellation texture-rendering system 106 repositioning a vertex within a threshold distance of a discontinuity line intersection, in some cases, the sharp-tessellation texture-rendering system 106 positions the vertex at the location of the discontinuity line intersection.

As further shown in FIG. 7, in some instances, the sharp-tessellation texture-rendering system 106 identifies multiple discontinuity line intersections for a vertex (e.g., vertex 704 corresponds to discontinuity line intersections 706a, 706b, and 706c). In one or more embodiments, the sharp-tessellation texture-rendering system 106 selects between multiple discontinuity line intersections when repositioning a vertex. For instance, the sharp-tessellation texture-rendering system 106 selects a modified position for a vertex by determining a nearest discontinuity line intersection position from the position of the vertex to the positions of the multiple discontinuity line intersections. Indeed, in one or more embodiments, the sharp-tessellation texture-rendering system 106 modifies the position of the vertex to position the vertex within a threshold distance to the position of the nearest discontinuity line intersection.

For example, the sharp-tessellation texture-rendering system 106 determines a distance between the position of the vertex and a position of a discontinuity line intersection. In some embodiments, the sharp-tessellation texture-rendering system 106 determines the distance between the vertex and the discontinuity line intersection by utilizing a variety of distance determination approaches. For instance, the sharp-tessellation texture-rendering system 106 determines distance (e.g., Euclidian distances, Pythagoras-theorem based distances) of a line segment created between the position of the vertex and the point (or location) of the discontinuity line intersection. In some instances, the sharp-tessellation texture-rendering system 106 utilizes a distance determined during detection of the discontinuity line intersection point through a ray marching algorithm.

Upon determining distances between a position of a vertex and each of the discontinuity line intersection positions corresponding to the vertex, the sharp-tessellation texture-rendering system 106, in some embodiments, compares the distances to select a position for the vertex. In particular, in one or more embodiments, the sharp-tessellation texture-rendering system 106 compares the distances to identify the nearest discontinuity line intersection position to the position of the vertex. For example, the sharp-tessellation texture-rendering system 106 determines a first distance between the vertex and a position of a first discontinuity line intersection and a second distance between the vertex and a position of a second discontinuity line intersection. Then, in some embodiments, selects between the positions of the first and second discontinuity line intersections based on a comparison of first and second distances (e.g., selects the first discontinuity line intersection as the nearest discontinuity line intersection when the first distance is lesser than the second distance).

Furthermore, after determining the nearest discontinuity line intersection to the vertex (from the discontinuity line intersections that correspond to the vertex), the sharp-tessellation texture-rendering system 106 modifies a position of the vertex to be within a threshold distance of the position of the nearest discontinuity line intersection. For example, the sharp-tessellation texture-rendering system 106 modifies the position of the vertex by changing positional values of the vertex. In some instances, the sharp-tessellation texture-rendering system 106 changes positional values of the vertex by changing a barycentric coordinate of the vertex. In some instances, the sharp-tessellation texture-rendering system 106 also defines and changes positions of vertices as uv coordinates and/or Cartesian coordinate that indicate a location of the vertices.

Furthermore, in some embodiments, the sharp-tessellation texture-rendering system 106 repositions (or modifies the positions of) multiple vertices within threshold distances of the nearest corresponding discontinuity line intersections (along the incident edges of the vertices) in accordance with one or more embodiments. By doing so, in reference to FIG. 7, the sharp-tessellation texture-rendering system 106 generates a modified 3D-object mesh (such as the modified 3D object mesh 718) with vertices of the tessellated 3D-object mesh repositioned along discontinuities of a sharpness map. Indeed, in one or more embodiments, the resulting modified 3D-object mesh includes vertices that form faces that enable the sharp-tessellation texture-rendering system 106 to correctly sample and filter a displacement map to preserve sharp features and also to prevent aliasing because individual faces more closely account for feature values that are defined as discontinuous by the sharpness map (e.g., without visual geometric aliasing effects that cause jagged features and/or a staircasing effect on sharp features). Indeed, in one or more embodiments, the sharp-tessellation texture-rendering system 106 utilizes a modified 3D-object mesh having vertices snapped along discontinuities (via sharp tessellation) with a sharpness map and a displacement map to generate (or render) a 3D object in accordance with one or more embodiments (e.g., in relation to FIGS. 2, 5, and 10).

Although one or more embodiments illustrate the sharp-tessellation texture-rendering system 106 performing sharp tessellation on a specific 3D-object mesh pattern, in one or more embodiments, the sharp-tessellation texture-rendering system 106 performs sharp tessellation utilizing a different number of vertices, edges, and faces (with different combinations, patterns, or shapes). Furthermore, in one or more embodiments, the sharp-tessellation texture-rendering system 106 performs tessellation utilizing a variety of sharpness map and/or displacement map configurations (e.g., having a different number of discontinuities).

In one or more additional embodiments, the sharp-tessellation texture-rendering system 106 utilizes a sharp-subdivision approach to subdivide incident edges of vertices based on identified discontinuity line intersections with a sharpness map to generate a modified 3D-object mesh. Indeed, the sharp-tessellation texture-rendering system 106 identifies one or more discontinuity line intersections within edges between vertices by referencing a sharpness map in accordance with one or more embodiments. Then, on a per-triangle basis, the sharp-tessellation texture-rendering system 106 determines one or more identified discontinuity line intersections corresponding to each face (e.g., triangle) of the 3D-object mesh. In some instances, the sharp-tessellation texture-rendering system 106 tags the edges having discontinuity line intersections (e.g., tagged as having discontinuity line intersections and with information for the location of the discontinuity line intersections).

To subdivide incident edges based on identified discontinuity line intersections, in one or more embodiments, the sharp-tessellation texture-rendering system 106 generates vertices positioned along edges and at locations where the edges include identified discontinuity line intersections. This, in one or more embodiments, causes edges to have subdivisions (or splits) and newly created faces within the 3D-object mesh. By doing so, in one or more embodiments, the sharp-tessellation texture-rendering system 106 generates faces in the 3D-object mesh that align with the discontinuities indicated in the sharpness map.

For instance, in one or more embodiments, to subdivide an edge of a 3D-object mesh based on a discontinuity line intersection, the sharp-tessellation texture-rendering system 106 first identifies incident edges of a vertex (for a face). For example, the sharp-tessellation texture-rendering system 106 identifies incident edges that for a face from a vertex by utilizing the edges between the vertex and one or more neighbor vertices (as described above). Then, the sharp-tessellation texture-rendering system 106 identifies one or more discontinuity line intersections between discontinuity lines of a sharpness map and the edges between the vertex and one or more neighbor vertices in accordance with one or more embodiments. Upon identifying the one or more discontinuity line intersections, the sharp-tessellation texture-rendering system 106 subdivides the corresponding edges by generating vertices that are positioned on each side of the one or more discontinuity line intersections (within a threshold distance as described above). In one or more embodiments, by subdividing edges at discontinuity line intersections, the sharp-tessellation texture-rendering system 106 generates a modified 3D-object mesh that adapts sampling features of faces to the discontinuities indicated in the sharpness map for the displacement map.

Figure 8:
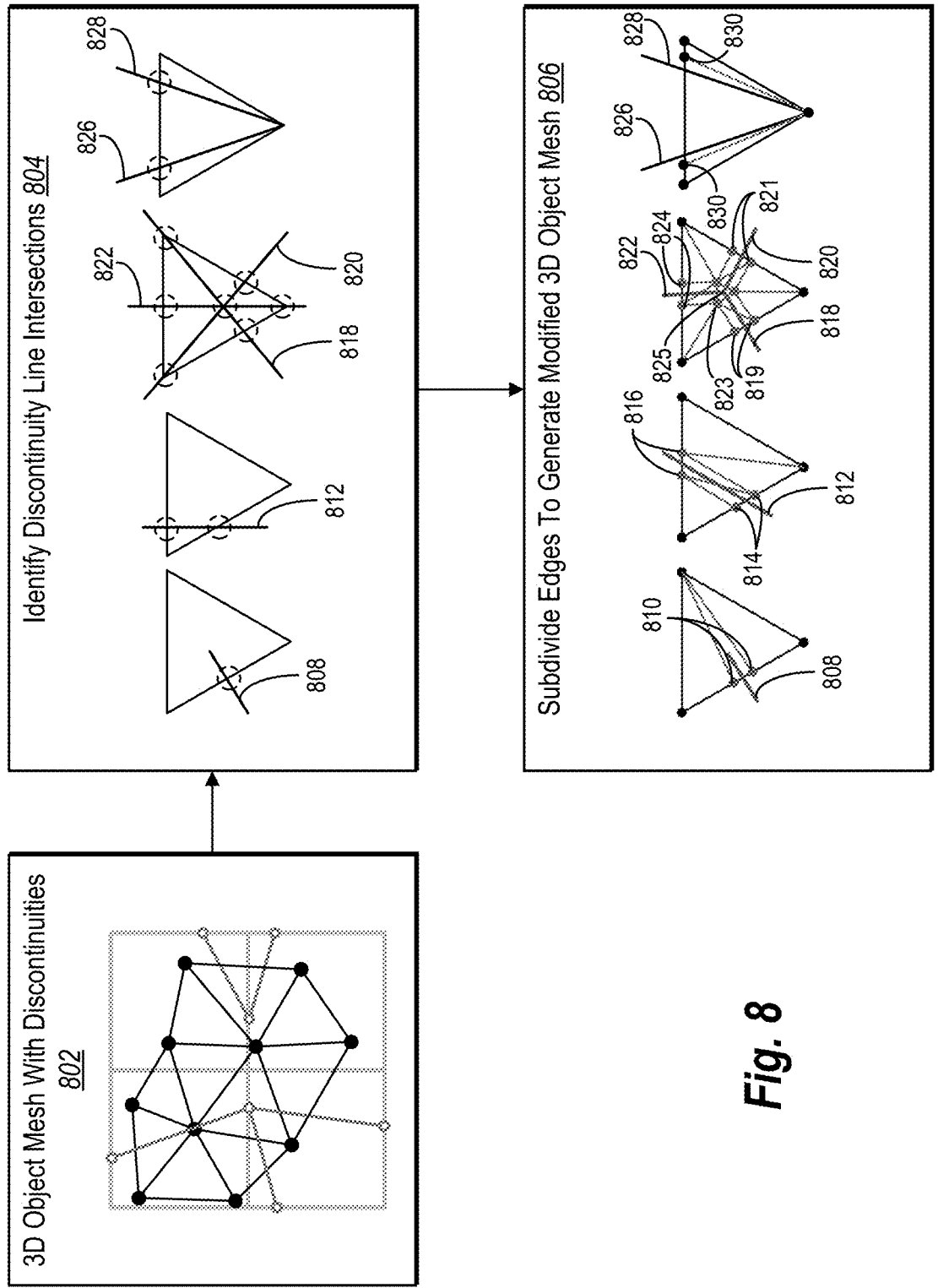
FIG. 8 illustrates the sharp-tessellation texture-rendering system utilizing a sharp-subdivision approach to subdivide (or split) one or more edges of a 3D-object mesh in accordance with one or more embodiments.

For instance, FIG. 8 illustrates the sharp-tessellation texture-rendering system 106 utilizing a sharp-subdivision approach to subdivide (or split) one or more edges of a 3D-object mesh based on a variety of discontinuity line configurations and/or types of discontinuity line intersections. As shown in FIG. 8, the sharp-tessellation texture-rendering system 106 utilizes a 3D-object mesh 802 with (referenced) discontinuities to identify discontinuity line intersections in an act 804. As an example, in FIG. 8, the sharp-tessellation texture-rendering system 106 identifies a face having an edge with a single discontinuity line intersection 808 (from the 3D-object mesh 802). Furthermore, as shown in FIG. 8, the sharp-tessellation texture-rendering system 106 subdivides the edge to generate a modified 3D-object mesh (in an act 806) by generating vertices 810 positioned a threshold distance from each side of the discontinuity line intersection 808. As illustrated in FIG. 8, by generating the vertices 810, the sharp-tessellation texture-rendering system 106 subdivides the edge (and the 3D-object mesh face) into three separate faces. Moreover, in reference to FIG. 8, the sharp-tessellation texture-rendering system 106 generates a 3D-object mesh that aligns the faces created by the generated vertices 810 along the discontinuity line intersection 808 (in the act 806).

Furthermore, as shown in FIG. 8, the sharp-tessellation texture-rendering system 106 also identifies a discontinuity line intersection 812 along two edges of a 3D-object mesh face (from the 3D-object mesh 802 and in the act 804). Moreover, as shown in FIG. 8, the sharp-tessellation texture-rendering system 106 subdivides both of the edges to generate the modified 3D-object mesh (in the act 806) by generating vertices 814 positioned a threshold distance from each side of the discontinuity line intersection 812 and also by generating vertices 816 positioned the threshold distance from each side of the discontinuity line intersection 812. As illustrated in FIG. 8, by generating the vertices 814 and 816, the sharp-tessellation texture-rendering system 106 subdivides the face into five faces that can individually adapt sampling features to the discontinuities indicated in the sharpness map for the displacement map.

Additionally, in some embodiments, the sharp-tessellation texture-rendering system 106 identifies multiple discontinuity line intersections with edges of a 3D-object mesh face. For instance, as shown in FIG. 8, the sharp-tessellation texture-rendering system 106 identifies, in a face from the 3D-object mesh 802, three discontinuity line intersections with edges corresponding to the face (e.g., discontinuity line intersections 818, 820, and 822) in the act 804. As further shown in FIG. 8, the sharp-tessellation texture-rendering system 106 subdivides each of the edges to generate the modified 3D-object mesh (in the act 806) by generating vertices 819 positioned a threshold distance from each side of discontinuity line intersection 818, vertices 821 positioned a threshold distance from each side of discontinuity line intersection 820, and vertices 824 positioned a threshold distance from each side of discontinuity line intersection 822. In addition, as illustrated in FIG. 8, the sharp-tessellation texture-rendering system 106 also identifies an intersection 825 of the three discontinuity lines within the 3D-object face with the discontinuity line intersections 818, 820, and 822. In response, as shown in FIG. 8, the sharp-tessellation texture-rendering system 106 also generates vertices positioned a threshold distance from each side of the intersection 825. As illustrated in FIG. 8, the sharp-tessellation texture-rendering system 106 generates the vertices 819, 821, 823, and 824 within the 3D-object mesh face to subdivide the face into a number of faces that can individually adapt sampling features to the discontinuities within the face.

In some instances, the sharp-tessellation texture-rendering system 106 identifies multiple discontinuity line intersections on a single incident edge (between a vertex and a neighbor vertex) from a face of a 3D-object mesh. For instance, as shown in FIG. 8, the sharp-tessellation texture-rendering system 106 identifies, in a face from the 3D-object mesh 802, two discontinuity line intersections with a single edge corresponding to the face (e.g., discontinuity line intersections 826 and 828) in the act 804. Then, as shown in FIG. 8, the sharp-tessellation texture-rendering system 106 subdivides the edge (having the discontinuity line intersections 826 and 828) to generate the modified 3D-object mesh (in the act 806) by generating vertices 830 positioned a threshold distance from the extremes of the incident edge having the discontinuity line intersections 826 and 828. As shown in FIG. 8, the sharp-tessellation texture-rendering system 106 positions the generated vertices 830 such that vertices create a face around (along the outside of) the discontinuity created by discontinuity line intersections 826 and 828.

For example, when an edge (l) includes multiple discontinuity line intersections, the sharp-tessellation texture-rendering system 106 generates vertices at the extreme positions of the edge ($\mu^l$) with a threshold distance offset ε (to subdivide an edge) in accordance with the following functions:

$$\mu_{min}^l = \left(\min_i \mu_i^l\right) - \varepsilon \text{ and } \mu_{max}^l = \left(\max_i \mu_i^l\right) + \varepsilon.$$

In some instances, the sharp-tessellation texture-rendering system 106 utilizes the above-mentioned function to subdivide an edge having various combinations of discontinuity line intersections (e.g., multiple discontinuity line intersections, closely grouped discontinuity line intersections).

In some instances, the sharp-tessellation texture-rendering system 106 does not identify discontinuity line intersections within edges belonging to a face of a 3D-object mesh. In such cases, the sharp-tessellation texture-rendering system 106 does not subdivide these edges. Indeed, in one or more embodiments, the sharp-tessellation texture-rendering system 106 maintains the pattern of the face having edges with no discontinuity line intersections without subdividing or introducing new vertices within these edges.

Upon subdividing various numbers of edges within a 3D-object mesh by generating vertices in accordance with one or more of the approaches described above, the sharp-tessellation texture-rendering system 106, in some embodiments, utilizes the modified 3D-object mesh having subdivided edges to filter displacement feature values of the displacement map within faces (of the modified 3D-object) created by the subdivided edges (from generated vertices) along discontinuities of the sharpness map. For instance, the sharp-tessellation texture-rendering system 106 utilizes the vertices of the modified 3D-object mesh as texture sampling points during filtering of the displacement feature values (along discontinuities of the sharpness map) in accordance with one or more embodiments. Additionally, in some instances, the sharp-tessellation texture-rendering system 106 performs sharp subdivision (as described above) within a geometry shader of the GPU pipeline (e.g., after tessellation of the 3D-object mesh).

In some embodiments, the sharp-tessellation texture-rendering system 106 retrieves a tessellated 3D-object mesh that includes faces aligned with discontinuities of a sharpness map (e.g., via sharp tessellation and/or sharp subdivision) from a real time GPU pipeline for storage (e.g., in a memory device). For instance, the sharp-tessellation texture-rendering system 106 captures primitives (e.g., faces) and/or vertices of the tessellated 3D-object mesh that are generated on the fly in a GPU pipeline to save the tessellated 3D-object mesh (e.g., in a buffer, storage location, memory file). Indeed, in some embodiments, the sharp-tessellation texture-rendering system 106 utilizes the stored tessellated 3D-object mesh for a variety of applications (e.g., to reuse the stored 3D-object mesh in between frames, to evaluate and/or perform physics calculations on the stored 3D-object mesh, utilize the stored 3D-object mesh in particle systems for efficiency).

In some instances, to capture a tessellated 3D-object mesh for storage, the sharp-tessellation texture-rendering system 106 utilizes a buffer in the GPU pipeline to actively store data (e.g., vertices, primitives) of the tessellated 3D-object mesh. In one or more embodiments, the sharp-tessellation texture-rendering system 106 allocates a buffer in advance (e.g., before generating the tessellated 3D-object mesh in a GPU pipeline). To allocate the buffer, in some embodiments, the sharp-tessellation texture-rendering system 106 determines a number of primitives that will result out of the tessellated 3D-object mesh. For example, the sharp-tessellation texture-rendering system 106 performs a pre-rendering pass on the 3D-object mesh with the sharpness map and displacement map to retrieve a number of primitives prior to clipping. Then, in some embodiments, the sharp-tessellation texture-rendering system 106 utilizes the determined number of primitives to allocate a buffer size and actively stores data (e.g., vertices, primitives) of the tessellated 3D-object mesh during rendering within the GPU pipeline. In one or more embodiments, the sharp-tessellation texture-rendering system 106 utilizes Transform Feedback from the OpenGL API to capture a tessellated 3D-object mesh for storage.

In some instances, the sharp-tessellation texture-rendering system 106 directly computes the number of primitives to allocate in a buffer size. For example, the sharp-tessellation texture-rendering system 106 computes the number of primitives (e.g., for triangular faces) based on a tessellation level (e.g., an even level) by utilizing the following equation:

$$\frac{3}{2}t^2.$$

In order to determine the size of a buffer for the capturing of the tessellated 3D-object mesh (e.g., the feedback buffer), the sharp-tessellation texture-rendering system 106 determines the byte size necessary to write each vertex of each primitive of the 3D-object mesh (e.g., in which vertices are duplicated as many times as they belong to separate primitives). Indeed, in one or more embodiments, the sharp-tessellation texture-rendering system 106 determines the size of the buffer in bytes (e.g., $b_{size}$) for a 3D-object mesh having n patches with retrieved attributes of size $a_{size}$ and at a tessellation level t by utilizing the following function:

$$b_{size} = \frac{9}{2}t^2 a_{size} n.$$

Furthermore, in some instances, the sharp-tessellation texture-rendering system 106 retrieves vertices and their attributes in the feedback buffer of size $b_{size}$. Then, in one or more embodiments, the sharp-tessellation texture-rendering system 106 identifies and removes duplicate vertices from the buffer to reconstruct a compact index list (e.g., utilizing an acceleration structure such as a map). In some instances, the sharp-tessellation texture-rendering system 106 constructs the structure of the compact index list based on position and texture coordinates of the vertices.

In one or more embodiments, to capture a tessellated 3D-object mesh for storage, the sharp-tessellation texture-rendering system 106 directly exports a unique index from vertex processing steps of a GPU pipeline (e.g., a vertex shader). In some instances, the sharp-tessellation texture-rendering system 106 retrieves data for vertices of the 3D-object mesh directly from a vertex shader (e.g., a vertex index). Furthermore, in one or more embodiments, the sharp-tessellation texture-rendering system 106 computes a unique index from the vertex index (of patch control points and barycentric coordinates of tessellated vertices) when tessellation is activated. In some instances, the sharp-tessellation texture-rendering system 106 utilizes the unique index from the vertex index to generate a new and coherent index for vertices further generated by a geometry shader.

In one or more embodiments, tessellation is performed by splitting vertices to create new vertices in which the vertices move progressively to form a next level of tessellation (e.g., hardware tessellation). The process of tessellation in many cases (e.g., when tessellating between even and odd numbers of vertices) introduces artifacts that depict an undulating surface for a 3D-object (e.g., swimming artifacts). In many instances, the undulation of the surface of a 3D-object is due to under-sampling of a displacement signal (from a displacement map) when a sampling pattern is constantly changing due to tessellation.

To resolve undulation during sampling of a displacement signal, the sharp-tessellation texture-rendering system 106, in some embodiments, utilizes power-of-two levels of tessellation to create new vertices in middle of each previous edge of a 3D-object mesh. In some embodiments, the sharp-tessellation texture-rendering system 106 utilizes linear interpolation between a middle of an edge and a final position of a vertex (moved or created from sharp tessellation and/or sharp subdivision in accordance with one or more embodiments) to obtain a smooth and continuous transition in a 3D-object mesh. During this multi-scale approach to tessellation, vertices at a given level of tessellation also exist in a higher level of tessellation to reduce (or avoid) undulation on surfaces of rendered 3D-objects. In order to account for the multi-scale aspects of tessellation within a GPU pipeline, the sharp-tessellation texture-rendering system 106, in some instances, mipmaps a displacement map (e.g., generates reduced resolution versions of the displacement map) rather than under-sampling an original displacement map with a coarse level of tessellation.

However, oftentimes, mipmapping a displacement map smooths features of the displacement map. As such, in one or more embodiments, the sharp-tessellation texture-rendering system 106 mipmaps both the displacement map and a corresponding sharpness map to preserve discontinuities of the displacement map in mipmapped versions of the displacement map. For instance, the sharp-tessellation texture-rendering system 106 mipmaps a displacement map by filtering texels of a displacement map into a reduced resolution version of the displacement map (e.g., sampling a displacement map in the middle of four texels to produce two lower resolution texels). In order to prevent the smoothing of features of the displacement map during mipmapping, the sharp-tessellation texture-rendering system 106 utilizes a sharpness map (generated for the displacement map in accordance with one or more embodiments) to preserve the sharp features of the displacement map.

In order to preserve discontinuities within mipmapped versions of the displacement map, in one or more embodiments, the sharp-tessellation texture-rendering system 106 filters a displacement map to generate a reduced resolution displacement map utilizing a sharpness map in accordance with one or more embodiments (e.g., to account for samples located on the same side of discontinuities in a displacement map). In certain instances, filtering the displacement map by utilizing a sharpness map is optimal when the displacement map and the sharpness map have similar (or the same) resolution (e.g., to avoid having to check multiple texels to determine which evaluation samples are in the same region as texture sampling point).

As such, in one or more embodiments, the sharp-tessellation texture-rendering system 106 mipmaps a sharpness map to generate reduced resolution sharpness maps that have similar resolutions to the mipmapped displacement maps. In some cases, a conventional mipmapping approach is not appropriate for the sharpness map as texels of the sharpness map are encoded with base discontinuity configurations with bit flags and discontinuity points that are relative to texel sizes of the sharpness map. Accordingly, in one or more embodiments, the sharp-tessellation texture-rendering system 106 generates a mipmapped sharpness map (e.g., a reduced resolution sharpness map) for a mipmapped displacement map (e.g., a reduced resolution displacement map) by identifying one or more partitions within a reduced resolution displacement map and subsequently generating one or more discontinuity lines within the reduced resolution sharpness map based on the identified one or more partitions.

In one or more embodiments, to generate a reduced resolution (e.g., mipmapped) sharpness map for a reduced resolution (e.g., mipmapped) displacement map, the sharp-tessellation texture-rendering system 106 first generates a reduced resolution displacement map (at a level l+1) using a displacement map (at a level l) and a sharpness map (at the level l). Then, in some embodiments, the sharp-tessellation texture-rendering system 106 generates a reduced resolution sharpness map (at a level l+1) by partitioning samples of the reduced resolution displacement map (at a level l+1) using the discontinuities from the sharpness map (at the level l). For example, the sharp-tessellation texture-rendering system 106 determines a configuration for discontinuities in the reduced resolution sharpness map (at a level l+1) that respects the identified at the reduced resolution displacement map (at a level l+1).

In some instances, the sharp-tessellation texture-rendering system 106 removes discontinuities from the reduced resolution sharpness map (at a level l+1) that separate samples (from texels) having similar values in the reduced resolution displacement map (at a level l+1). Furthermore, in one or more embodiments, this process is repeated until a desired mip level (l+n) is reached. Indeed, in certain instances, the sharp-tessellation texture-rendering system 106 generates displacement maps and sharpness maps at varying mip levels (l+n) to generate a set of mipmapped displacement maps and sharpness maps.

To illustrate the above-mentioned approach, the sharp-tessellation texture-rendering system 106 generates a reduced resolution (e.g., mipmapped) displacement map by filtering one or more identified feature values during sampling of a displacement map using a sharpness map (e.g., in accordance with one or more embodiments). Then, in certain instances, the sharp-tessellation texture-rendering system 106 identifies interpolation evaluation corner point positions at the center points of texels of the reduced resolution displacement map. To generate a reduced resolution (e.g., mipmapped) sharpness map for the reduced resolution displacement map, in one or more embodiments, the sharp-tessellation texture-rendering system 106 identifies one or more partitions within the reduced resolution displacement map by utilizing discontinuity lines from the sharpness map (e.g., the higher resolution sharpness map) and the newly identified interpolation evaluation corner point positions at the center points of texels of the reduced resolution displacement map. Subsequently, the sharp-tessellation texture-rendering system 106 generates (or encodes) discontinuity lines for texels of the reduced resolution sharpness map using the identified partitions of the reduced resolution displacement map.

Figure 9A:
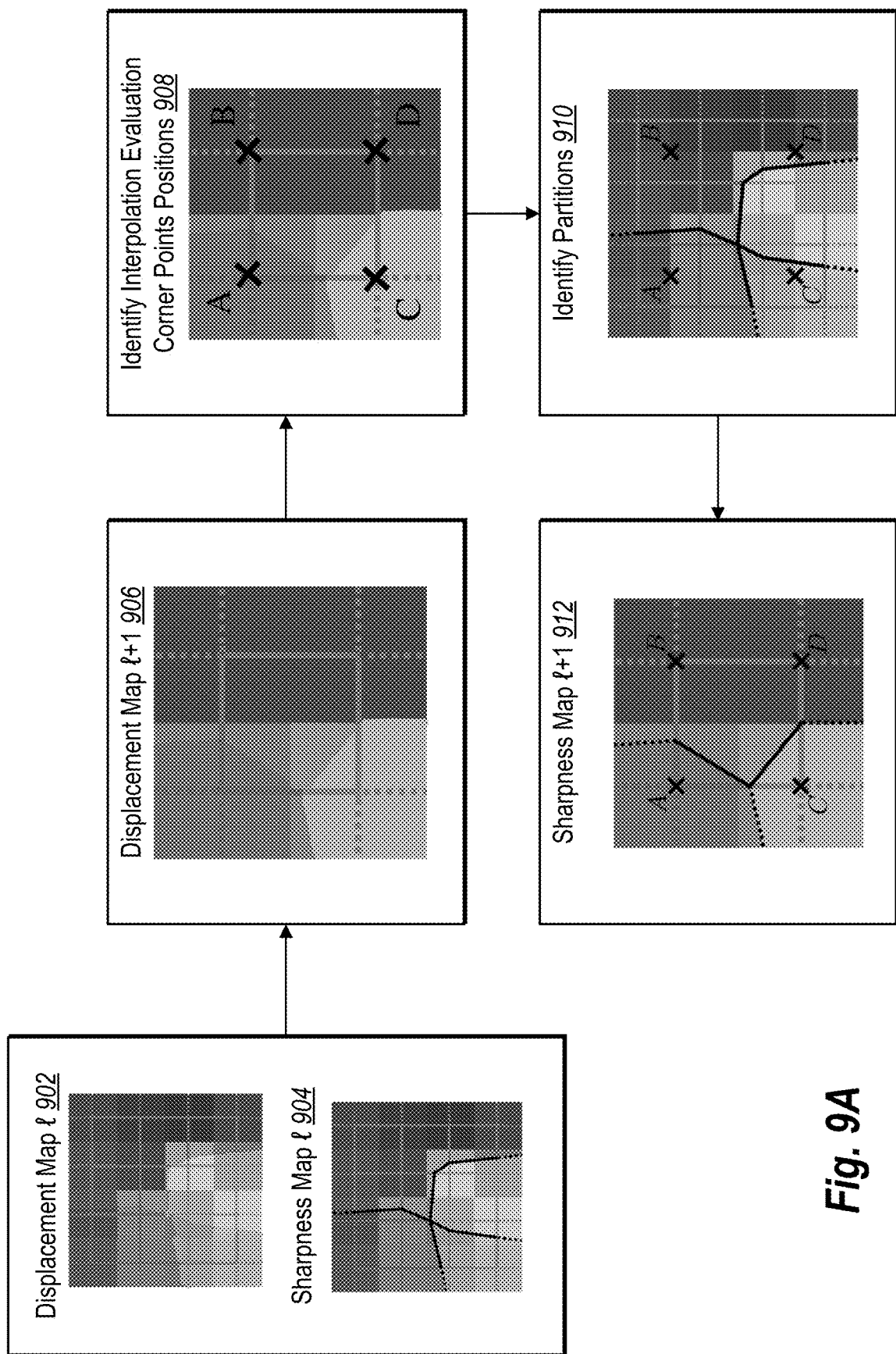
FIGS. 9A and 9B illustrate the sharp-tessellation texture-rendering system generating a reduced resolution sharpness map for a reduced resolution displacement map in accordance with one or more embodiments.

Indeed, FIG. 9A illustrates the sharp-tessellation texture-rendering system 106 generating a reduced resolution (e.g., mipmapped) sharpness map for a reduced resolution (e.g., mipmapped) displacement map. As shown in FIG. 9A, the sharp-tessellation texture-rendering system 106 identifies a displacement map 902 (at a level f) and a corresponding sharpness map 904 (at the level l). Then, as illustrated in FIG. 9A, the sharp-tessellation texture-rendering system 106 filters the displacement map 902 utilizing the sharpness map 904 (in accordance with one or more embodiments) to generate a reduced resolution displacement map 906 (at a level l+1). Indeed, as shown in FIG. 9A, the reduced resolution displacement map 906 includes a texel per four texels of the displacement map 902.

Furthermore, as shown in FIG. 9A, the sharp-tessellation texture-rendering system 106 identifies interpolation evaluation corner point positions within the reduced resolution displacement map 906 in an act 908. As illustrated in FIG. 9A, the sharp-tessellation texture-rendering system 106 identifies the interpolation evaluation corner point positions at center points of texels of within the reduced resolution displacement map 906. Additionally, as illustrated in FIG. 9A, the sharp-tessellation texture-rendering system 106 identifies partitions (in an act 910) for the reduced resolution displacement map 906 by grouping regions within the displacement map using the sharpness map 904 (at a level l) with respect to the positions of the interpolation evaluation corner point positions at center points of texels of within the reduced resolution displacement map 906.

In order to identify the partitions in the act 910, the sharp-tessellation texture-rendering system 106 partitions texels of the displacement map 902 (at the level l) by grouping together the texels if they belong to same region according to positions of the interpolation evaluation corner point from the reduced resolution displacement map 906 (at the level l+1) in relation to the discontinuities of the sharpness map 904 (at the level l). The identified partitions from the discontinuities of the sharpness map 904 (at the level l) are then utilized to determine partitions within the reduced resolution displacement map 906 (at the level l+1).

For instance, in some embodiments, as shown in FIG. 9A, the sharp-tessellation texture-rendering system 106 identifies discontinuity points along edges of texels that align with the positions of the interpolation evaluation corner point from the reduced resolution displacement map 906 (at the level l+1) in the act 910. In one or more embodiments, the sharp-tessellation texture-rendering system 106 positions discontinuity points at an averaged location between all intersections of discontinuities from the sharpness map 904 (at the level l) on an edge created between positions of the interpolation evaluation corner points from the reduced resolution displacement map 906 (at the level l+1). As illustrated in FIG. 9A, the edges created between positions of the interpolation evaluation corner point from the reduced resolution displacement map 906 (at the level l+1) correspond to texel edges of a reduced resolution sharpness map 912 (at the level l+1).

To illustrate, in reference to FIG. 9A, the sharp-tessellation texture-rendering system 106 identifies a texel edge for the reduced resolution sharpness map (at the level l+1) by utilizing an edge between positions of the interpolation evaluation corner points C and D from the reduced resolution displacement map 906 (at the level l+1) (in the act 910). Then, the sharp-tessellation texture-rendering system 106 (in the act 910) identifies intersections of discontinuities from the sharpness map 904 (at the level l) on an edge created between positions of the interpolation evaluation corner points C and D. Moreover, as shown in FIG. 9A, the sharp-tessellation texture-rendering system 106 utilizes an averaged location of the intersections (from the sharpness map 904 (at the level l)) to generate a discontinuity point along the edge created between positions of the interpolation evaluation corner points C and D (for the reduced resolution sharpness map 912 (at the level l+1)). By doing so, as shown in FIG. 9A, the sharp-tessellation texture-rendering system 106 merges discontinuities representing features that are below a single texel length of a texel of the reduced resolution sharpness map 912 (at the level l+1).

Subsequently, as shown in FIG. 9A, upon identifying discontinuity points along edges of texels that align with the positions of the interpolation evaluation corner point from the reduced resolution displacement map 906 (at the level l+1), the sharp-tessellation texture-rendering system 106 determines discontinuity configurations between the identified discontinuity points to generate the reduced resolution sharpness map 912 (at the level l+1). In particular, as shown in FIG. 9, the sharp-tessellation texture-rendering system 106 determines discontinuity configurations between the identified discontinuity points to generate the reduced resolution sharpness map 912 (at the level l+1) that respect the partitions identified in the act 910. Accordingly, as illustrated in FIG. 9A, the sharp-tessellation texture-rendering system 106 generates the reduced resolution sharpness map 912 (at the level l+1) having discontinuities for the reduced resolution displacement map 906 (at the level l+1).

In some embodiments, the sharp-tessellation texture-rendering system 106 removes discontinuities from a reduced resolution sharpness map (at a level l+1) when a discontinuity is identified as separating samples having feature values that are determined to be similar compared to a threshold similarity. For example, the sharp-tessellation texture-rendering system 106 samples one or more texels from a reduced resolution displacement map on each side of discontinuities of a reduced resolution sharpness map. Subsequently, in certain instances, the sharp-tessellation texture-rendering system 106 compares the one or more texels on opposing sides of a discontinuity to determine whether the texels are similar in value (e.g., in grayscale color values and/or in a height value). For example, the sharp-tessellation texture-rendering system 106 determines a similarity distance (e.g., Euclidian distances, CIELAB Delta E 2000 function) between feature values of the texels and compares the distances to a threshold similarity distance. If the one or more texels on opposing sides of a discontinuity have a similarity distance that satisfies (e.g., is less than or equal to) the threshold similarity distance, the sharp-tessellation texture-rendering system 106, in some embodiments, removes the discontinuity from the reduced resolution sharpness map (at a level l+1).

Additionally, in one or more embodiments, the sharp-tessellation texture-rendering system 106 selects a mip level according to a determined tessellation level to select from the set of mipmapped displacement maps and sharpness maps. In particular, in certain instances, the sharp-tessellation texture-rendering system 106 determines a tessellation level within a GPU pipeline (e.g., a tessellation control shader). Then, in certain embodiments, the sharp-tessellation texture-rendering system 106 determines a mip level that corresponds to a displacement map and sharpness map that results in a sampling rate that samples every texel of a displacement map and also results in the sampling of a different texel at each vertex of the tessellation level. However, in most GPU pipelines, a sampling pattern of a tessellator unit is non-configurable.

Accordingly, to achieve the desired sampling rate, in some instances, the sharp-tessellation texture-rendering system 106 identifies a mip level for the displacement maps and sharpness maps in which the edges (of the tessellation vertices) are (on average) one-texel length (of the displacement map and sharpness map). In some embodiments, the sharp-tessellation texture-rendering system 106 identifies a mip level that limits the edges (of the tessellation vertices) to at most one-texel length (of the displacement map and sharpness map). By doing so, in some embodiments, the sharp-tessellation texture-rendering system 106 ensures that edges (of the tessellation vertices) cross at most three texels (of the displacement map and sharpness map).

Figure 9B:
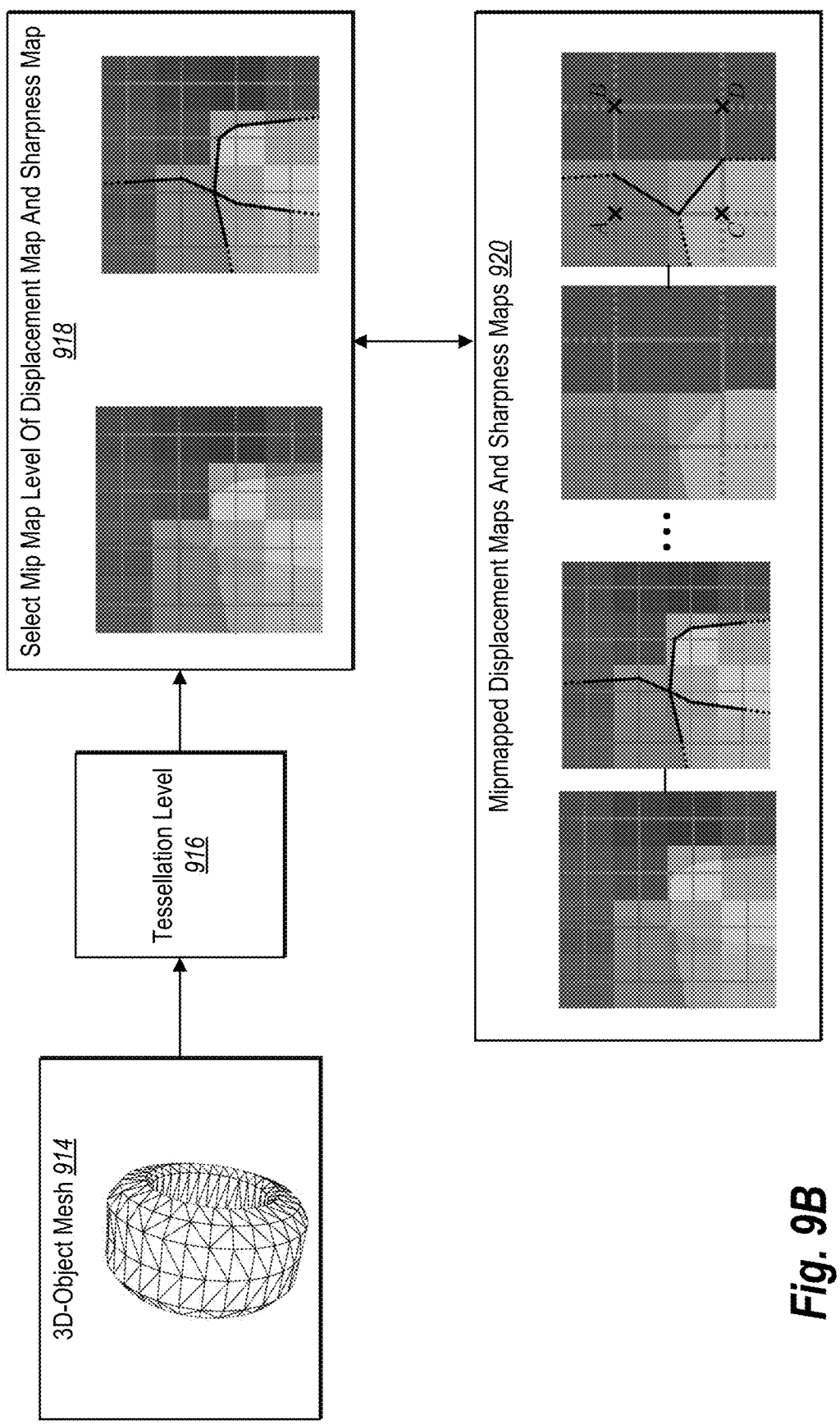

For instance, FIG. 9B illustrates the sharp-tessellation texture-rendering system 106 identifying (or selecting) a mip level and utilizing the mip level to select a mipmapped displacement map and mipmapped sharpness map. For instance, as shown in FIG. 9B, the sharp-tessellation texture-rendering system 106 identifies (or determines) a tessellation level 916 for a 3D-object mesh 914 (e.g., a number of subdivisions corresponding to a tessellation pattern that will be performed on the 3D-object mesh). Then, as shown in FIG. 9B, the sharp-tessellation texture-rendering system 106 selects a mip map level of a displacement map and sharpness map (in an act 918) based on the tessellation level 916 (from a set of mipmapped displacement maps and sharpness maps 920).

In particular, as shown in FIG. 9B, the sharp-tessellation texture-rendering system 106 determines a tessellation level 916. For instance, the sharp-tessellation texture-rendering system 106 identifies a selected tessellation level $l_t$ from a configuration of the GPU pipeline (e.g., a user configured tessellation level). In some instances, the tessellation level $l_t$ reflects the number of subdivisions to perform on patches of the 3D-object mesh and/or a tessellation pattern configuration. In some instances, the sharp-tessellation texture-rendering system 106 determines the tessellation level $l_t$ upon performing tessellation within a GPU pipeline.

Then, as shown in FIG. 4B, the sharp-tessellation texture-rendering system 106 selects a mip map level (in the act 918). For example, the sharp-tessellation texture-rendering system 106 identifies a mip level (e.g., the highest mip level) which ensures that edges (of the tessellation vertices) are at most one-texel length (of the displacement map and sharpness map). Then, in one or more embodiments, the sharp-tessellation texture-rendering system 106 determines an upper bound for the edge size $e_{size}$ from the tessellation level $l_t$ (and a uv-coordinate of a patch corner). In some cases, when a tessellator utilizes a triangular pattern, the sharp-tessellation texture-rendering system 106 identifies an upper bound for the edge size $e_{size}$ by identifying medians of triangles that are subdivided an $l_t$ number of times. In some instances, the sharp-tessellation texture-rendering system 106 identifies a median of the triangles by subdividing 2 times on each side of a triangle centroid. For example, the sharp-tessellation texture-rendering system 106 determines an upper bound for the edge size $e_{size}$ based on an upper bound of a median triangle length $m_{size}$ for the tessellation level $l_t$ by utilizing the following equation:

$$e_{size} = \frac{4 * m_{size}}{3 * l_t}.$$

Then, in some embodiments, the sharp-tessellation texture-rendering system 106 utilizes the upper bound for the edge size $e_{size}$ to identify a mip level (e.g., the highest mip level) which ensures that edges (of the tessellation vertices) are at most one-texel length (of the displacement map and sharpness map). In particular, the sharp-tessellation texture-rendering system 106 scales the upper bound for the edge size $e_{size}$ by a texture size to determine a mip level. For instance, the sharp-tessellation texture-rendering system 106 determines a mip level τ based on the upper bound for the edge size $e_{size}$ and a texture size $t_{size}$ by utilizing the following equation:

$$\tau = \log_2(t_{size} * e_{size})$$

Furthermore, as shown in FIG. 9B, the sharp-tessellation texture-rendering system 106 utilizes a selected mip map level to select a mipmapped displacement map and mipmapped sharpness map from a set of mipmapped displacement maps and mipmapped sharpness maps 920. For example, the sharp-tessellation texture-rendering system 106 generates (or accesses) a set of mipmapped displacement maps and sharpness maps as described above (e.g., in relation to FIG. 9A). Then, in one or more embodiments, the sharp-tessellation texture-rendering system 106 utilizes the mip level τ (selected in accordance with one or more embodiments) to identify a displacement map and sharpness map from a set of mipmapped displacement maps and sharpness maps.

In some embodiments, the sharp-tessellation texture-rendering system 106 sets a different tessellation level for different (adjacent) patches (of a 3D-object mesh). Furthermore, in such cases, the sharp-tessellation texture-rendering system 106 utilizes a matching tessellation level (and matching mip level) on a shared border of the different (adjacent) patches. By doing so, the sharp-tessellation texture-rendering system 106 removes the appearance of cracks along the borders of different patches due to duplicated vertices along the border sampling different values. Accordingly, in one or more embodiments, the sharp-tessellation texture-rendering system 106 sets a different tessellation level for an inner patch and an outer patch. Indeed, in some instances, when utilizing triangular patches, the sharp-tessellation texture-rendering system 106 sets an inner patch tessellation level and three outer tessellation levels corresponding to each border of the inner patch.

Furthermore, the sharp-tessellation texture-rendering system 106 provides a mip level selection for the inner patch and the bordering outer patches. In one or more embodiments, the sharp-tessellation texture-rendering system 106 utilizes a mip level determined by the above-mentioned approach based on the upper bound of a median triangle length $m_{size}$. For the bordering outer patches, the sharp-tessellation texture-rendering system 106 determines a mip level by defining an upper bound for an edge size $e_{size}$ of the outer patch border as the length of the outer patch border divided by a tessellation level selected for the outer patch. For instance, the sharp-tessellation texture-rendering system 106 determines the mip levels and, then identifies a displacement map and sharpness map from a set of mipmapped displacement maps and sharpness maps for the inner and outer patches.

Additionally, in some embodiments, the sharp-tessellation texture-rendering system 106 utilizes a modified 3D-object mesh having vertices snapped to discontinuities of a sharpness map to sample and filter a displacement map to generate a filtered displacement texture within a GPU pipeline. In addition, the sharp-tessellation texture-rendering system 106 utilizes the modified 3D-object mesh to generate, for display within a graphical user interface, a 3D object. For example, FIG. 10 illustrates the sharp-tessellation texture-rendering system 106 utilizing a GPU pipeline to generate a 3D object by utilizing modified 3D-object mesh (having vertices snapped to discontinuities of a sharpness map) with a filtered displacement texture.

Figure 10:
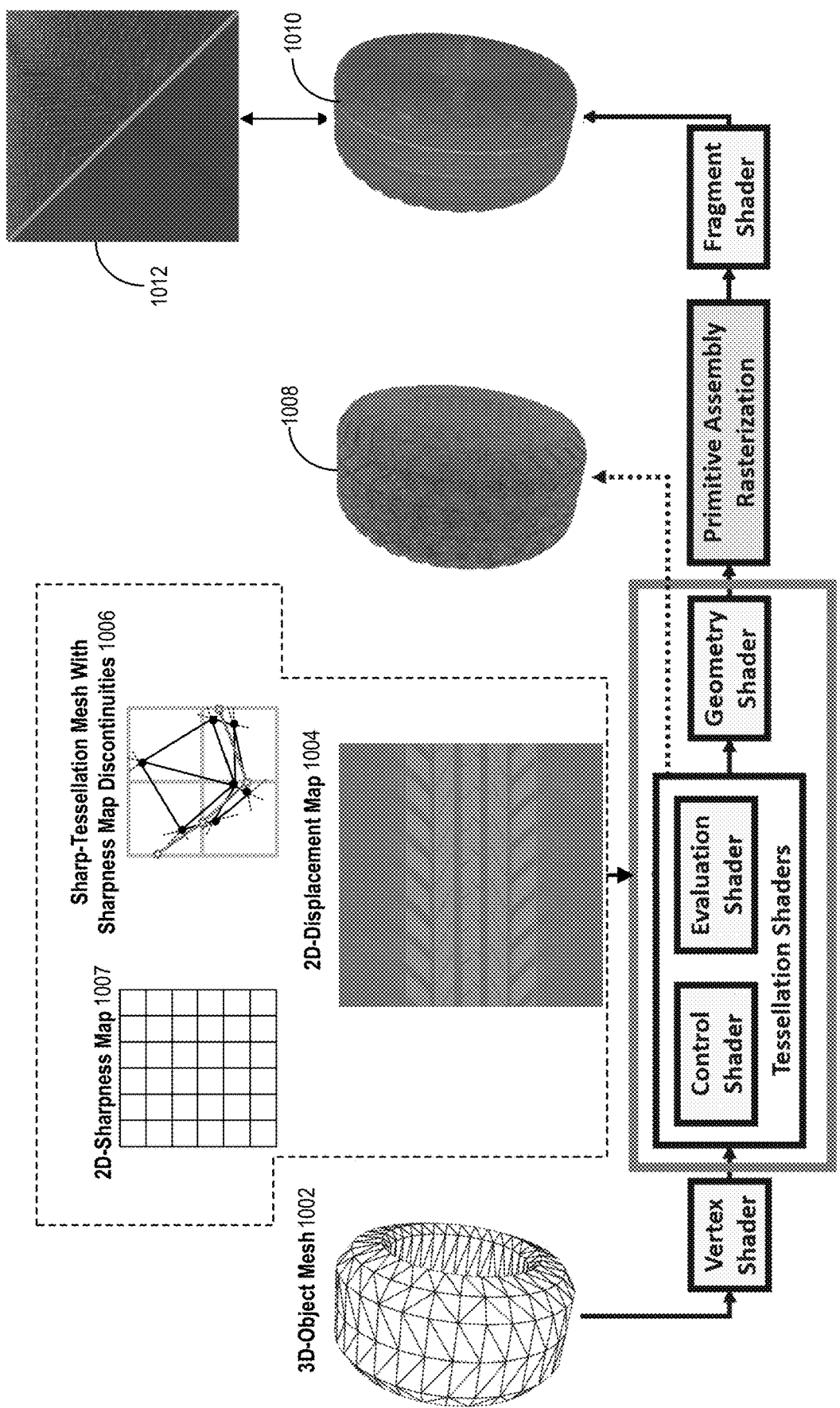
FIG. 10 illustrates a rendering pipeline within which the sharp-tessellation texture-rendering system acts to generate a 3D object in accordance with one or more embodiments.

As shown in FIG. 10, the sharp-tessellation texture-rendering system 106 provides a 3D-object mesh 1002, a 2D-displacement map 1004, and a 2D-sharpness map 1007 to a GPU pipeline that includes a vertex shader, tessellation shaders, and geometry shaders. In some instances, the sharp-tessellation texture-rendering system 106 utilizes the tessellation shaders to set up a level of tessellation for each patch (or face) of the 3D-object mesh 1002. Furthermore, in one or more embodiments, the sharp-tessellation texture-rendering system 106 utilizes the 2D-sharpness map 1007 with the 3D-object mesh 1002 to perform sharp tessellation and generate a sharp-tessellation mesh with sharpness map discontinuities 1006 (in accordance with one or more embodiments). Then, the sharp-tessellation texture-rendering system 106, in one or more embodiments, samples and filters the 2D-displacment map 1004 to generate a 2D-displacement texture for the 3D-object mesh 1008. Although FIG. 10 illustrates one type of GPU pipeline, in some embodiments, the sharp-displacement texture-rendering system 106 can utilize a variety of GPU pipelines such as, but not limited to, a GPU pipeline that utilizes mesh shaders, a GPU pipeline that utilizes compute shaders or non-graphical GPU computing (e.g., CUDA, OpenCL), and/or a GPU pipeline that emulates a hardware tessellator unit using instanced tessellation.

In one or more embodiments, the sharp-tessellation texture-rendering system 106 utilizes the evaluation shader of the tessellation shaders to displace generated vertices of the sharp-tessellation mesh with sharpness map discontinuities 1006 based on the filtered 2D-displacement texture. As shown in FIG. 10, the tessellation shaders result in a displaced 3D-object mesh 1008 with displaced vertices according to the filtered displacement texture. Furthermore, as illustrated in FIG. 10, the sharp-tessellation texture-rendering system 106 utilizes a geometry shader, primitive assembly rasterization, and a fragment shader to render a 3D object 1010 that includes properties of the displaced 3D-object mesh 1008 and one or more other properties (e.g., color textures, Bidirectional Reflectance Distribution Function textures). Although FIG. 10 illustrates specific components of a GPU pipeline, the sharp-tessellation texture-rendering system 106 utilizes various combination of the illustrated components and additional components within a GPU pipeline to render a 3D object from a filtered displacement texture with a modified 3D-object mesh having vertices snapped to discontinuities of a sharpness map in accordance with one or more embodiments.

As shown in FIG. 10, the sharp-tessellation texture-rendering system 106 utilizes a filtered displacement texture that preserves discontinuities of a displacement map by utilizing a sharpness map with a 3D-object mesh to generate a 3D object that depicts surfaces (e.g., surface offsets) based on grayscale color values of a filtered displacement texture. In addition, as shown in FIG. 10, the sharp-tessellation texture-rendering system 106 utilizes the sharp-tessellation mesh with sharpness map discontinuities 1006 to further prevent geometric aliasing effects during displacement of surfaces of the 3D object. For instance, as illustrated in FIG. 10, the rendered 3D object 1010 depicts sharp displacement features 1012 without geometric aliasing effects based on the filtered displacement texture and the sharp-tessellation mesh with sharpness map discontinuities 1006. Indeed, in one or more embodiments, the sharp-tessellation texture-rendering system 106 provides the generated 3D object 1010 for display within graphical user interface of a client device. Indeed, in some embodiments, the sharp-tessellation texture-rendering system 106 renders and displays various numbers of 3D objects within a 3D scene that preserve sharp displacement feature through the use of sharpness maps and sharp tessellation (or sharp subdivision) in accordance with one or more embodiments.

As mentioned above, by utilizing a sharp tessellation in accordance with one or more embodiments, the sharp-tessellation texture-rendering system 106 accurately preserves sharp features of a 2D-displacement map while sampling the 2D-displacement map for a 3D-object mesh without introducing visual artifacts. For instance, FIGS. 11A-11D illustrate examples of rendered 3D-objects utilizing sharp tessellation in accordance with one or more embodiments compared with rendered 3D-objects utilizing conventional hardware tessellation. As shown in FIGS. 11A-11D, by utilizing sharp tessellation, the sharp-tessellation texture-rendering system 106 accurately preserves sharp features without introducing visual artifacts (e.g., such as visual geometric aliasing effects).

Figure 11A:
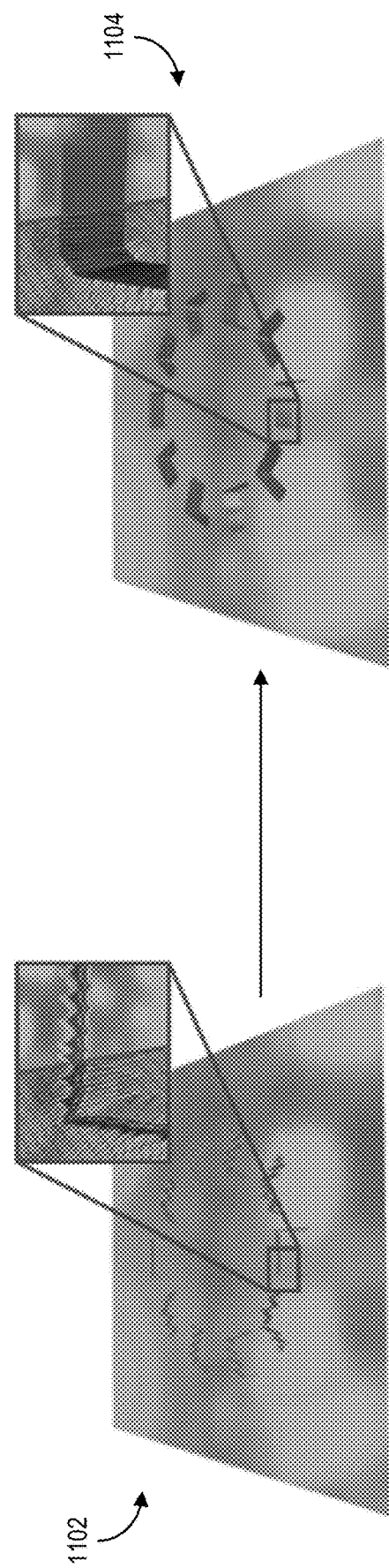
FIGS. 11A-11D illustrate comparisons of rendering utilizing conventional hardware tessellation and sharp tessellation in accordance with one or more embodiments.
Figure 11B:
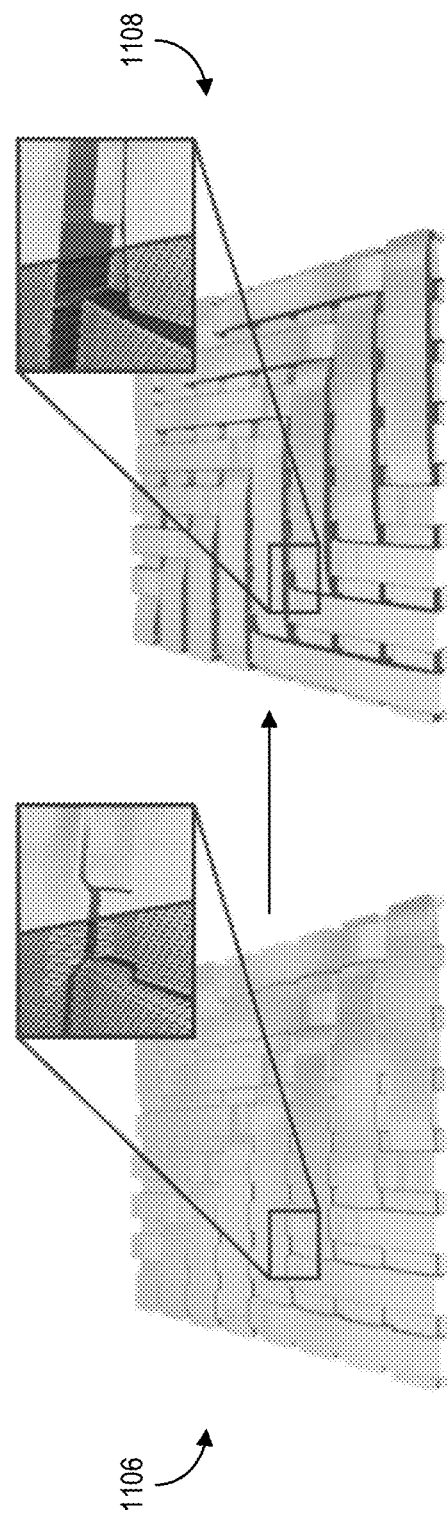
Figure 11C:
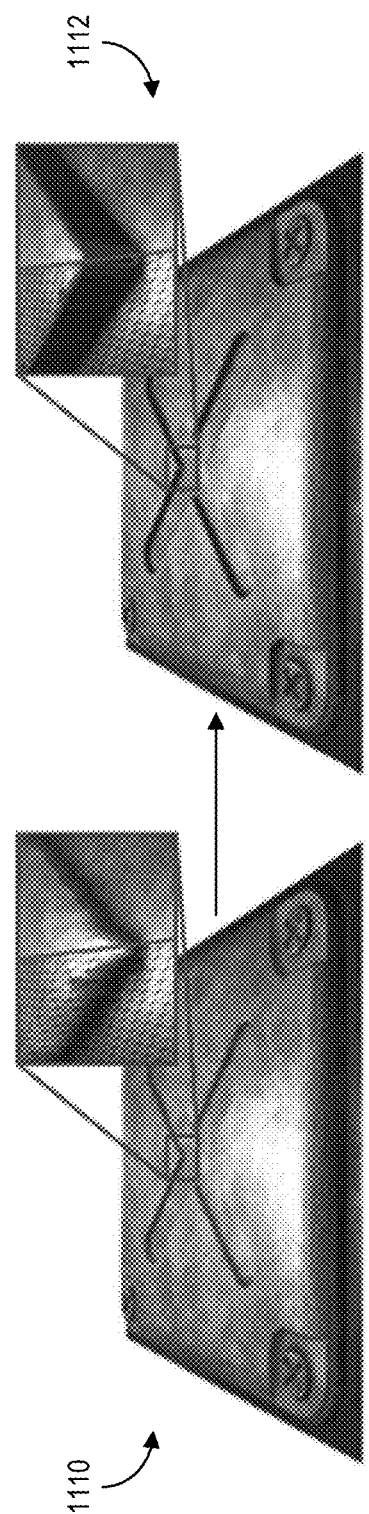
Figure 11D:
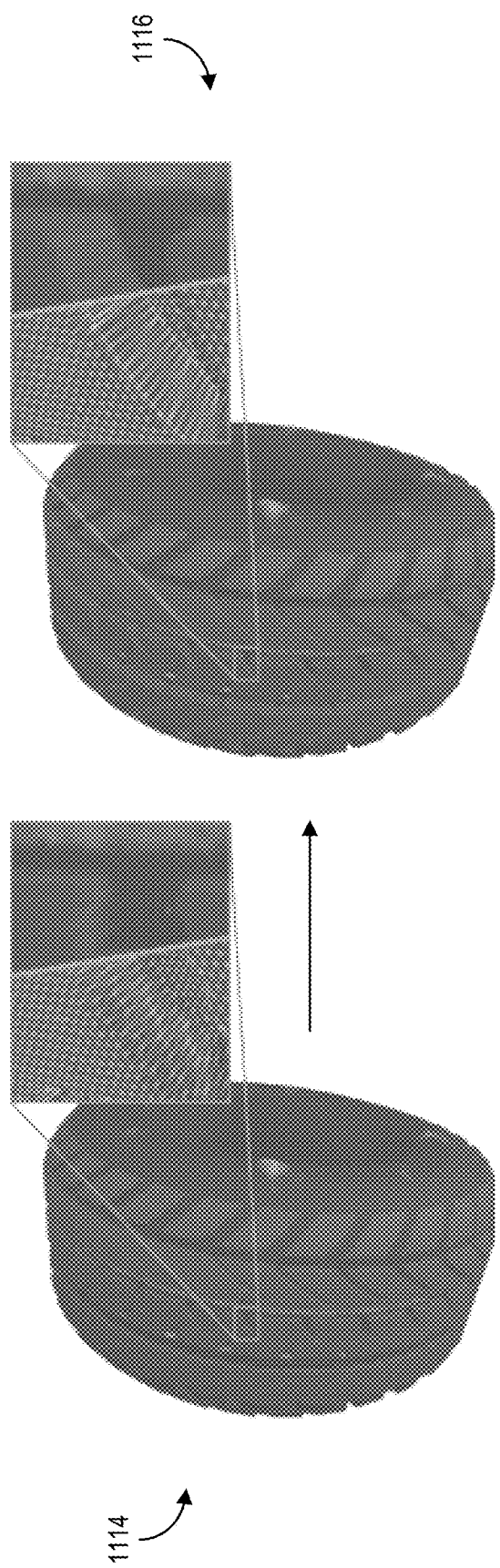

In particular, as shown in FIG. 11A, illustrates a square pattern 3D object 1102 rendered utilizing a conventional graphics system (e.g., conventional tessellation) in comparison to a square pattern 3D object 1104 rendered utilizing sharp tessellation (as described above). Unlike the square pattern 3D object 1102 (from a conventional graphics system), the square pattern 3D object 1102 (from sharp tessellation) accurately preserves sharp without introducing visual artifacts. Indeed, FIG. 11B further illustrates a weave pattern 3D object 1106 (from a conventional graphics system) compared to a weave pattern 3D object 1108 (from sharp tessellation). Moreover, FIG. 11C illustrates a cross panel pattern 3D object 1110 (from a conventional graphics system) compared to a cross panel pattern 3D object 1112 (from sharp tessellation). In addition, FIG. 11D illustrates a tire model 3D object 1114 (from a conventional graphics system) compared to a tire model 3D object 1116 (from sharp tessellation).

As illustrated in FIGS. 11A-11D, by utilizing sharp tessellation with sharpness maps that indicate discontinuities for displacement maps, the sharp-tessellation texture-rendering system 106 results in rendered 3D objects that accurately preserve (and depict) sharp without introducing visual artifacts in comparison to conventional graphics systems. Indeed, as shown in FIGS. 11A-11D, the sharp-tessellation texture-rendering system 106 reconstructs extrusion features correctly and provides an accurate rendering of the actual geometry in comparison to the 3D objects generated by the conventional graphics system. Furthermore, as shown by the various 3D objects in FIGS. 11A-11D, by utilizing sharp tessellation with sharp-displacement maps, the sharp-tessellation texture-rendering system 106 avoids aliasing artifacts, demonstrates the actual geometry, reconstructs discontinuity between layered surfaces (e.g., the weave pattern), and improves the visual accuracy of textured models.

Figure 12:
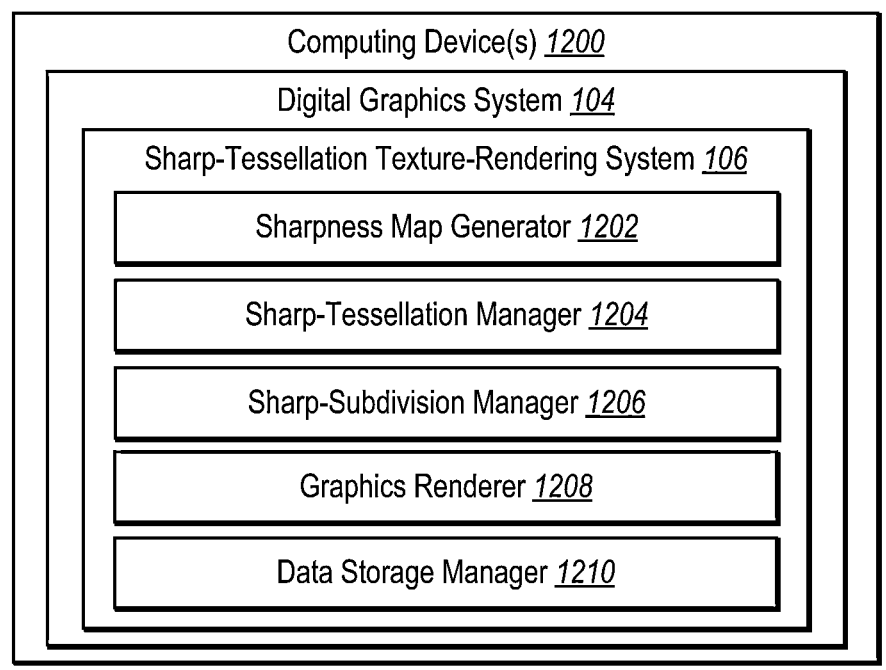
FIG. 12 illustrates an example architecture of a sharp-tessellation texture-rendering system in accordance with one or more embodiments.

Turning now to FIG. 12, additional detail will be provided regarding components and capabilities of one or more embodiments of the sharp-tessellation texture-rendering system. In particular, FIG. 12 illustrates an embodiment of an example sharp-tessellation texture-rendering system 106 executed by a computing device 1200 (e.g., the server device(s) 102). As shown by the embodiment of FIG. 12, the computing device 1200 includes or hosts the digital graphics system 104 and the sharp-tessellation texture-rendering system 106. Furthermore, as shown in FIG. 12, the sharp-tessellation texture-rendering system 106 includes a sharpness map generator 1202, a sharp-tessellation manager 1204, a sharp-subdivision manager 1206, a graphics renderer 1208, and a data storage manager 1210.

As just mentioned, and as illustrated in the embodiment of FIG. 12, the sharp-tessellation texture-rendering system 106 includes the sharpness map generator 1202. For instance, the sharpness map generator 1202 encodes texels with one or more discontinuity points and discontinuity base configurations to reconstruct discontinuities for a displacement map as described above (e.g., in relation to FIGS. 3 and 4). Moreover, in some embodiments, the sharpness map generator 1202 utilizes user selections of discontinuity lines and/or discontinuity lines detected by a digital contour detector for a displacement map to encode discontinuities within a sharpness map as described above (e.g., in relation to FIGS. 3 and 4). Additionally, in one or more embodiments, the sharpness map generator 1202 generates reduced resolution (e.g., mipmapped) sharpness maps as described above (e.g., in relation to FIGS. 9A and 9B).

Furthermore, as shown in FIG. 12, the sharp-tessellation texture-rendering system 106 includes the sharp-tessellation manager 1204. For instance, the sharp-tessellation manager 1204 tessellates a 3D-object mesh to subdivide patches of the 3D-object mesh as described above (e.g., in relation to FIGS. 5, 6, 7, and 10). Furthermore, in some instances, the sharp-tessellation manager 1204 identifies one or more discontinuity line intersections between one or more discontinuity lines of the 2D-sharpness map and incident edges of vertices as described above (e.g., in relation to FIGS. 5 and 6). Furthermore, in some embodiments, the sharp-tessellation manager 1204 generates a modified 3D-object mesh by modifying positions of one or more vertices of a 3D-object mesh based on discontinuity line intersections as described above (e.g., in relation to FIGS. 2, 5, and 7).

As further illustrated in FIG. 12, the sharp-tessellation texture-rendering system 106 includes the sharp-subdivision manager 1206. In some embodiments, the sharp-subdivision manager 1206 identifies one or more discontinuity line intersections within edges between vertices of a 3D-object mesh by referencing a sharpness map as described above (e.g., in relation to FIG. 8). Furthermore, in some instances, the sharp-subdivision manager 1206 subdivides one or more edges of a 3D-object mesh based on discontinuity line intersections by generating one or more vertices on the one or more edges as described above (e.g., in relation to FIG. 8).

As also illustrated in FIG. 12, the sharp-tessellation texture-rendering system 106 includes the graphics renderer 1208. In one or more embodiments, the graphics renderer 1208 utilizes a sharpness map, a displacement map, and a 3D-object mesh with one or more components of a GPU pipeline to generate a modified 3D-object mesh having vertices snapped to discontinuities (e.g., via sharp tessellation) and a filtered displacement texture as described above (e.g., in relation to FIGS. 2 and 10). Furthermore, in some embodiments, the graphics renderer 1208 generates a 3D object having surface normal offsets (e.g., a displaced surface) corresponding to sharp feature displacements of a filtered displacement texture and a modified 3D-object mesh having vertices snapped to discontinuities (e.g., via sharp tessellation) as described above (e.g., in relation to FIGS. 2 and 10). Indeed, in one or more embodiments, the graphics renderer 1208 provides for displays within a graphical user interface of a client device, a rendered 3D object as described above (e.g., in relation to FIG. 10).

Furthermore, in one or more embodiments, the graphics renderer 1208 samples one or more feature values of a displacement map. In addition, in one or more embodiments, the graphics renderer 1208 filters (e.g., via bilinear interpolation) the one or more sampled feature values (using a modified 3D-object mesh having vertices snapped to discontinuities) with a region defined by a sharpness map discontinuity to preserve sharp features of the displacement map as described above.

Furthermore, as shown in FIG. 12, the sharp-tessellation texture-rendering system 106 includes the data storage manager 1210. In some embodiments, the data storage manager 1210 is implemented by one or more memory devices. Moreover, in some embodiments, the data storage manager 1210 maintains data to perform one or more functions of the sharp-tessellation texture-rendering system 106. For instance, the data storage manager 1210 includes 3D-object mesh data (e.g., vertices, edges, polygonal faces), sharp tessellation data (e.g., discontinuity line intersection positions, vertex positions, threshold distances, tessellation level configurations, 3D-object mesh vertex indexes), displacement maps (texel data, feature value data), sharpness maps (e.g., base discontinuity configurations, discontinuity points, texel data), GPU pipeline data (e.g., tessellation shader data, geometry shader data, vertex shader data, rasterization data, fragment shader data), digital contour detection data, and graphical user interface data (e.g., user input tools, displacement map display data).

Each of the components 1202-1210 of the computing device 1200 (e.g., the computing device 1200 implementing the sharp-tessellation texture-rendering system 106), as shown in FIG. 12, may be in communication with one another using any suitable technology. The components 1202-1210 of the computing device 1200 can comprise software, hardware, or both. For example, the components 1202-1210 can comprise one or more instructions stored on a computer-readable storage medium and executable by processor of one or more computing devices. When executed by the one or more processors, the computer-executable instructions of the sharp-tessellation texture-rendering system 106 (e.g., via the computing device 1200) can cause a client device and/or server device to perform the methods described herein. Alternatively, the components 1202-1210 and their corresponding elements can comprise hardware, such as a special purpose processing device to perform a certain function or group of functions. Additionally, the components 1202-1210 can comprise a combination of computer-executable instructions and hardware.

Furthermore, the components 1202-1210 of the sharp-tessellation texture-rendering system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1202-1210 may be implemented as a stand-alone application, such as a desktop or mobile application. Furthermore, the components 1202-1210 may be implemented as one or more web-based applications hosted on a remote server. The components 1202-1210 may also be implemented in a suite of mobile device applications or "apps." To illustrate, the components 1202-1210 may be implemented in an application, including but not limited to, ADOBE PHOTOSHOP, ADOBE PREMIERE, ADOBE LIGHTROOM, ADOBE ILLUSTRATOR, ADOBE SUBSTANCE, ADOBE SUBSTANCE PAINTER, ADOBE SUBSTANCE DESIGNER, ADOBE SUBSTANCE ALCHEMIST, AND/OR ADOBE MEDIUM. "ADOBE," "ADOBE PHOTOSHOP," "ADOBE PREMIERE," "ADOBE LIGHTROOM," "ADOBE ILLUSTRATOR," "ADOBE SUBSTANCE," "ADOBE SUBSTANCE PAINTER," "ADOBE SUBSTANCE DESIGNER," "ADOBE SUBSTANCE ALCHEMIST," AND/OR "ADOBE MEDIUM" are either registered trademarks or trademarks of Adobe Inc. in the United States and/or other countries.

Figure 13:
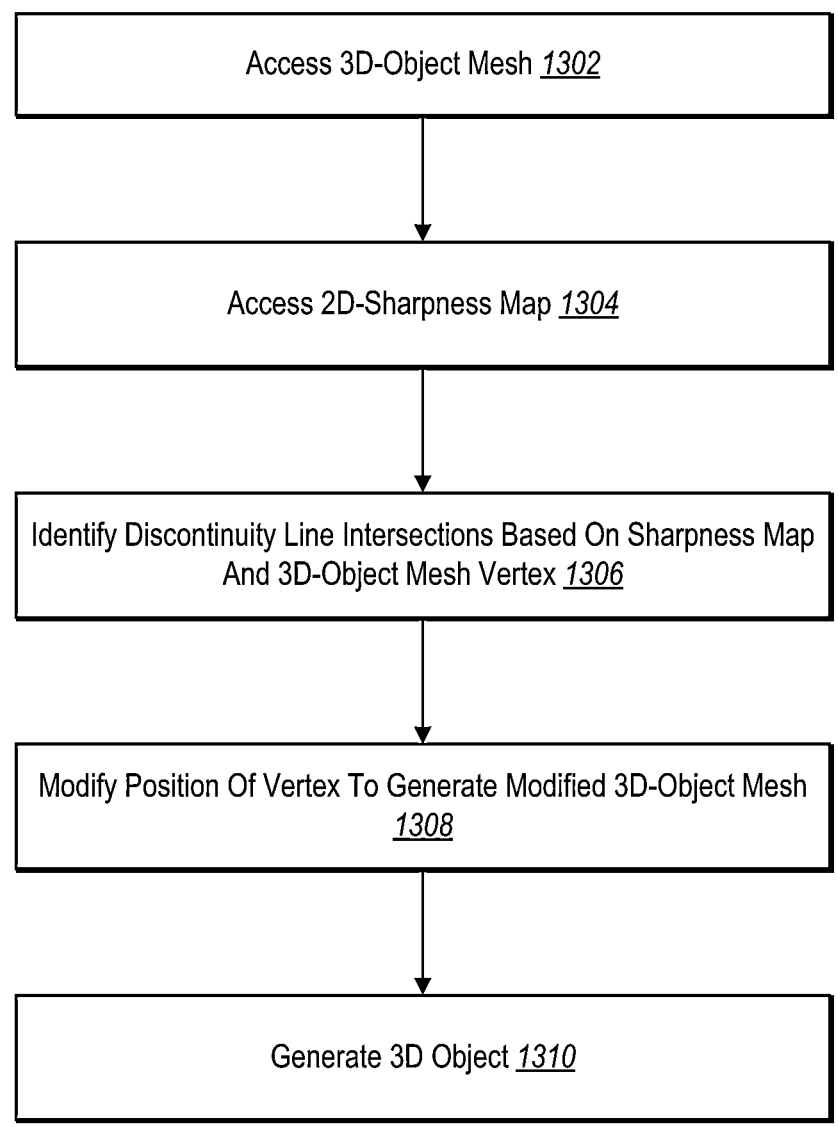
FIG. 13 illustrates a flowchart of a series of acts for modifying positions of vertices in a 3D-object mesh based on discontinuity line intersections from a sharpness map in accordance with one or more embodiments.
Figure 14:
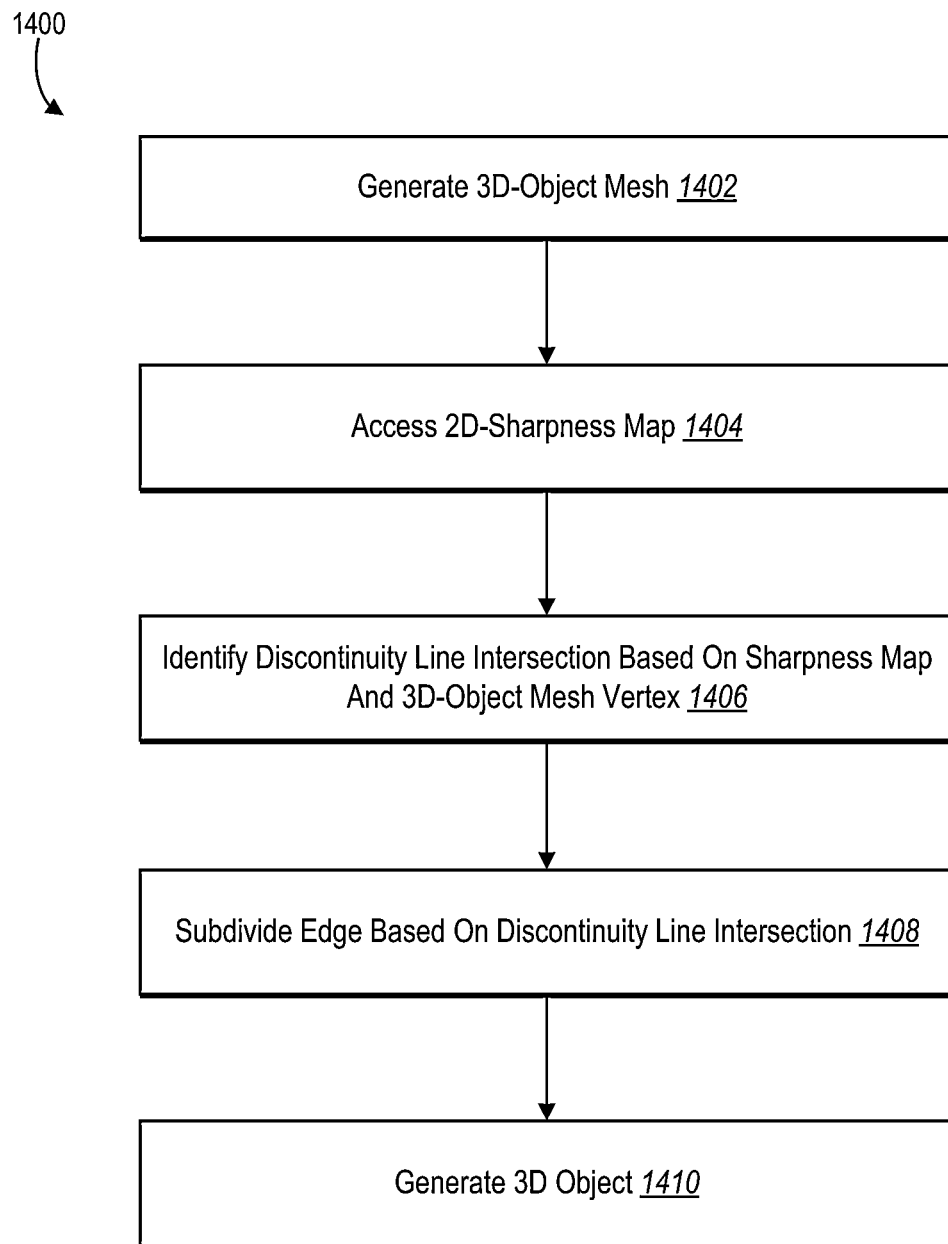
FIG. 14 illustrates a flowchart of a series of acts for subdividing edges of a 3D-object mesh based on discontinuity line intersections from a sharpness map in accordance with one or more embodiments.

FIGS. 1-12, the corresponding text, and the examples provide a number of different methods, systems, devices, and non-transitory computer-readable media of the sharp-tessellation texture-rendering system 106. In addition to the foregoing, one or more embodiments can also be described in terms of flowcharts comprising acts for accomplishing a particular result, as shown in FIGS. 13 and 14. The acts shown in FIGS. 13 and 14 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 13 and 14. In some embodiments, a system can be configured to perform the acts of FIGS. 13 and 14. Alternatively, the acts of FIGS. 13 and 14 can be performed as part of a computer-implemented method.

As mentioned above, FIG. 13 illustrates a flowchart of a series of acts 1300 for modifying positions of vertices in a 3D-object mesh based on discontinuity line intersections from a sharpness map in accordance with one or more embodiments. While FIG. 13 illustrates acts according to one embodiment, alternative embodiments may omit, add to, reorder, and/or modify any of the acts shown in FIG. 13.

As shown in FIG. 13, the series of acts 1300 include an act 1302 of accessing a 3D-object mesh. For example, the act 1302 includes accessing a three-dimensional (3D)-object mesh that includes a set of vertices and edges. In one or more embodiments, the act 1302 includes accessing a buffer that includes a barycentric coordinate for a neighbor vertex in relation to a vertex. For example, a buffer indexes attributes of a topology of a 3D-object mesh with a tessellation pattern. In some embodiments, the act 1302 includes generating a set of vertices for a 3D-object mesh utilizing a tessellation pattern.

As shown in FIG. 13, the series of acts 1300 include an act 1304 of accessing a 2D-sharpness map. For instance, the act 1304 includes accessing a two-dimensional (2D)-sharpness map that includes a set of discontinuity lines corresponding to a 2D-displacement map. Furthermore, in one or more embodiments, the act 1304 includes selecting a 2D-sharpness map mip level based on a number of subdivisions corresponding to a tessellation pattern.

As shown in FIG. 13, the series of acts 1300 include an act 1306 of identifying discontinuity line intersections based on a sharpness map and a 3D-object mesh vertex. For example, the act 1306 includes identifying a discontinuity line intersection between a discontinuity line from a set of discontinuity lines of a 2D-sharpness map and an edge between a vertex and a neighbor vertex from a set of vertices and edges of a 3D-object mesh. In some embodiments, the act 1306 includes accessing one or more discontinuity lines encoded within a first texel from a 2D-sharpness map in which the first texel corresponds to a position of a vertex. Furthermore, in some instances, the act 1306 includes utilizing a marching algorithm to traverse an edge from a vertex towards a neighbor vertex to identify a position of a discontinuity line intersection between the edge and a discontinuity line of a first texel (of a sharpness map). For example, the act 1306 includes identifying a position of a discontinuity line intersection between an edge and a first intersecting discontinuity line from multiple discontinuity lines of a first texel (of a sharpness map).

Furthermore, in some embodiments, the act 1306 includes identifying no intersections between an edge and one or more discontinuity lines of a first texel. Then, in one or more embodiments, the act 1306 includes accessing one or more discontinuity lines encoded within a second texel from a 2D-sharpness map in which the second texel corresponds to the an between a vertex and a neighbor vertex and utilizing a marching algorithm to traverse the edge from the vertex towards the neighbor vertex to identify a position of a discontinuity line intersection between the edge and a discontinuity line of the second texel. Furthermore, in some instances, the act 1306 includes identifying an additional discontinuity line intersection between an additional discontinuity line from a set of discontinuity lines of a 2D-sharpness map and an additional edge between the vertex and an additional neighbor vertex from a set of vertices and edges of a 3D-object mesh. Furthermore, in some embodiments, the act 1306 includes identifying one or more discontinuity line intersections between a set of discontinuity lines of a 2D-sharpness map and each edge between a vertex and each neighbor vertex of the vertex.

In some embodiments, the act 1306 includes identifying one or more discontinuity line intersections between a set of discontinuity lines of a 2D-sharpness map and one or more edges between a vertex and a set of neighbor vertices from a set of vertices and edges of a 3D-object mesh. For example, the act 1306 includes identifying one or more discontinuity line intersections by accessing one or more discontinuity lines encoded within at least one texel from a 2D-sharpness map (in which the at least one texel corresponds to one or more edges between a vertex and a set of neighbor vertices), identifying a first discontinuity line intersection between a first discontinuity line from the one or more discontinuity lines and a first edge between the vertex and a first neighbor vertex from the set of neighbor vertices, and identifying a second discontinuity line intersection between a second discontinuity line from the one or more discontinuity lines and a second edge between the vertex and a second neighbor vertex from the set of neighbor vertices.

As shown in FIG. 13, the series of acts 1300 include an act 1308 of modifying a position of a vertex to generate a modified 3D-object mesh. For example, the act 1308 includes modifying a position of aa vertex based on a position of a discontinuity line intersection to generate a modified 3D-object mesh. In some embodiments, the act 1308 includes modifying a position of a vertex by selecting a modified position for the vertex within a threshold distance from a position of a discontinuity line intersection. Furthermore, in some instances, the act 1308 includes modifying a position of a vertex to generate a modified 3D-object mesh by determining a first distance between the vertex and the position of a discontinuity line intersection and a second distance between the vertex and a position of an additional discontinuity line intersection and, then, selecting the modified position for the vertex within a threshold distance from the position of the discontinuity line intersection or the position of the additional discontinuity line intersection based on a comparison of the first distance and the second distance. In some instances, the act 1308 includes capturing one or more vertices of a modified 3D-object mesh for storage within a buffer.

In some instances, the act 1308 includes modifying a position of a vertex to generate a modified 3D-object mesh by determining a nearest discontinuity line intersection position between a position of the vertex and positions of one or more discontinuity line intersections and selecting the modified position for the vertex within a threshold distance from the nearest discontinuity line intersection position. For instance, the act 1308 includes determining a nearest discontinuity line intersection position by comparing a first distance between a position of a vertex and a first position of a first discontinuity line intersection and a second distance between the position of the vertex and a second position of a second discontinuity line intersection. In some embodiments, the act 1308 includes selecting a modified position for a vertex within a threshold distance from a position of a first discontinuity line intersection based on the first distance being lesser than a second distance of a second discontinuity line intersection.

As shown in FIG. 13, the series of acts 1300 include an act 1310 of generating a 3D object. For example, the act 1310 includes generating, for display within a graphical user interface, a 3D object utilizing a modified 3D-object mesh. Furthermore, in some embodiments, the act 1310 includes generating, for display within a graphical user interface, a 3D-object utilizing a modified 3D-object mesh by filtering a 2D-displacement map within faces created by modified vertices of the modified 3D-object mesh.

As mentioned above, FIG. 14 illustrates a flowchart of a series of acts 1400 for subdividing edges of a 3D-object mesh based on discontinuity line intersections from a sharpness map in accordance with one or more embodiments. While FIG. 14 illustrates acts according to one embodiment, alternative embodiments may omit, add to, reorder, and/or modify any of the acts shown in FIG. 14.

As shown in FIG. 14, the series of acts 1400 include an act 1402 of generating a 3D-object mesh. For instance, the act 1402 includes accessing a 3D-object mesh that includes a set of vertices and edges. As shown in FIG. 14, the series of acts 1400 include an act 1404 of accessing a 2D-sharpness map. For example, the act 1404 includes accessing a 2D-sharpness map comprising a set of discontinuity lines corresponding to a 2D-displacement map.

As shown in FIG. 14, the series of acts 1400 include an act 1406 of identifying a discontinuity line intersection based on a sharpness map and a 3D-object mesh vertex. For example, the act 1406 includes identifying a discontinuity line intersection between a discontinuity line from a set of discontinuity lines of a 2D-sharpness map and an edge between a vertex and a neighbor vertex from a set of vertices and edges of a 3D-object mesh.

In some embodiments, the act 1306 includes identifying an additional discontinuity line from a set of discontinuity lines of a 2D-sharpness map intersecting a discontinuity line corresponding to a (first) discontinuity line intersection. Furthermore, in some instances, the act 1306 includes identifying multiple discontinuity line intersections between discontinuity lines from a set of discontinuity lines of a 2D-sharpness map and an edge between the vertex and a neighbor vertex.

As shown in FIG. 14, the series of acts 1400 include an act 1408 of subdividing an edge based on a discontinuity line intersection. For example, the act 1408 includes subdividing an edge between a vertex and a neighbor vertex by generating one or more vertices positioned along the edge between the vertex and the neighbor vertex and within a threshold distance from a position of a discontinuity line intersection to generate a modified 3D-object mesh. In some embodiments, the act 1408 includes subdividing an edge between a vertex and a neighbor vertex by generating a first vertex along the edge on a side of the discontinuity line intersection and a second vertex along the edge on an opposite side of the discontinuity line intersection. Furthermore, in some instances, the act 1408 includes generating at least one vertex within a threshold distance from an intersection of an additional discontinuity line and a discontinuity line corresponding to the discontinuity line intersection. In some embodiments, the act 1408 includes subdividing an edge between a vertex and a neighbor vertex by generating one or more vertices positioned along the edge between the vertex and the neighbor vertex and within a threshold distance from one or more extreme positions of the edge.

As shown in FIG. 14, the series of acts 1400 include an act 1410 of generating a 3D object. For example, the act 1410 includes generating, for display within a graphical user interface, a 3D object utilizing a modified 3D-object mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
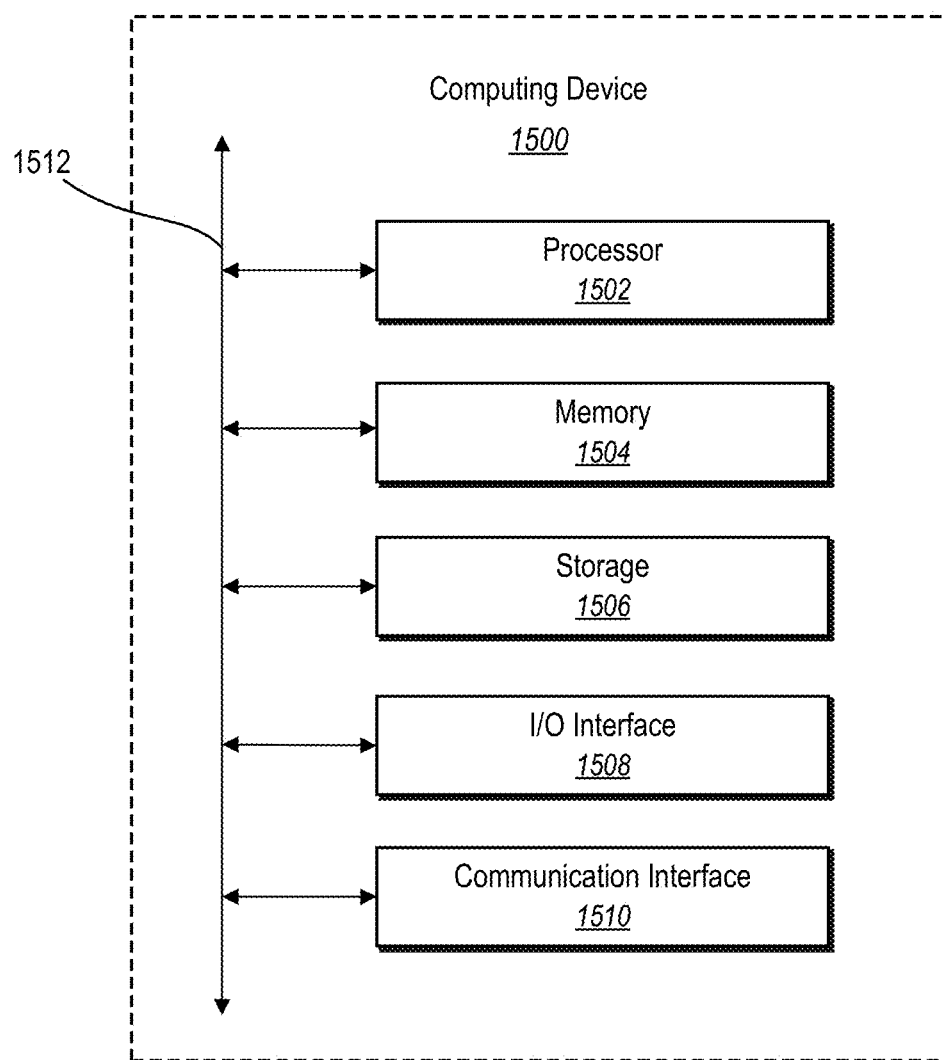
FIG. 15 illustrates a block diagram of an example computing device in accordance with one or more embodiments.

FIG. 15 illustrates a block diagram of an example computing device 1500 that may be configured to perform one or more of the processes described above. One will appreciate that one or more computing devices, such as the computing device 1500 may represent the computing devices described above (e.g., computing device 1200, server device(s) 102, and client device 110). In one or more embodiments, the computing device 1500 may be a mobile device (e.g., a mobile telephone, a smartphone, a PDA, a tablet, a laptop, a camera, a tracker, a watch, a wearable device, etc.). In some embodiments, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive ("HDD"), flash memory, a Universal Serial Bus ("USB") drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller ("NIC") or network adapter for communicating with an Ethernet or other wire-based network or a wireless NIC ("WNIC") or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:

determining a mipmapped two-dimensional (2D)-displacement map for a tessellation level of a three-dimensional (3D)-object mesh comprising a set of vertices and edges;

determining a mipmapped two-dimensional (2D)-sharpness map comprising a set of discontinuity lines corresponding to a resolution of the mipmapped 2D-displacement map;

modifying a position of a vertex corresponding to the 3D-object mesh to reposition the vertex within a threshold distance of a discontinuity line intersection from the mipmapped 2D-sharpness map to generate a modified 3D-object mesh comprising one or more modified vertices repositioned to discontinuities represented in the mipmapped 2D-sharpness map; and generating, for display within a graphical user interface, a 3D object utilizing the modified 3D-object mesh.

2. The non-transitory computer-readable medium of claim 1, wherein the operations further comprise:

determining a tessellation level based on a number of vertices within the 3D-object mesh; and selecting the mipmapped 2D-displacement map from a set of mipmapped 2D-displacement maps corresponding to one or more tessellation levels of the 3D-object mesh.

3. The non-transitory computer-readable medium of claim 2, wherein the operations further comprise selecting the mipmapped 2D-sharpness map from a set of mipmapped 2D-sharpness maps corresponding to the mipmapped 2D-displacement map from the set of mipmapped 2D-displacement maps utilizing a mip level.

4. The non-transitory computer-readable medium of claim 3, wherein the operations further comprise:

determining an upper bound edge size from the tessellation level of the 3D-object mesh; and determining the mip level utilizing the upper bound edge size of the tessellation level.

5. The non-transitory computer-readable medium of claim 1, wherein the operations further comprise generating the mipmapped 2D-displacement map by sampling features of a 2D-displacement map at intersections of multiple texels of the 2D-displacement map.

6. The non-transitory computer-readable medium of claim 1, wherein the operations further comprise generating the mipmapped 2D-sharpness map by:

identifying one or more partitions within the mipmapped 2D-displacement map based on the discontinuity lines of a 2D-sharpness map and interpolation evaluation corner point positions at texel corners of the mipmapped 2D-displacement map; and modifying a discontinuity line of the 2D-sharpness map utilizing a comparison of a first feature of the mipmapped 2D-displacement map within a first partition of the one or more partitions and a second feature of the mipmapped 2D-displacement map within a second partition of the one or more partitions.

7. The non-transitory computer-readable medium of claim 6, wherein the operations further comprise removing the discontinuity line upon determining a threshold similarity is satisfied between the first feature and the second feature.

8. The non-transitory computer-readable medium of claim 6, wherein the operations further comprise:

identifying multiple discontinuity line intersections on an edge of the mipmapped 2D-displacement map, wherein the edge is between two interpolation evaluation corner point positions of the interpolation evaluation corner point positions in the mipmapped 2D-displacement map; and upon determining that a threshold similarity is not satisfied between the first feature and the second feature, replacing the multiple discontinuity line intersections on the edge of the mipmapped 2D-displacement map a new discontinuity line intersection at an averaged location between positions of the multiple discontinuity line intersections.

9. The non-transitory computer-readable medium of claim 8, wherein the operations further comprise determining a discontinuity configuration for the new discontinuity line intersection.

10. A system comprising:

a memory component comprising a three-dimensional (3D)-object mesh, a set of mipmapped two-dimensional (2D)-displacement maps for the 3D-object mesh, and a set of mipmapped two-dimensional (2D)-sharpness maps; and a processing device coupled to the memory component, the processing device to perform operations comprising:

determining a tessellation level for the 3D-object mesh;

selecting a particular mipmapped 2D-displacement map from the set of mipmapped two-dimensional (2D)-displacement maps for the tessellation level;

selecting a particular mipmapped 2D-sharpness map from the set of 2D-sharpness maps that corresponds to a resolution of the particular mipmapped 2D-displacement map; and modifying a position of a vertex corresponding to the 3D-object mesh to reposition the vertex within a threshold distance of a discontinuity line intersection from the particular mipmapped 2D-sharpness map to generate a modified 3D-object mesh comprising one or more modified vertices repositioned to discontinuities represented in the particular mipmapped 2D-sharpness map.

11. The system of claim 10, wherein the operations further comprise selecting the particular mipmapped 2D-displacement map and the particular mipmapped 2D-sharpness map utilizing a mip level determined from an upper bound edge size from the tessellation level of the 3D-object mesh.

12. The system of claim 10, wherein the operations further comprise generating a mipmapped 2D-displacement map for the set of mipmapped 2D-displacement maps by sampling features of a 2D-displacement map corresponding to the 3D-object mesh at intersections of multiple texels of the 2D-displacement map to combine the multiple texels.

13. The system of claim 12, wherein the operations further comprise generating the a mipmapped 2D-sharpness map for the set of mipmapped 2D-sharpness maps by:

identifying one or more partitions within the mipmapped 2D-displacement map based on the discontinuity lines of a 2D-sharpness map and interpolation evaluation corner point positions at texel corners of the mipmapped 2D-displacement map; and modifying a discontinuity line of the 2D-sharpness map utilizing a comparison of a first feature of the mipmapped 2D-displacement map within a first partition of the one or more partitions and a second feature of the mipmapped 2D-displacement map within a second partition of the one or more partitions.

14. The system of claim 13, wherein the operations further comprise removing the discontinuity line upon determining a threshold similarity is satisfied between the first feature and the second feature.

15. The system of claim 10, wherein the operations further comprise:

determining an additional tessellation level for an additional portion of the 3D-object mesh;

selecting an additional 2D-displacement map from the set of mipmapped 2D-displacement maps for the additional tessellation level at the additional portion of the 3D-object mesh; and selecting an additional mipmapped 2D-sharpness map from the set of 2D-sharpness maps that corresponds to the additional mipmapped 2D-displacement map at the additional portion of the 3D-object mesh.

16. A computer-implemented method comprising:
generating, from a two-dimensional (2D)-displacement map, a mipmapped 2D-displacement map with a reduced resolution for a particular level of tessellation of a three-dimensional (3D)-object mesh comprising a set of vertices and edges;
generating a mipmapped two-dimensional (2D)-sharpness map comprising a set of discontinuity lines corresponding to the reduced resolution of the mipmapped 2D-displacement map by modifying discontinuity lines of a 2D-sharpness map corresponding to the 2D-displacement map;
modifying a position of one or more vertices of the 3D-object mesh utilizing the set of discontinuity lines of the mipmapped 2D-sharpness map to generate a modified 3D-object mesh comprising one or more modified vertices repositioned to discontinuities represented in the mipmapped 2D-sharpness map; and
generating, for display within a graphical user interface, a 3D object utilizing the modified 3D-object mesh.

17. The computer-implemented method of claim 16, further comprising generating the mipmapped 2D-displacement map by sampling features of a 2D-displacement map at intersections of multiple texels of the 2D-displacement map to modify a number of texels of the 2D-displacement map based on the particular level of tessellation.

18. The computer-implemented method of claim 16, further comprising generating the mipmapped 2D-sharpness map by:
identifying one or more partitions within the mipmapped 2D-displacement map based on the discontinuity lines of a 2D-sharpness map and interpolation evaluation corner point positions at texel corners of the mipmapped 2D-displacement map; and
modifying one or more discontinuity lines of the 2D-sharpness map utilizing a comparison of a first feature of the mipmapped 2D-displacement map within a first partition of the one or more partitions and a second feature of the mipmapped 2D-displacement map within a second partition of the one or more partitions.

19. The computer-implemented method of claim 18, further comprising modifying the one or more discontinuity lines of the 2D-sharpness map by:
removing the one or more discontinuity lines upon determining a threshold similarity is satisfied between the first feature and the second feature separated by the one or more discontinuity lines; or
merging the one or more discontinuity lines upon determining the threshold similarity is not satisfied between the first feature and the second feature separated by the one or more discontinuity lines.

20. The computer-implemented method of claim 16, further comprising modifying the one or more vertices of the 3D-object mesh by:
modifying a vertex position corresponding to the 3D-object mesh to reposition a vertex within a threshold distance of a discontinuity line intersection from the mipmapped 2D-sharpness map to generate the modified 3D-object mesh; or
subdividing an edge between the vertex and a neighbor vertex corresponding to the 3D-object mesh by generating one or more vertices positioned along the edge between the vertex and the neighbor vertex and within a threshold distance from a position of a discontinuity line intersection from the mipmapped 2D-sharpness map between the vertex and the neighbor vertex to generate the modified 3D-object mesh.

* * * * *